United States Patent
Kye et al.

(10) Patent No.: US 11,598,863 B2
(45) Date of Patent: Mar. 7, 2023

(54) IMAGING DEVICE AND METHOD OF CONTROLLING THE SAME

(71) Applicant: SAMSUNG ELECTRONICS CO., LTD., Suwon-si (KR)

(72) Inventors: Myeonggyun Kye, Yongin-si (KR); Seungchul Shin, Yongin-si (KR); Minsun Keel, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/476,879

(22) Filed: Sep. 16, 2021

(65) Prior Publication Data
US 2022/0210357 A1   Jun. 30, 2022

(30) Foreign Application Priority Data

Dec. 28, 2020   (KR) .......................... 10-2020-0184615

(51) Int. Cl.
*G01S 7/486*   (2020.01)
*G01S 7/4865*   (2020.01)
(Continued)

(52) U.S. Cl.
CPC .......... *G01S 7/4868* (2013.01); *G01S 7/4865* (2013.01); *H04N 5/36965* (2018.08); *H04N 5/378* (2013.01); *H04N 5/3765* (2013.01)

(58) Field of Classification Search
CPC ............. H04N 5/3575; H04N 5/36965; H04N 5/3765; H04N 5/378; G01S 7/4815;
(Continued)

(56) References Cited

U.S. PATENT DOCUMENTS 6,133,992 A   10/2000   Tanaka et al.
7,940,378 B2   5/2011   Gogolla et al.
(Continued)

FOREIGN PATENT DOCUMENTS

JP   2006-267035 A   10/2006
KR   10-1301376 B1   8/2013
(Continued)

OTHER PUBLICATIONS

Andrew D. Payne, et al. "Illumination waveform optimization for time-of-flight range imaging cameras", Videometrics, Range Imaging, and Applications XI vol. 80850D1~80850D-13, (2011).
(Continued)

*Primary Examiner* — Lin Ye
*Assistant Examiner* — Chriss S Yoder, III
(74) *Attorney, Agent, or Firm* — Lee IP Law, P.C.

(57) ABSTRACT

An imaging device includes a light source configured to operate by a light control signal having a first duty ratio; a pixel array in which a plurality of pixels are disposed, each of the plurality of pixels including a photodiode for generating electrical charges in response to a light reception signal output by the light source and reflected from a subject, and a pixel circuit for outputting a pixel signal corresponding to electrical charges of the photodiode; and a logic circuit configured to generate raw data for generating a depth image using the pixel signal, wherein the logic circuit inputs a photo control signal having a second duty ratio to the pixel circuit connected to the photodiode in each of the plurality of pixels, and wherein the first duty ratio is not an integer multiple of the second duty ratio.

20 Claims, 39 Drawing Sheets

(51) Int. Cl.
*H04N 5/369* (2011.01)
*H04N 5/376* (2011.01)
*H04N 5/378* (2011.01)

(58) Field of Classification Search
CPC .... G01S 7/4863; G01S 7/4865; G01S 7/4868; G01S 7/497; G01S 17/894
See application file for complete search history.

(56) References Cited

U.S. PATENT DOCUMENTS

| | | |
|---|---|---|
| 10,712,432 B2 | 7/2020 | Lehmann |
| 2019/0293792 A1 | 9/2019 | Keel et al. |
| 2022/0043116 A1* | 2/2022 | Jin .......................... G01S 17/36 |
| 2022/0179088 A1* | 6/2022 | Sawamoto ............ H01L 27/146 |

FOREIGN PATENT DOCUMENTS

| | | |
|---|---|---|
| KR | 10-1958554 B1 | 3/2019 |
| KR | 10-2019-0110884 A | 10/2019 |

OTHER PUBLICATIONS

Andrew D. Payne, et al. "Improved linearity using harmonic error rejection in a full-field range imaging system", Three-Dimensional Image Capture and applications vol. 2008 68050D, (2008).

\* cited by examiner

IMAGING DEVICE AND METHOD OF CONTROLLING THE SAME

CROSS TO REFERENCE TO RELATED APPLICATION

Korean Patent Application No. 10-2020-0184615 filed on Dec. 28, 2020, in the Korean Intellectual Property Office, and entitled: "Imaging Device and Method of Controlling the Same," is incorporated by reference herein in its entirety.

BACKGROUND

1. Field

Embodiments relate to an imaging device and a method of controlling the same.

2. Description of the Related Art

An imaging device may generate an image by converting a light signal into an electrical signal. The imaging device may be mounted on an electronic device and may provide, e.g., a camera function.

SUMMARY

Embodiments are directed to an imaging device, including: a light source configured to operate according to a light control signal that has a first duty ratio; pixels disposed in an array, each of the pixels including: a photodiode configured to generate an electrical charge in response to light output by the light source and reflected from a subject, and a pixel circuit configured to output a pixel signal corresponding to the electrical charge; and a logic circuit configured to generate raw data for generating a depth image using the pixel signal, and configured to provide a photo control signal that has a second duty ratio to each pixel circuit, wherein the first duty ratio is not an integer multiple of the second duty ratio.

Embodiments are directed to an imaging device, including: a light source including at least one light emitting device and a light source driver for driving the light emitting device; a pixel array in which a plurality of pixels are disposed, each of the plurality pixels including a photodiode for generating electrical charges in response to a light reception signal output by the light source and reflected from a subject, and a pixel circuit for outputting a pixel signal corresponding to the electrical charges of the photodiode; and a logic circuit including a control logic configured to generate raw data for generating a depth image by obtaining the pixel signals, and to output a light control signal having a predetermined demodulation frequency and a duty ratio, and including a delay circuit configured to output a delay signal to the light source driver by delaying the light control signal. The logic circuit may be configured to input, to the pixel circuit connected to the photodiode in each of the plurality of pixels, a plurality of photo control signals having different phase differences with reference to the light control signal.

Embodiments are also directed to a method of controlling an imaging device including a light source and an image sensor, the method including: setting a duty ratio of a light control signal for driving the light source as a first reference duty ratio; obtaining first operation errors corresponding to a difference between reference data according to a delay time of the light control signal and depth data generated by the image sensor, while changing the delay time of the light control signal; calculating a first result value corresponding to a difference between a maximum value and a minimum value among the first operation errors when the delay time of the light control signal reaches a maximum delay time; setting a duty ratio of the light control signal as a second reference duty ratio; obtaining second operation errors corresponding to a difference between reference data according to the delay time of the light control signal and depth data generated by the image sensor, while changing the delay time of the light control signal; calculating a second result value corresponding to a difference between a maximum value and a minimum value among the second operation errors when the delay time of the light control signal reaches a maximum delay time; and determining the first reference duty ratio or the second reference duty ratio as a duty ratio of the light control signal, based on the first result value and the second result value.

BRIEF DESCRIPTION OF DRAWINGS

Features will become apparent to those of skill in the art by describing in detail example embodiments with reference to the attached drawings in which.

DETAILED DESCRIPTION

Figure 1:
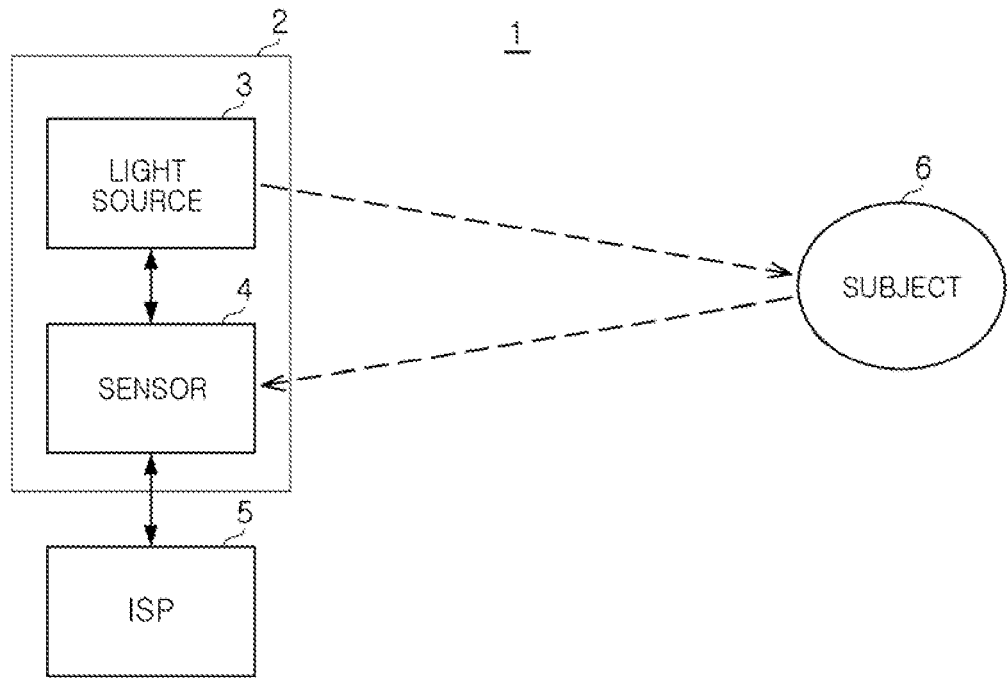
FIGS. 1 and 2 are block diagrams illustrating an imaging device according to an example embodiment.
Figure 2:
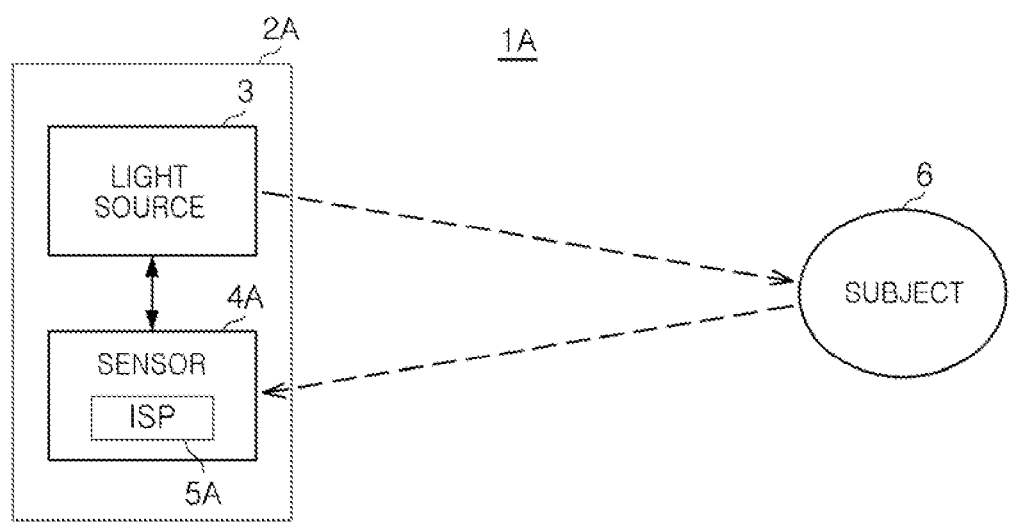

FIGS. 1 and 2 are block diagrams illustrating an imaging device according to an example embodiment.

Referring to FIG. 1, an imaging device 1 according to an example embodiment may include a sensor module 2 and an image signal processor 5. The sensor module 2 may include a light source 3 and a sensor 4. In an example embodiment, the sensor module 2 and the image signal processor 5 may be included in different semiconductor devices. In an example embodiment, the sensor module 2 may be implemented in the form of a semiconductor package including the light source 3 and the sensor 4, and the image signal processor 5 may be included in a semiconductor device connected to communicate with the sensor module 2 through a predetermined interface, e.g., an application processor, a central processing unit, and a system on a chip.

The light source 3 may include at least one light emitting device, which may output a light signal of a predetermined wavelength band, and a light source driver for driving the light emitting device. The light emitting device may be implemented as, e.g., a vertical cavity surface emitting laser (VCSEL) or a light emitting diode (LED). The light source 3 may include a plurality of light emitting devices arranged in an array on a substrate. The light source 3 may include an optical device disposed in a path of the light signal to improve properties of the light signal. In an example embodiment, the light signal output by the light source 3 may be in an infrared wavelength band.

The light output by the light source 3 may be reflected from the subject 6, and light reflected from the subject 6 may be incident on the sensor 4. The sensor 4 may include pixels configured to generate an electrical signal in response to the light incident thereon. The sensor 4 may include a logic circuit configured to generate raw data used to generate a result image using an electrical signal. The raw data may include depth information indicating a distance to the subject 6 and a background of the subject 6. The image signal processor 5 may generate a result image using the raw data, and the result image may be configured as a depth image indicating a distance to the subject 6 and the background of the subject 6.

Referring to FIG. 2, a sensor module 2A and an image signal processor 5A of an imaging device 1A may be implemented in a single package. For example, the light source 3, a sensor 4A, and the image signal processor 5A may be included in a single semiconductor package. The image signal processor 5A may be included in the sensor 4A, or may be implemented separately from the sensor 4A.

The image signal processors 5 and 5A may be implemented as, e.g., software and/or hardware. As an example, when the image signal processor 5 is implemented separately from the sensor module 2 as in the example embodiment described with reference to FIG. 1, the image signal processor 5 may be implemented as, e.g., software in an application processor. Also, when the image signal processor 5A is integrated into the sensor module 2A as in the example embodiment described with reference to FIG. 2, the image signal processor 5A may be implemented as, e.g., hardware.

Figure 3:
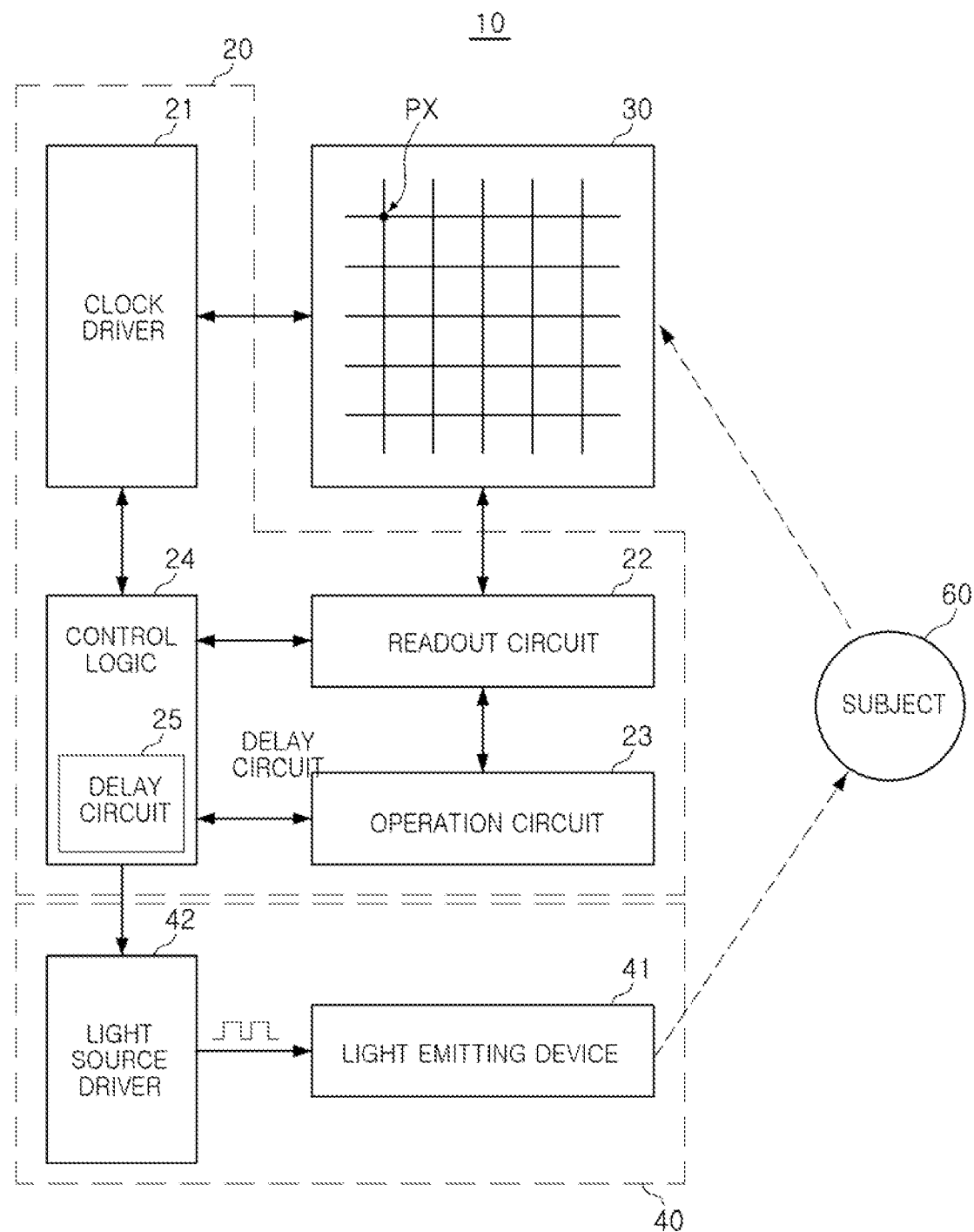
FIGS. 3 and 4 are block diagrams illustrating an imaging device according to an example embodiment.

FIG. 3 is a block diagram illustrating an imaging device according to an example embodiment.

Referring to FIG. 3, the imaging device 10 may include a logic circuit 20, a pixel array 30, a light source driver 42, and a light source 40. The pixel array 30 may include a plurality of pixels PX arranged in an array form, e.g., in a plurality of rows and a plurality of columns. Each of the plurality of pixels PX may include a photodiode for generating electrical charges in response to light incident thereon from a subject 60. Each pixel PX may include a pixel circuit for generating an electric signal corresponding to electrical charges generated by the photodiode.

In an example embodiment, the pixel circuit may include a floating diffusion, a transfer transistor, a reset transistor, a drive transistor, and a select transistor. The configuration of the pixels PX may be varied according to example embodiments. For example, each of the pixels PX may include an organic photodiode including an organic material, differently from a silicon photodiode, or may be implemented as, e.g., a digital pixel. When the pixels PX are implemented as digital pixels, each of the pixels PX may include a comparator and a counter for converting an output of the comparator into a digital signal and outputting the signal.

The logic circuit 20 may include a plurality of circuits for controlling the pixel array 30. As an example, the logic circuit 20 may include a clock driver 21, a readout circuit 22, an operation circuit 23, a control logic 24, and the like. The clock driver 21 may drive the pixel array 30 in a first direction or a second direction, e.g., a row or column direction. In an example embodiment, the clock driver 21 may generate a transmission control signal input to a transfer gate of the pixel circuit, a reset control signal input to a reset gate, a selection control signal input to a selection gate, and a photo control signal input to a photo gate. The first direction and the second direction may be defined in various manners. In an example embodiment, the first direction may correspond to a row direction and the second direction may correspond to a column direction.

The readout circuit 22 may include a correlated double sampler (CDS) and an analog-to-digital converter (ADC). The correlated double sampler may be connected to pixels PX selected by a clock signal supplied by the clock driver 21 through column lines, and may detect a reset voltage and a pixel voltage by performing correlated double sampling. The analog-to-digital converter may convert the reset voltage and the pixel voltage detected by the correlated double sampler into digital signals and may transmit the signals to the operation circuit 23.

The operation circuit 23 may include a latch or a buffer circuit and an amplifier circuit for temporarily storing digital signals, and may process a digital signal received from the readout circuit 22. The clock driver 21, the readout circuit 22, and the operation circuit 23 may be controlled by the control logic 24. The control logic 24 may include a timing controller for controlling operation timings of the clock driver 21, the readout circuit 22, and the operation circuit 23, and an image signal processor for processing image data. In an example embodiment, the operation circuit 23 may be included in the control logic 24.

The control logic 24 may generate raw data for generating a result image by processing data output by the readout circuit 22 and the operation circuit 23. In an example embodiment, the result image generated by the raw data may be a depth image. When an image signal processor is included in the control logic 24, the control logic 24 may generate a result image using the raw data.

In an example embodiment, the control logic 24 may calculate a distance between the subject 60 and the imaging device 10 or may recognize the subject 60 adjacent to the imaging device 10 using data output by the readout circuit 22 and the operation circuit 23 on the basis of an operation mode of the imaging device 10. In another implementation, the operation circuit 23 may generate a depth image, and the control logic 24 may post-process the depth image to improve quality of a result image.

The imaging device 10 may include a light source 40 for output light to the subject 60. The light source 40 may include at least one light emitting device 41 and a light source driver 42, and may include, e.g., a semiconductor chip in which a plurality of light emitting devices are arranged in an array. The light source driver 42 may be controlled by a light control signal output by the logic circuit 20. In an example embodiment, the light control signal may be a pulse width modulation (PWM) signal having a predetermined frequency and a predetermined duty ratio.

In an example embodiment, the light source driver 42 may drive the light emitting device 41 in response to a light control signal having pulse signal properties. In an example embodiment, the logic circuit 20 may synchronize at least one of the clock signals input to the pixel array 30 by the clock driver 21 with a light control signal input to the light source 40. In an example embodiment, the signal synchronized with the light control signal input to the light source 40 may be a photo control signal input to the pixels PX by the clock driver 21. The photo control signal may control turning on/off of a transistor connected between the photodiode of each of the pixels PX and the floating diffusion.

In an example embodiment, the control logic 24 may include a delay circuit 25. The delay circuit 25 may include a delayed locked loop (DLL). The delay circuit 25 may delay the light control signal generated by the control logic 24 and output to the light source 40.

In an example embodiment, the imaging device 10 may operate in a normal mode or a calibration mode, and the mode of the imaging device 10 may be selected by the control logic 24. In the calibration mode, the imaging device 10 may perform a calibration operation for optimizing the duty ratio of the light control signal, and the delay circuit 25 may delay the light control signal. During the calibration operation, the delay circuit 25 may delay the light control signal, such that depth data generated by sensing the subject 60 by the imaging device 10 may be changed without adjusting an actual distance between the imaging device 10 and the subject 60.

In an example embodiment, the depth data generated by sensing the subject 60 by the imaging device 10 may be determined as in Equation 1. In Equation 1, "c" denotes the speed of light, "d" denotes the depth data generated by sensing the subject 60 by the imaging device 10, and "$f_m$" denotes a frequency of the light control signal. Further, in Equation 1, "φ" may be a phase difference between the light control signal input to the light source 40 and the photo control signal input to the pixel array 30 by the clock driver 21.

$$d = \frac{c}{2f_m} \frac{\varphi}{2\pi}$$ [Equation 1]

When the delay circuit 25 delays the light control signal, the light that is reflected from the subject 60 and received by the pixel array 30 may also be delayed as much as the light control signal is delayed. Therefore, by delaying the light control signal using the delay circuit 25, the depth data generated by the imaging device 10 may be changed without adjusting the actual distance between the imaging device 10 and the subject 60. In the imaging device 10 according to an example embodiment, a calibration operation for optimizing a duty ratio of the light control signal may be performed.

The calibration operation may be performed by comparing the depth data generated by the imaging device 10 with the actual distance between the imaging device 10 and the subject 60 while changing the duty ratio of the light control signal.

For the calibration operation, the depth data generated by the imaging device 10 may be compared with the actual distance while changing the actual distance between the imaging device 10 and the subject 60, but this may increase time and resources used for the calibration operation.

In an example embodiment, the calibration operation may be performed without changing the actual distance between the imaging device 10 and the subject 60, by using the delay circuit 25. As described above, as the delay circuit 25 delays the light control signal, the depth data generated by the imaging device 10 may be changed. Therefore, for each delay time applied to the light control signal, the reference data (which corresponds to actual distance between the imaging device 10 and the subject 60 calculated according to Equation 1) may be compared with the depth data generated by sensing the subject 60 using the imaging device 10 while the light source 40 operates by the delayed light control signal. This may shorten and simplify the calibration operation, and may be performed through an application for executing the imaging device 10, e.g., while an end user uses the electronic device.

In another implementation, the calibration operation may be performed while changing the actual distance between the imaging device 10 and the subject 60, in which case a delay time may not be applied to the light control signal. Also, the actual distance between the imaging device 10 and the subject 60 may be compared with the depth data generated by the imaging device 10 without separately calculating the reference data. This calibration operation may be completed before the imaging device 10 is mounted on an electronic device and is sold to an end user.

Figure 4:
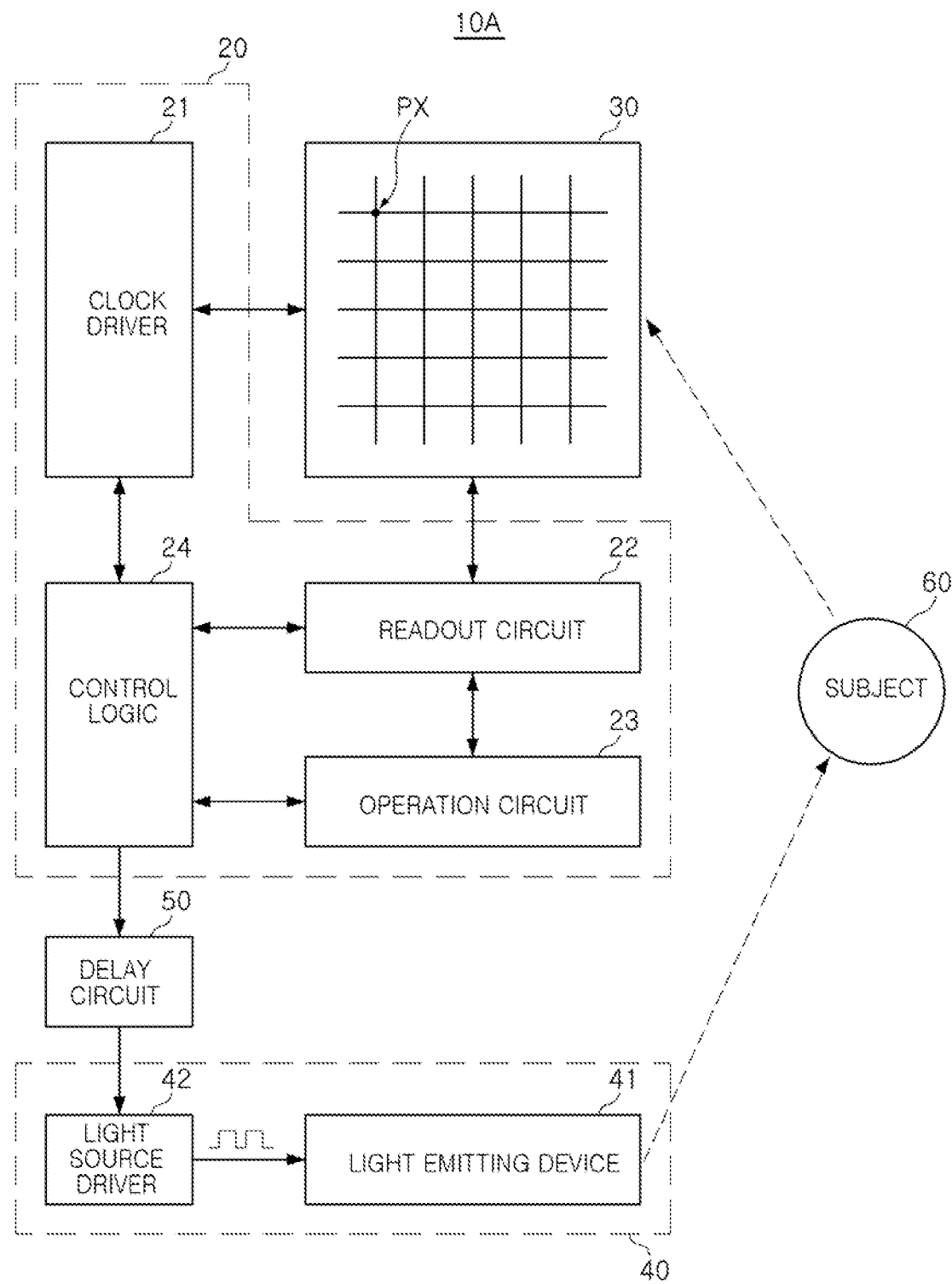

FIG. 4 is a block diagram illustrating an imaging device according to an example embodiment.

Referring to FIG. 4, in an example embodiment, an imaging device 10A may not include the delay circuit 25, and the calibration operation of the imaging device 10A may be performed by delaying the light control signal using a delay circuit 50 that is external to the control logic 24. The delay circuit 50 may be, e.g., implemented on a test board on which the imaging device 10A is mounted, while the calibration operation is performed.

Figure 5A:
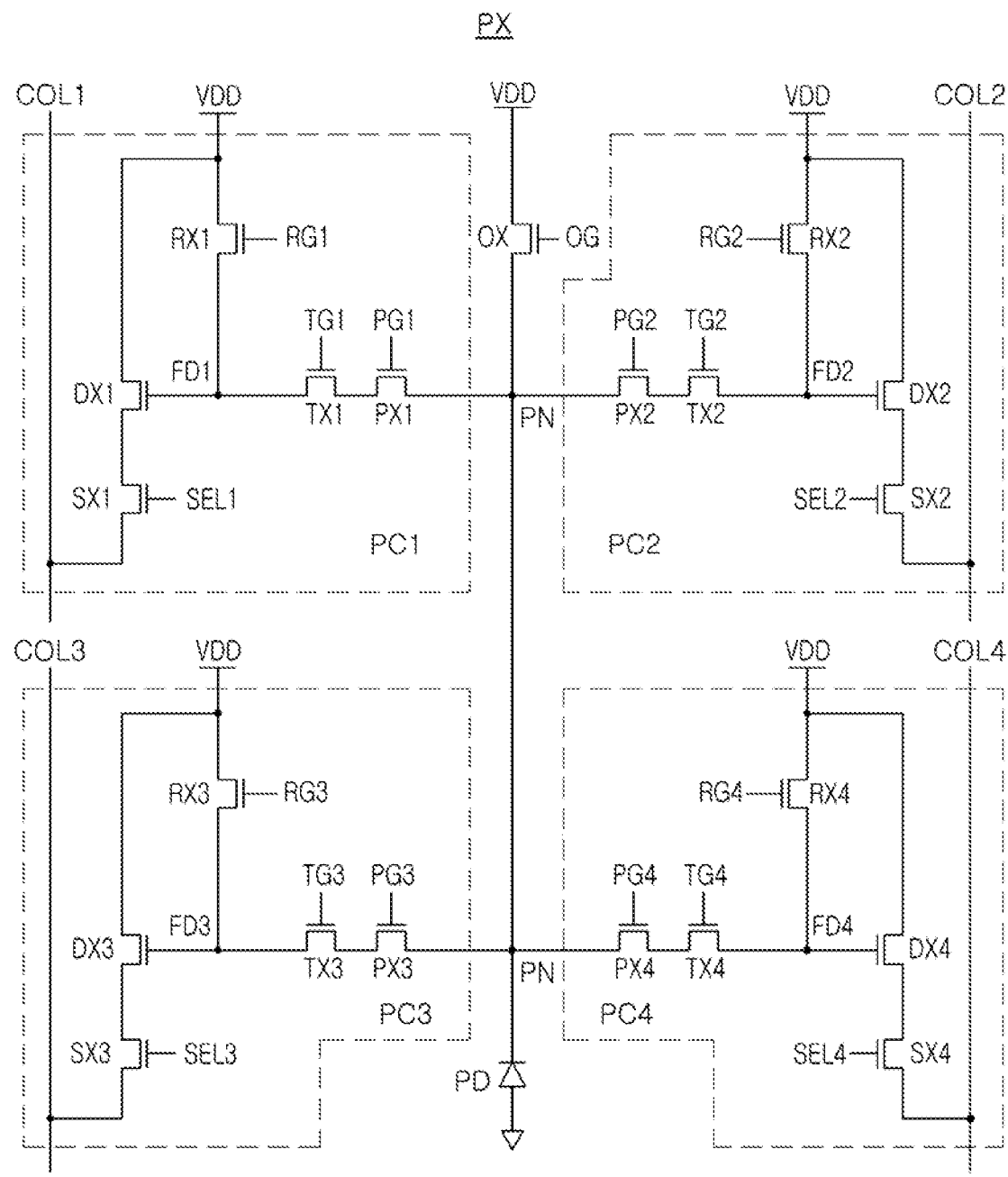
FIGS. 5A and 5B are circuit diagrams illustrating a pixel of an imaging device according to an example embodiment.
Figure 5B:
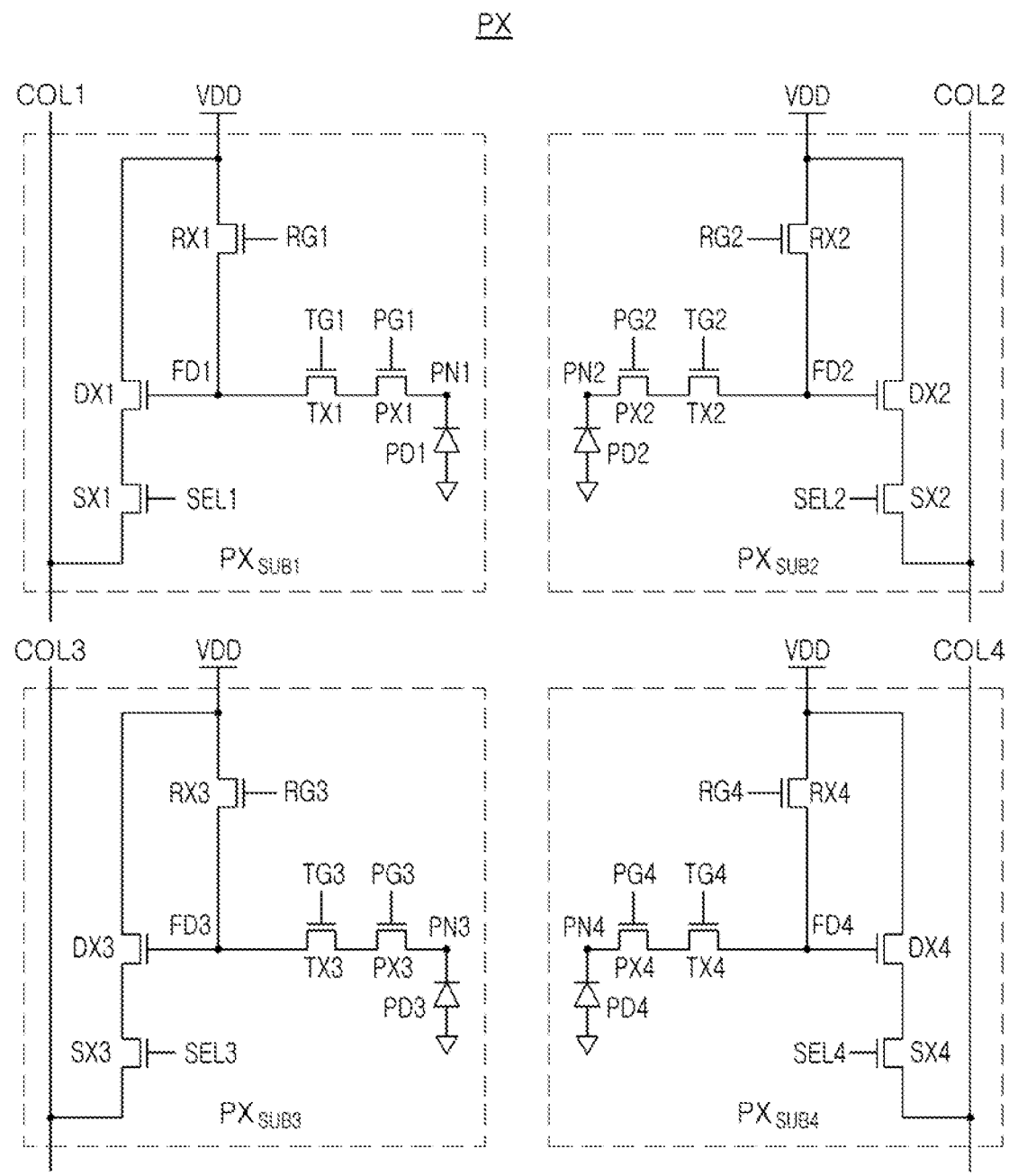

FIGS. 5A and 5B are circuit diagrams illustrating a pixel of an imaging device according to an example embodiment.

Referring to FIG. 5A, a pixel PX of an imaging device in an example embodiment may include a photodiode PD for generating an electrical charge in response to incident light, and pixel circuits, e.g., first to fourth pixel circuits PC1-PC4, for outputting electric signals corresponding to the electrical charge generated by the photodiode PD.

The first pixel circuit PC1 may be connected to the first column line COL1. The second pixel circuit PC2 may be connected to the second column line COL2. The third pixel circuit PC3 may be connected to the third column line COL3. The fourth pixel circuit PC4 may be connected to the fourth column line COL4. The first to fourth column lines COL1 to COL4 may be connected to a sampling circuit for obtaining a pixel circuit from the first to fourth pixel circuits PC1 to PC4 and an analog-to-digital converter for converting the pixel circuit into digital data.

The first to fourth pixel circuits PC1 to PC4 may have the same structure. In an example embodiment, the first pixel circuit PC1 may include a first photo transistor PX1 connected to the photodiode PD, a first transfer transistor TX1, a first floating diffusion FD1 for accumulating the electrical charge from the first photo transistor PX1, and a plurality of first circuit elements RX1, DX1, and SX1. The plurality of first circuit elements RX1, DX1, and SX1 may include a first reset transistor RX1, a first driving transistor DX1, and a first select transistor SX1. Control signals TG1, RG1, and SEL1 for respectively controlling the first transfer transistor TX1, the first reset transistor RX1, and the first select transistor SX1 may be input by a clock driver of the imaging device.

When the first reset transistor RX1 is turned on, a voltage of the first floating diffusion FD1 may be reset to a power voltage VDD, and the select transistor SX1 may be turned on such that a first reset voltage may be output to the first column line COL1. During a first exposure time before the first reset transistor RX1 is turned off and the first transfer transistor TX1 is turned on, the photodiode PD may be exposed to light and may generate electrical charges.

When the first transfer transistor TX1 is turned on, electrical charges generated by the photodiode PD and accumulated by the first photo transistor PX1 may move to the first floating diffusion FD1. When the first selection transistor SX1 is turned on, a first pixel voltage may be output to the first column line COL1. The first analog-to-digital converter connected to the first column line COL1 may convert a difference between the first reset voltage and the first pixel voltage into first raw data DATA1, digital data.

The operation of the second to fourth pixel circuits PC2-PC4 may be similar to the operation of the first pixel circuit PC1. However, the photo control signals PG1-PG4 input to each of the first to fourth pixel circuits PC1-PC4 may have different phases. In an example embodiment, the photo control signals PG1-PG4 may have the same frequency as that of the light control signal, may have a phase difference of 0 degrees, 90 degrees, 180 degrees, and 270 degrees on the basis of the light control signal, and may be varied in duty cycle, as described further below.

While the calibration operation described above is performed, the light control signal may be delayed by a predetermined delay time by a delay circuit. Even while the calibration operation is performed, the photo control signals PG1-PG4 may have a phase difference of 0 degrees, 90 degrees, 180 degrees, and 270 degrees on the basis of the light control signal before the light control signal is delayed, rather the light control signal delayed by the delay circuit.

Referring to FIG. 5B, in another example embodiment the pixel PX may include first to fourth sub-pixels $PX_{SUB1}$-$PX_{SUB4}$. The first to fourth sub-pixels $PX_{SUB1}$-$PX_{SUB4}$ may have the same structure. As an example, referring to the first sub-pixel $PX_{SUB1}$, the first sub-pixel $PX_{SUB1}$ may include a first photodiode PD1, and a pixel circuit connected to the first photodiode PD1 through a first photonode PN1. The pixel circuit may include a photo transistor PX1, a transfer transistor TX1, a floating diffusion FD1, a reset transistor RX1, a drive transistor DX1, and a select transistor SX1. The configuration of the pixel circuit may be varied according to example embodiments. The operation of the pixel circuit may be similar to the example described with reference to FIG. 5A.

In the example embodiments illustrated in FIGS. 5A and 5B, the photo control signals PG1-PG4 may have a phase difference of 0 degrees, 90 degrees, 180 degrees, and 270 degrees on the basis of the light control signal, and may have the same frequency as that of the light control signal. Also, in an example embodiment, the duty ratio of each of the photo control signals PG1-PG4 may be greater than 1/2 of the duty ratio of the light control signal by a calibration operation for optimizing the duty ratio of the light control signal, as described below with reference to FIGS. 6 to 8.

Figure 6:
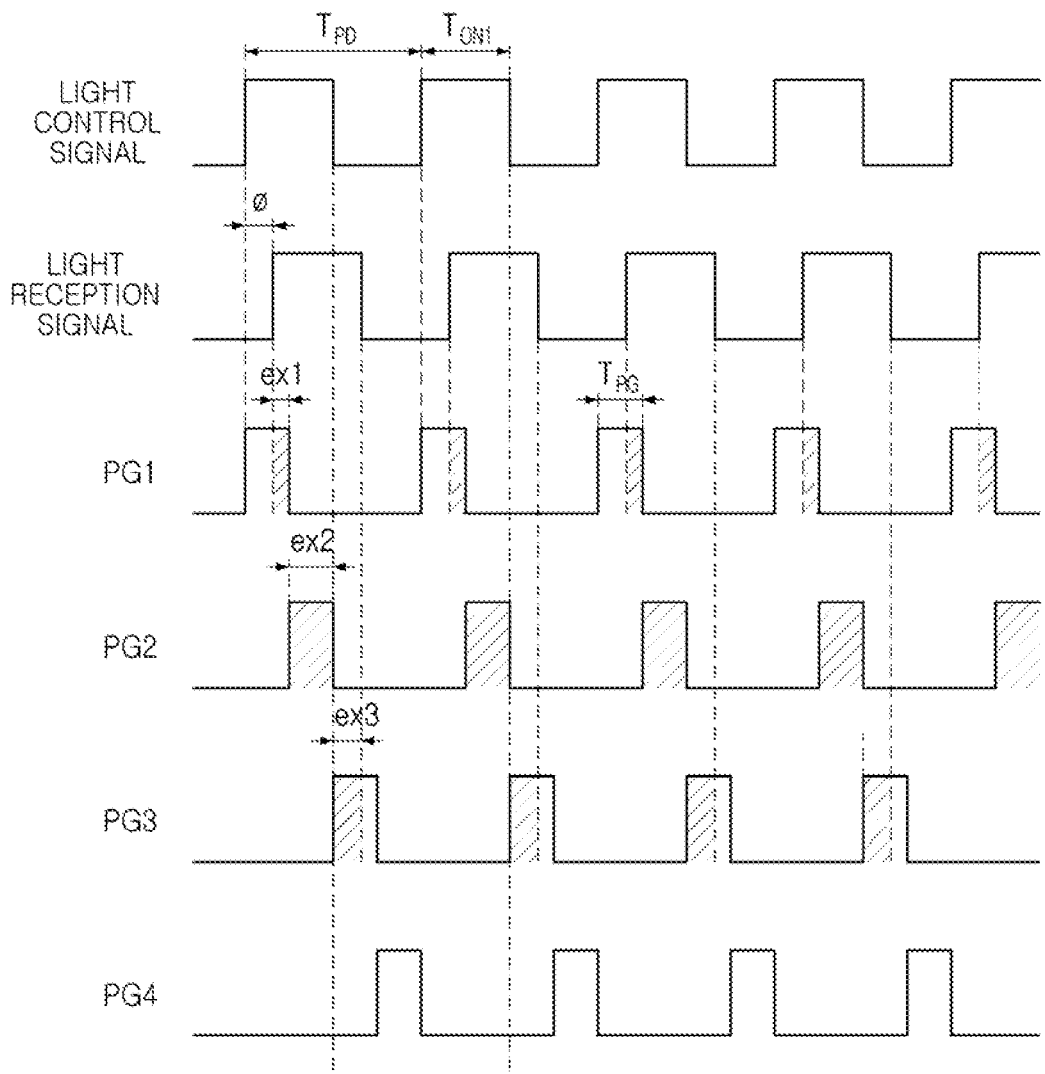
FIGS. 6 to 8 are diagrams illustrating an operation of an imaging device according to an example embodiment.
Figure 7:
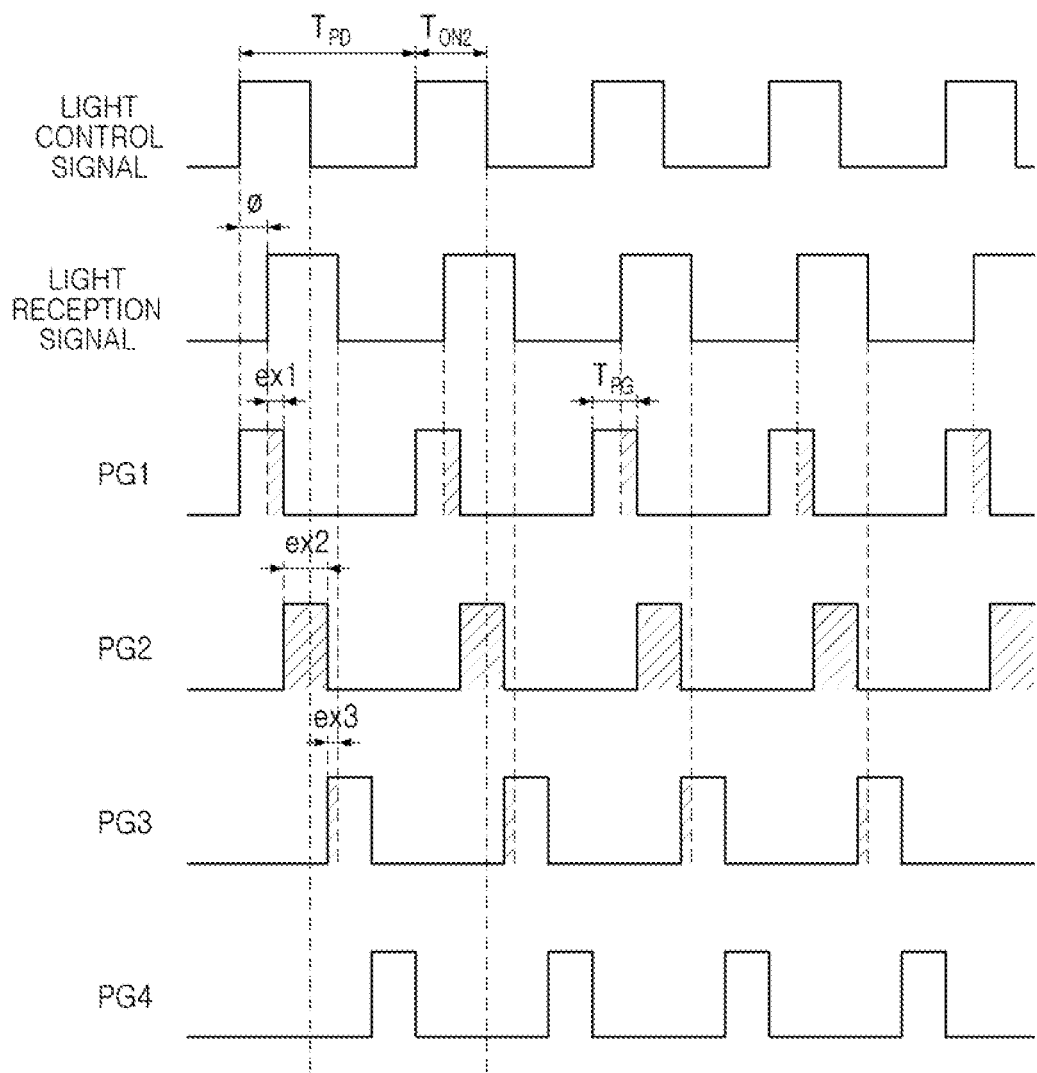
Figure 8:
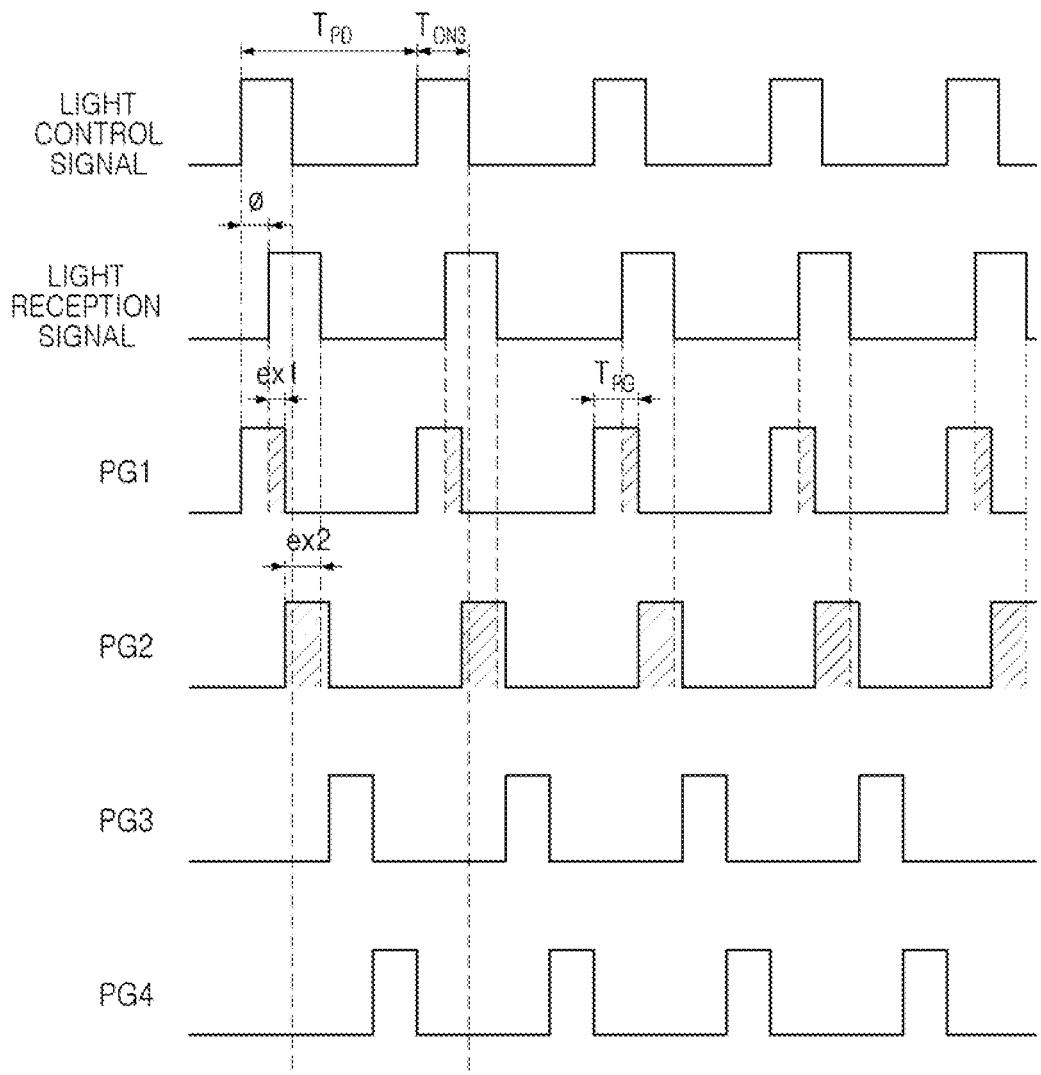

FIGS. 6 to 8 are diagrams illustrating an operation of an imaging device according to an example embodiment.

Referring to FIGS. 6 to 8, photo control signals PG1-PG4 input to a pixel PX and a light control signal input to a light source may have the same frequency. The photo control signals PG1 to PG4 may have a phase difference of 0 degrees, 90 degrees, 180 degrees, and 270 degrees on the basis of the light control signal.

The light control signal input to the light source of the imaging device and a light reception signal (which is generated from light that is reflected from the subject) and input to a pixel array of the imaging device may have a predetermined phase difference φ. The phase difference φ may be determined depending on raw data determined according to exposure times ex1-ex3 at which the photo control signals PG1-PG4 overlap the light reception signal. In an example embodiment, the phase difference φ may be determined as in Equation 2, below. In Equation 2, "A1" to "A4" indicate raw data respectively output by the first to fourth pixel circuits PC1-PC4.

$$\varphi = \arctan\frac{A2 - A4}{A1 - A3} \qquad \text{[Equation 2]}$$

Depth data to the subject depending on the phase difference φ may be determined as described above with reference to Equation 1.

Referring to the basic example in FIG. 6, the duty ratio of each of the photo control signals PG1-PG4 may be set to be 1/2 of the duty ratio of the light control signal, e.g., a ratio between a period $T_{PD}$ and a first turn-on time Tom (in which a light emitting device of the light source actually outputs light) may be 50%, i.e., a duty ratio of 50%, in which case the duty ratio of each of the photo control signals PG1 to PG4 may be set to be 1/2 thereof, i.e., 25%. However, when the imaging device is driven with the light control signal and the photo control signals PG1-PG4 in this manner, harmonic distortion (in which a fundamental frequency component is reinforced or canceled by multiple components of the frequency of the light control signal) may occur, and accuracy of depth data generated by the imaging device may degrade. For example, the falling edge of the light control signal may align with the falling edge of one or more of the photo control signals PG1-PG4.

In an example embodiment, by performing a calibration operation for optimizing the duty ratio of the light control signal while maintaining the duty ratio of the photo control signals PG1-PG4 as is, harmonic distortion may be reduced and performance of the imaging device may improve. Accordingly, after the calibration operation is completed, the duty ratio of the light control signal may have a value different from twice the duty ratio of each of the photo control signals PG1-PG4.

In an example embodiment, after the calibration operation is completed, the photo control signals PG1-PG4 may each have a same frequency the light control signal, may have a respective phase difference of 0 degrees, 90 degrees, 180 degrees, and 270 degrees relative to the light control signal, and duty ratio of the photo control signals PG1-PG4 may be determined such that a falling edge of each of the photo control signals PG1-PG4 occurs at a time point that is different from that of a falling edge of the light control signal. This is illustrated in FIGS. 7 and 8.

For example, referring to FIGS. 7 and 8, the duty ratio of each of the photo control signals PG1-PG4 may be maintained as is, e.g., at 25% as described above with reference to FIG. 6, while the duty ratio of the light control signal may be 40% in the example embodiment described with reference to FIG. 7 and may be 33.3% in the example embodiment described with reference to FIG. 8.

Since the duty ratio of the light reception signal (which is generated from the reflected light) is the same as the duty ratio of the light control signal (which generates the emitted light), exposure times ex1-ex3 (in which the photo control signals PG1-PG4 overlap the light reception signal) may appear differently in the cases described above with reference to FIGS. 6 to 8. Thus, depth data generated by the imaging device may be different in the different cases. In the calibration operation, the depth data generated by the imaging device in each of the light control signals having different duty ratios may be compared with an actual depth between the imaging device and a subject. As a result of the comparison, the light control signal may be configured for the difference between the depth data and the actual depth to have a minimum value.

Figure 9:
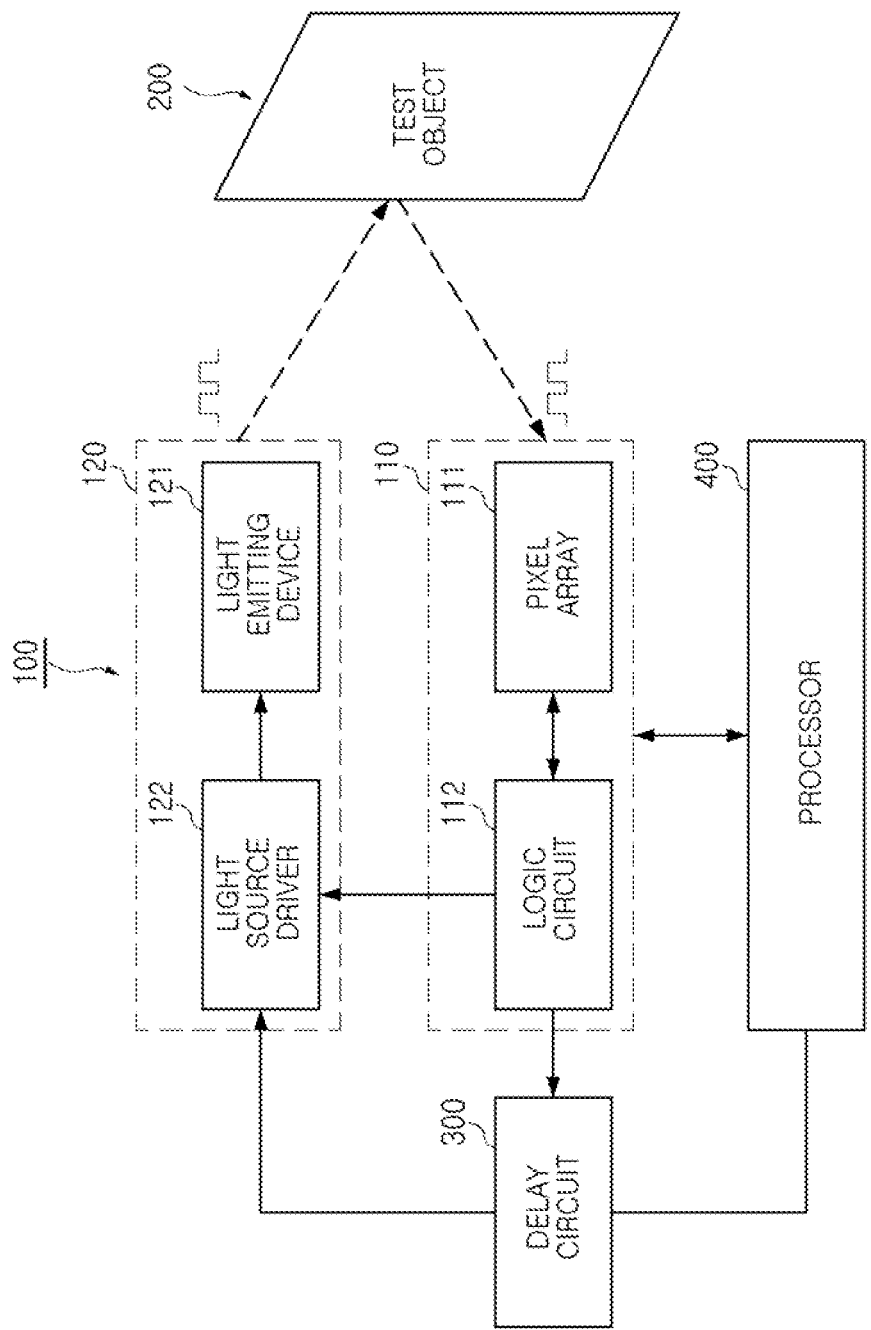
FIG. 9 is a diagram illustrating an operation of an imaging device according to an example embodiment.

FIG. 9 is a diagram illustrating an operation of an imaging device according to an example embodiment.

FIG. 9 illustrates a calibration operation of an imaging device 100 according to an example embodiment. The calibration operation may be performed, e.g., before the imaging device is mounted on an electronic device.

The imaging device 100 may include an image sensor 110, a pixel array 111, a logic circuit 112, and a light source 120. The light source 120 may include a light emitting device 121 and a light source driver 122.

In an example, the imaging device 100 may not include a circuit such as a delay locked loop configured to delay a light control signal, a PWM signal, output by a logic circuit 112 and to input the signal to a light source driver 122. Therefore, for the calibration operation, a delay signal may be generated by delaying the light control signal output by the logic circuit 112 to the light source driver 122 using a delay circuit 300 mounted on a test board mounted along with the imaging device 100. While the calibration operation is performed, the light source 120 may operate according to the delay signal, and the imaging device 100 and the delay circuit 300 may be controlled by an external processor 400.

In another example, the logic circuit 112 of the imaging device 100 includes a circuit such as a delay locked loop, and the calibration operation may be performed without the delay circuit 300. In this case, the calibration operation may be performed even after the imaging device 100 is mounted on an electronic device, and the calibration operation may be performed by an application processor or a central processing unit of the electronic device.

A test object 200 may be used for the calibration operation. The test object 200 may be disposed to be spaced apart from the imaging device 100 by a predetermined distance. A white chart, or the like, may be used as the test object. During the calibration operation, the distance between the test object 200 and the imaging device 100 may not change, and the delay circuit 300 may use a delay signal obtained by delaying the light control signal, such that depth data generated by sensing the test object 200 by the imaging device 100 may change.

In the description below, the calibration operation of the imaging device will be described in greater detail with reference to FIG. 10.

Figure 10:
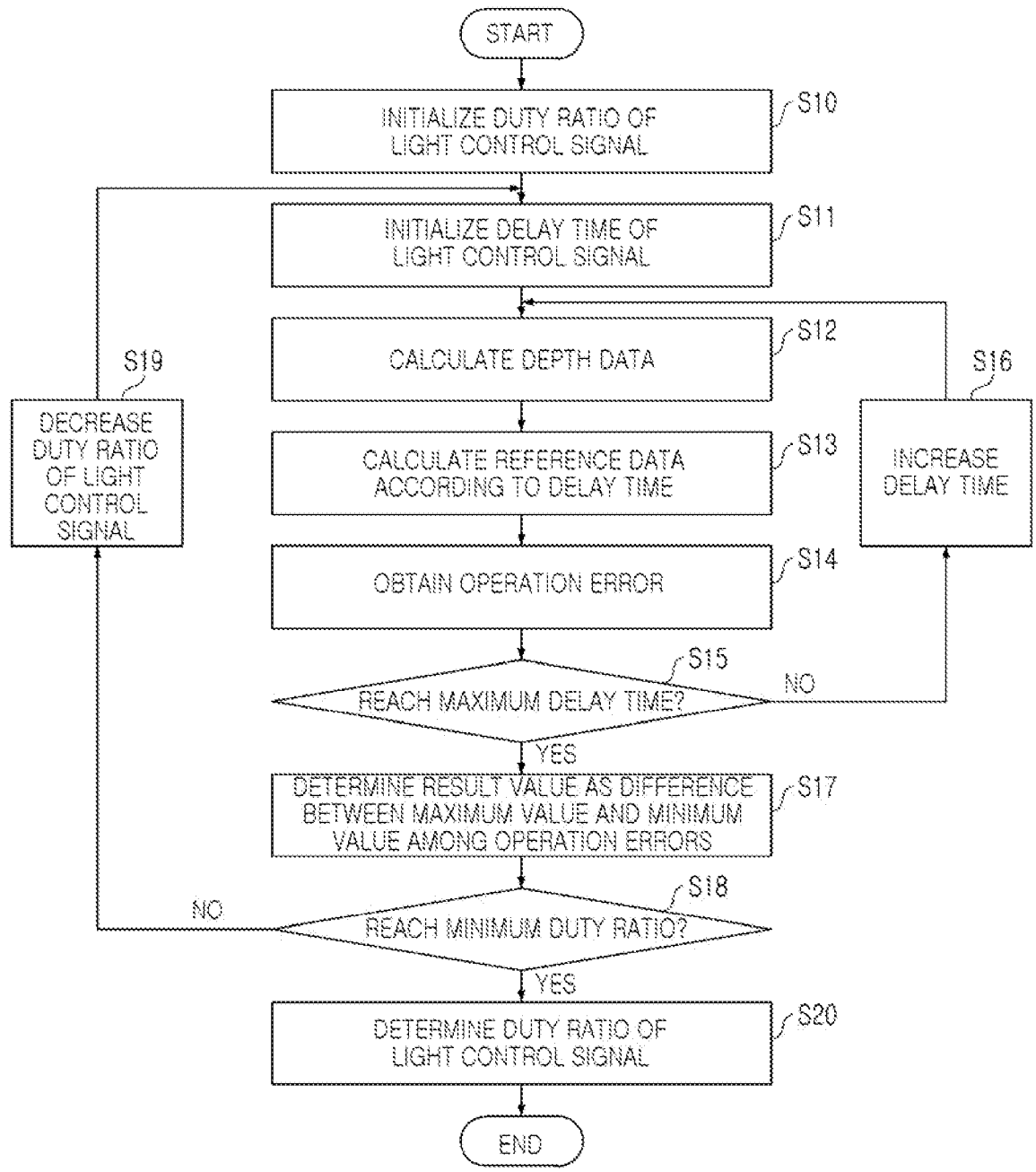
FIG. 10 is a flowchart illustrating an operation of an imaging device according to an example embodiment.

FIG. 10 is a flowchart illustrating an operation of an imaging device according to an example embodiment.

Referring to FIG. 10, the calibration operation of the imaging device 100 in an example embodiment may start with initializing the duty ratio of the light control signal by the logic circuit 112 (S10). As described above, the light control signal may be a signal that the logic circuit 112 outputs to the light source driver 122, and may be a PWM signal having a predetermined frequency. In an example embodiment, in operation S10, the duty ratio of the light control signal may be initialized to 50%.

When the duty ratio of the light control signal is initialized, the delay time of the light control signal may be initialized (S11). In an example embodiment, the delay circuit 300 may initialize the delay time in response to a control command from the processor 400. As the delay time is initialized, the light control signal output by the logic circuit 112 may be input to the light source driver 122 as is.

The light source driver 122 may drive the light emitting device 121 using the light control signal, and the image sensor 110 may calculate depth data of the test object 200 using the light reception signal (which is generated from the light that is reflected from the test object 200) while the light emitting device 121 operates (S12). The depth data calculated in operation S12 may include information indicating a distance between the imaging device 100 and the test object 200.

The processor 400 may calculate reference data according to the delay time (S13). When the light source driver 122 drives the light emitting device 121 in response to a delay signal in which a predetermined delay time is reflected in the light control signals, the reference data may be determined by a delay phase difference obtained by adding a delay time to a phase difference between the light control signal and the light reception signal.

The processor 400 may obtain an operation error by comparing the depth data obtained in operations S12 and S13 with the reference data (S14). In an example embodiment, the operation error may be a difference between the depth data and the reference data. The processor 400, having obtained the operation error, may determine whether the delay time reflected in the delay signal is a maximum delay time (S15). As a result of the determination in operation S15, when the delay time has not reached a maximum delay time, the processor 400 may control the delay circuit 300 to increase the delay time (S16), and may repeatedly execute operations S12 to S14. The operations S12 to S14 may be repeatedly executed until the delay time reaches the maximum delay time, and thus the processor 400 may obtain a plurality of operation errors using the delay signals having different delay times.

The maximum delay time may be determined according to a frequency of the light control signal. In an example embodiment, the processor 400 may increase the delay time by adding a unit time to the delay time determined by the delay circuit 300. When it is determined that the delay time reaches the maximum delay time or exceeds the maximum delay time as a result of adding the unit time to the delay time, the processor 400 may determine the difference between the maximum value and the minimum value among the plurality of operation errors as a result value. (S17). The result value determined in operation S17 may exhibit how large a deviation is in the operation errors.

When operation S17 is executed, the processor 400 may determine that performance evaluation for the light control signal having a duty ratio initialized in operation S10, a duty ratio of 50%, e.g., has been completed. In an example embodiment, the processor 400 may determine whether the duty ratio of the light control signal reaches the minimum duty ratio (S18). The minimum duty ratio of the light control signal may be defined as the duty ratio of the photo control signals input to the pixel array 111 by the logic circuit 112 in the image sensor 110. For example, when the duty ratio of the light control signal is initialized to 50%, the minimum duty ratio of the light control signal may be 25%. Operation S18 may be executed in the imaging device 100 rather than the processor 400.

When it is determined that the duty ratio of the light control signal is greater than the minimum duty ratio as a result of the determination in operation S18, the processor 400 may transmit a control command for reducing the duty ratio of the light control signal to the imaging device 100. The logic circuit 112 of the imaging device 100 may reduce the duty ratio of the light control signal in response to the control command (S19), and operations S11 to S17 may be performed again.

For example, when the initial duty ratio of the light control signal is defined as the first duty ratio and the duty ratio of the photo control signals input to the pixel array 111 by the logic circuit 112 is defined as the second duty ratio, the duty ratio of the light control signal may be changed to a first reference duty ratio smaller than the first duty ratio and greater than the second duty ratio, in operation S19. In operation S11, the delay time of the light control signal may be initialized, and operation errors may be obtained while increasing the delay time of the light control signal until the maximum delay time is reached. Accordingly, a result value corresponding to a difference between the maximum value and the minimum value among the operation errors occurring in the imaging device 100 using the light control signal having the first reference duty ratio may be obtained.

When the first reference duty ratio has not reached the minimum duty ratio of the light control signal (No in S18), the duty ratio of the light control signal may be decreased to a second reference duty ratio smaller than the first reference duty ratio, and operations S11 to S17 may be performed again. The minimum duty ratio of the light control signal may be defined as the second duty ratio. For example, when the duty ratio of the light control signal is initialized to 50%, the minimum duty ratio of the light control signal may be 25%.

As a result of the determination in operation S18, when it is determined that the duty ratio of the light control signal has reached the minimum duty ratio or the duty ratio of the light control signal has decreased to less than the minimum duty ratio as a result of decreasing the duty ratio of the light control signal (Yes in S18), the processor 400 may control the light control signal.

In an example embodiment, the processor 400 may determine the duty ratio of the light control signal (S20) using result values obtained by performing operations S11 to S17 using the light control signals having the first duty ratio, the first reference duty ratio, and the second reference duty ratio, respectively. In an example embodiment, it may be determined that the smaller the result value, the smaller the deviation of the operation error generated in the imaging device 100 may be, and the less the influence of the harmonic noise component reflected in the depth data in the operation of the light source 120 may be. The duty ratio of the light control signal may be determined to be a duty ratio of when the minimum result value among the result values is obtained.

In general, e.g., as described above with reference to FIG. 6, the duty ratio of the light control signal and the duty ratio of the photo control signals may be set to an integer multiple of each other depending on a structure of the imaging device. For example, the light control signal and the photo control signal may have the same duty ratio, or the duty ratio of the light control signal may be twice the duty ratio of the photo control signal.

In an example embodiment, a duty ratio of the light control signal at which a harmonic noise component is minimized may be found by decreasing the duty ratio of the light control signal while maintaining the duty ratio of the photo control signals as is. Accordingly, the duty ratio of the light control signal may not be an integer multiple of the duty ratio of the photo control signal. As an example, the duty ratio of the light control signal may be greater than the duty ratio of the photo control signals and may be less than twice the duty ratio of the photo control signals, e.g., as described above with reference to FIGS. 7 and 8.

In the description below, a method of determining a duty ratio of the light control signal in an imaging device in an example embodiment will be described in detail with reference to FIGS. 11A to 13E.

FIGS. 11A to 13E are diagrams illustrating an operation of an imaging device according to an example embodiment.

FIGS. 11A to 11E illustrate an operation of the imaging device while the light control signal has a first duty ratio, i.e., an initial duty ratio. FIGS. 12A to 12E illustrate an operation of the imaging device while the light control signal has a second duty ratio smaller than the first duty ratio. FIGS. 13A to 13E illustrate an operation of the imaging device while the light control signal has a third duty ratio smaller than the second duty ratio.

Figure 11A:
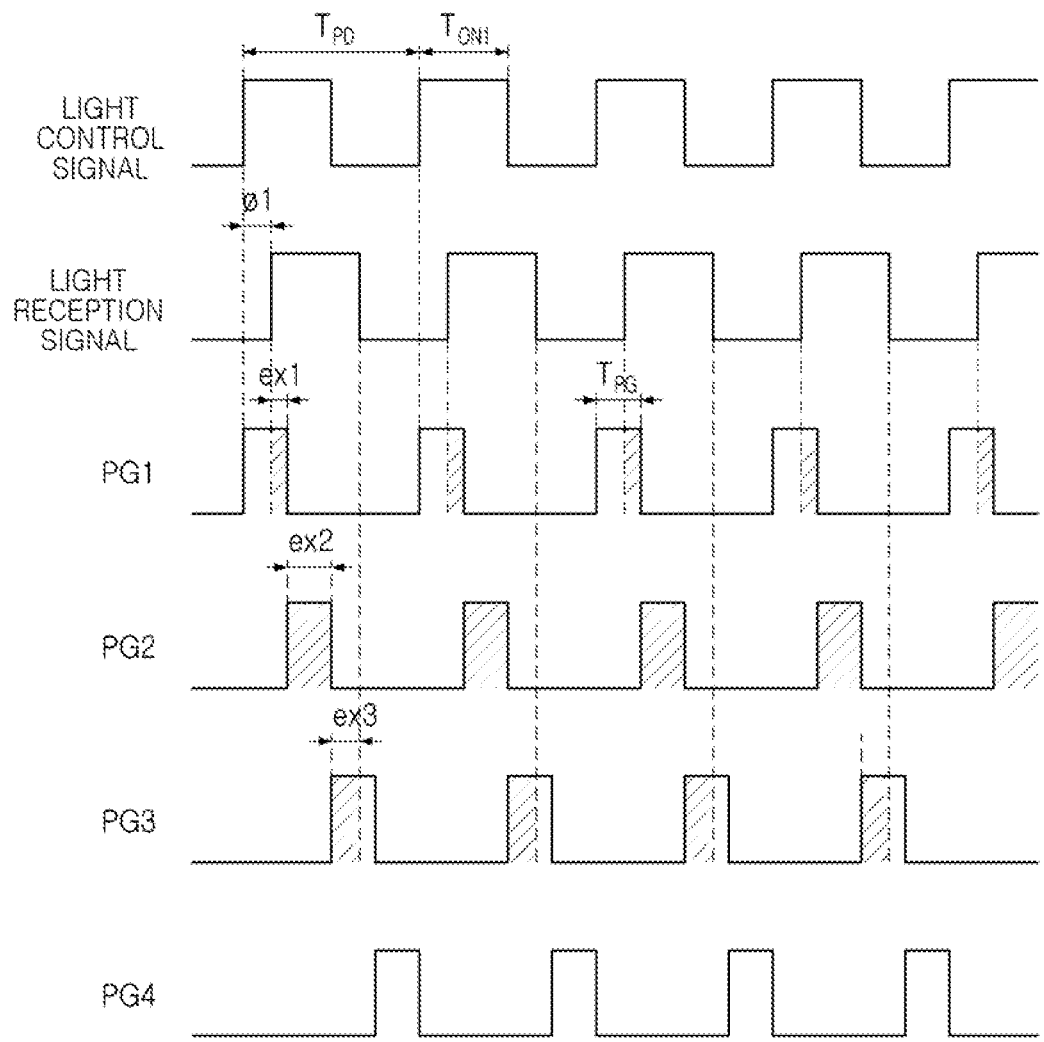
FIGS. 11A to 13E are diagrams illustrating an operation of an imaging device according to an example embodiment.

Referring to FIG. 11A, a first duty ratio, i.e., an initial duty ratio of the light control signal, may be set at 50%. Accordingly, a first turn-on time $T_{ON1}$ (in which the light emitting device actually operates by the light control signal) may be 1/2 of a period $T_{PD}$. The period of each of the photo control signals PG1-PG4 may be the same as the period TPD of the light control signal, and the duty ratio may be 25%, i.e., 1/2 of the first duty ratio. The light reception signal (generated from the reflected light) may have a first phase difference $\varphi 1$ relative to the light control signal (which generates the emitted light).

In the example embodiment described with reference to FIG. 11A, depth data output by the imaging device may be determined according to exposure times ex1-ex3 at which each of the photo control signals PG1-PG4 overlaps the light reception signal. Each of the pixels included in the imaging device may output a pixel signal corresponding to the exposure times ex1-ex3, and the logic circuit may generate first depth data by converting the pixel signal into raw data. The first depth data may be compared with first reference data, an actual distance between a test object, a subject, and the imaging device. The logic circuit of the imaging device or a processor for controlling the imaging device during a calibration operation may generate a first operation error by calculating a difference between the first depth data and the first reference data.

Figure 11B:
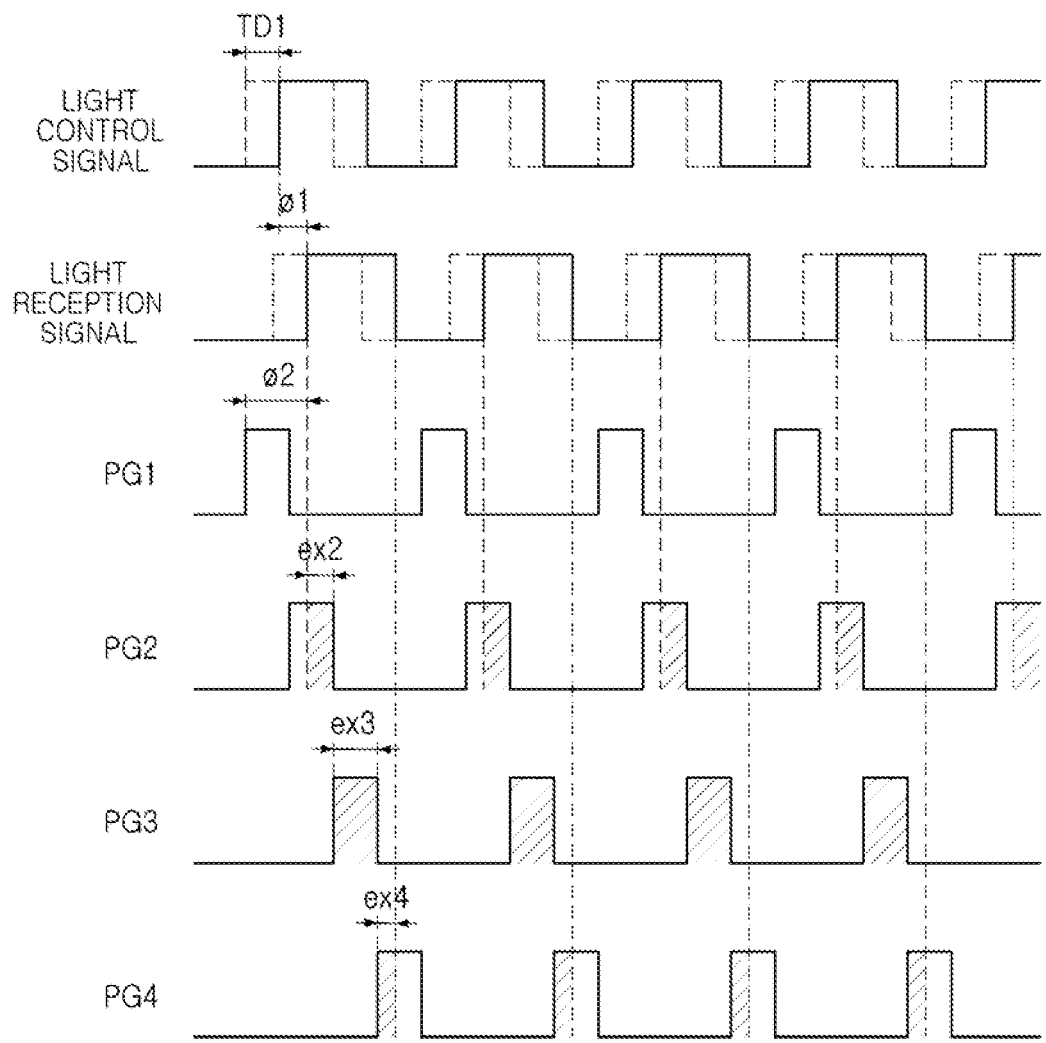

When the first operation error is generated, a predetermined delay time may be reflected in the light control signal. Referring to FIG. 11B, a delay circuit disposed in or externally of the imaging device may generate a delay signal by delaying the light control signal by a first delay time TD1. As the light control signal is delayed by the first delay time TD1, the light reception signal may also be delayed by the first delay time TD1. Accordingly, the first photo control signal PG1 (which is synchronized to have the same phase as that of the light control signal) may have a second phase difference $\varphi 2$ relative to the light reception signal. The second phase difference $\varphi 2$ may be determined as a sum of the first phase difference $\varphi 1$ and the first delay time TD1.

Accordingly, referring to FIG. 11B, exposure times ex2-ex4 at which the photo control signals PG1-PG4 overlap the light reception signal may be different from the example embodiment described with reference to FIG. 11A, which may indicate that the depth data generated by sensing the test object by the imaging device may change without adjusting the actual distance between the imaging device and the test object.

The imaging device may generate second depth data corresponding to the exposure times ex2-ex4, and the processor for controlling the imaging device during the calibration operation may calculate the second reference data using the second phase difference $\varphi 2$. The second reference data may correspond to the distance between the imaging device and the test object when the light control signal and the light reception signal have the second phase difference ($\varphi 2$) while the first delay time TD1 is not reflected in the light control signal. In an example embodiment, the processor may calculate the second reference data by applying the second phase difference $\varphi 2$ into Equation 1. Thus, the second reference data may be a distance between the imaging device and the test object, which may be theoretically calculated using the second phase difference $\varphi 2$.

The logic circuit of the imaging device or the processor may generate a second operation error by calculating a difference between the second depth data and the second reference data. As described above, the second phase difference $\varphi 2$ may be a sum of the first delay time TD1 and the first phase difference $\varphi 1$, and the first phase difference $\varphi 1$ may be calculated using the actual distance between the imaging device and the test object.

Figure 11C:
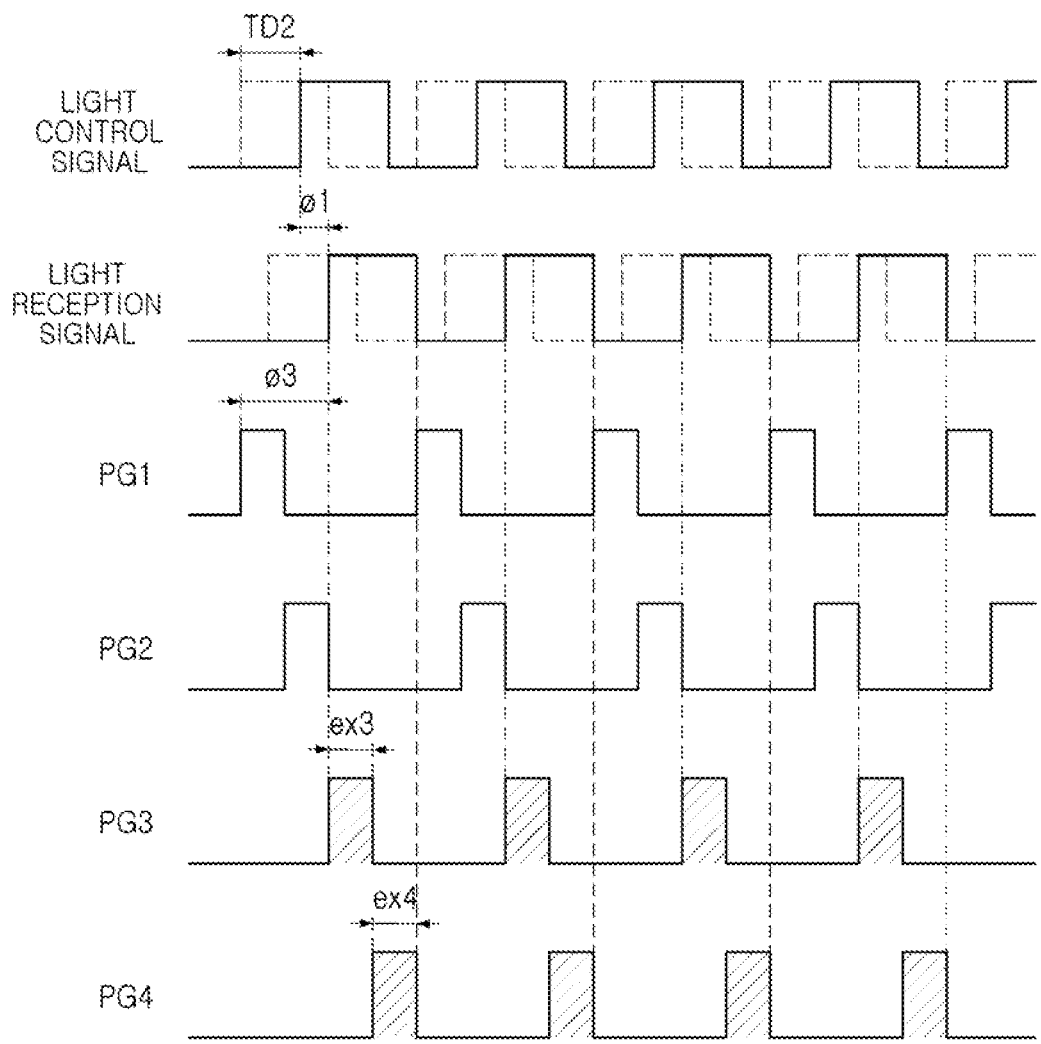

Referring to FIG. 11C, the light control signal may be delayed by a second delay time TD2, and a phase difference between the first photo control signal PG1 and the light reception signal may be defined as a third phase difference $\varphi 3$, i.e., a sum of the second delay time TD2 and the first phase difference $\varphi 1$. Accordingly, referring to FIG. 11C, the exposure times ex3 and ex4 may be different from the example illustrated in FIGS. 11A and 11B. The imaging device may output third depth data, and the processor may calculate third reference data using the third phase difference $\varphi 3$. The logic circuit of the imaging device or the processor may obtain a third operation error by calculating a difference between the third depth data and the third reference data.

In the example embodiments described above with reference to FIGS. 11D and 11E, the light control signal may be respectively delayed by a third delay time TD3 and a fourth delay time TD4. Accordingly, a phase difference between the first photo control signal PG1 and the light reception signal may increase to a fourth phase difference $\varphi 4$ and a fifth phase difference $\varphi 5$, respectively, and accordingly, the exposure times ex1-ex4 be varied. The processor for controlling the imaging device may generate fourth and fifth reference data corresponding to the fourth phase difference $\varphi 4$ and the fifth phase difference $\varphi 5$. According to the exposure times ex1-ex4, the imaging device may output fourth depth data and fifth depth data. The logic circuit of the imaging device or the processor may obtain a fourth operation error and a fifth operation error by calculating a difference between the fourth depth data and the fourth reference data, and a difference between the fifth depth data and the fifth reference data.

In an example embodiment, when a delay time longer than the fourth delay time TD4 is applied to the light control signal, the delay time may exceed the period TPD of the light control signal. Therefore, when the imaging device operates with the delay signal to which the fourth delay time TD4 is reflected and obtains the fifth operation error, the processor may select the maximum value and the minimum value among the first to fifth operation errors, and may determine a difference therebetween as a first result value. The first result value determined by the processor may be a value for evaluating performance of the imaging device when the light control signal has the first duty ratio.

Figure 12A:
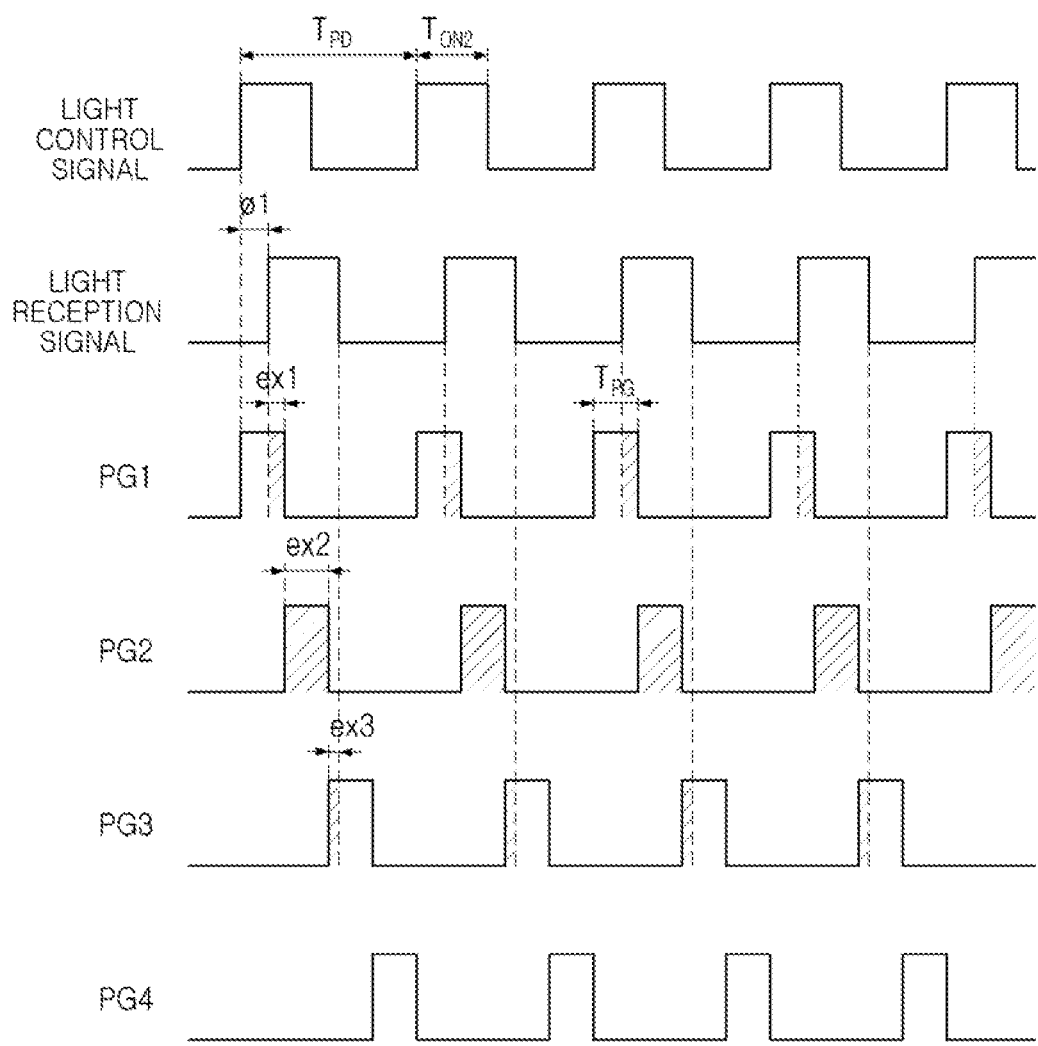

Referring to FIG. 12A, the duty ratio of the light control signal may be decreased to a second duty ratio smaller than the first duty ratio, i.e., smaller than the initial duty ratio. In an example embodiment, the imaging device may reduce the duty ratio of the light control signal to the second duty ratio in response to a control command received from a processor. In an example embodiment, the second duty ratio may be 40%. A period of each of the photo control signals PG1-PG4 may be the same as the period TPD of the photo control signal, and the duty ratio may be 25%, i.e., 1/2 of the first duty ratio. Therefore, the duty ratio of the light control signal may not be determined as an integer multiple of the duty ratio of the photo control signals PG1-PG4, and may be less than twice the duty ratio of the photo control signals PG1-PG4 in an example embodiment. Since the distance between the imaging device and the test object does not change, the light reception signal may have a first phase difference $\varphi 1$ with the light control signal.

In the example embodiment described with reference to FIG. 12A, depth data output by the imaging device may be determined according to exposure times ex1-ex3 at which each of the photo control signals PG1-PG4 overlap the light reception signal. However, since the duty ratio of the light control signal is adjusted to the second duty ratio, the exposure times ex1-ex3 in the example embodiment described with reference to FIG. 12A may be different from the exposure times ex1-ex3 in the example embodiment described with reference to FIG. 11A. Accordingly, the first depth data may be generated differently from the example embodiment described with reference to FIG. 11A, and the first operation error may also have a different value.

Once the first operation error is obtained, the processor may apply the first delay time TD1 to the light control signal. The first delay time TD1 in the example embodiment described with reference to FIG. 12B may be the same as the first delay time TD1 in the example embodiment described with reference to FIG. 11B. Accordingly, a phase difference between the first photo control signal PG1 and the light reception signal may be the second phase difference $\varphi 2$, and the second reference data calculated by the processor may be the same as the example embodiment described with reference to FIG. 11B.

Since the duty ratio of the light control signal is adjusted to the second duty ratio, however, the exposure times ex2 and ex3 at which the photo control signals PG1-PG4 overlap the light reception signal may be different from the example embodiment described with reference to FIG. 11B. Accordingly, the second depth data generated by the imaging device may be different from the example embodiment described with reference to FIG. 11B, and the second operation error may also be different.

Figure 11D:
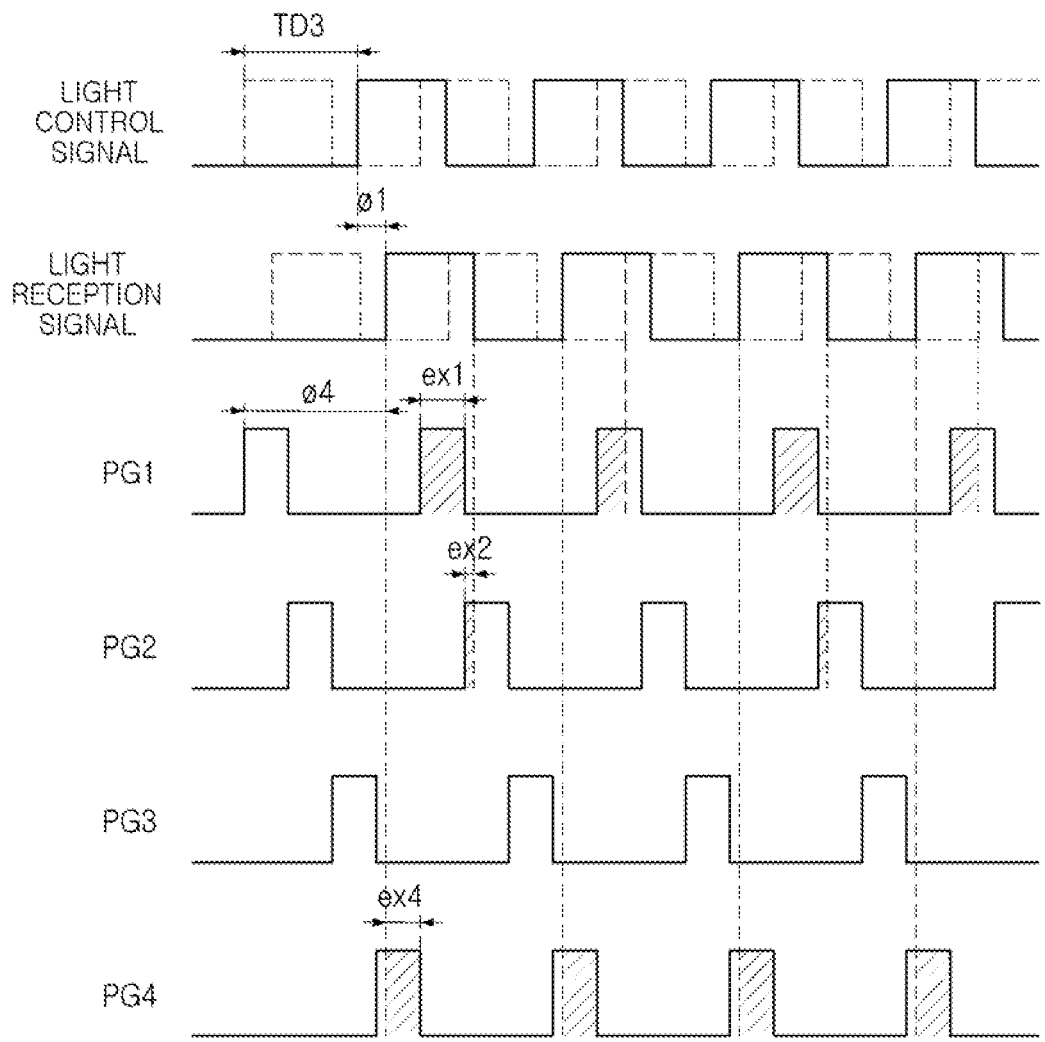
Figure 11E:
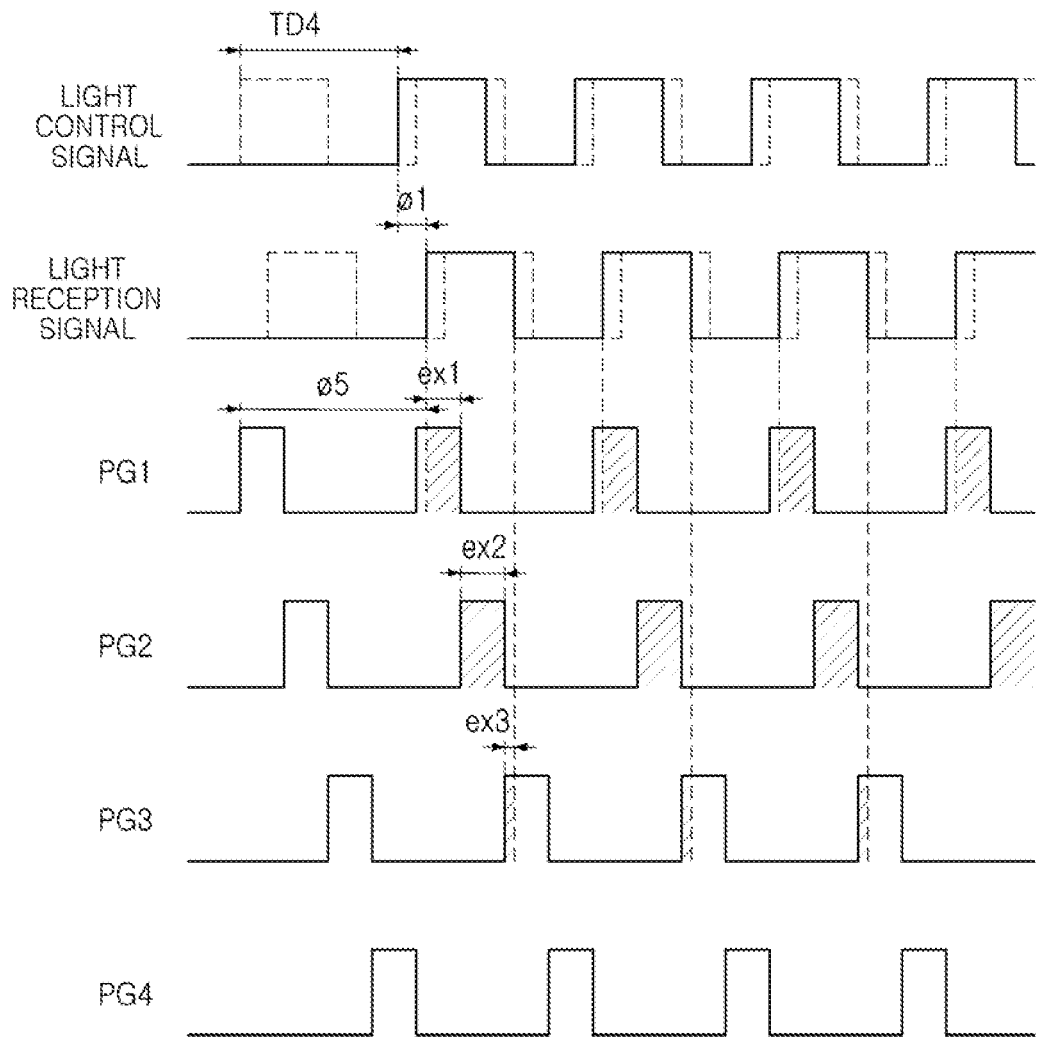
Figure 12B:
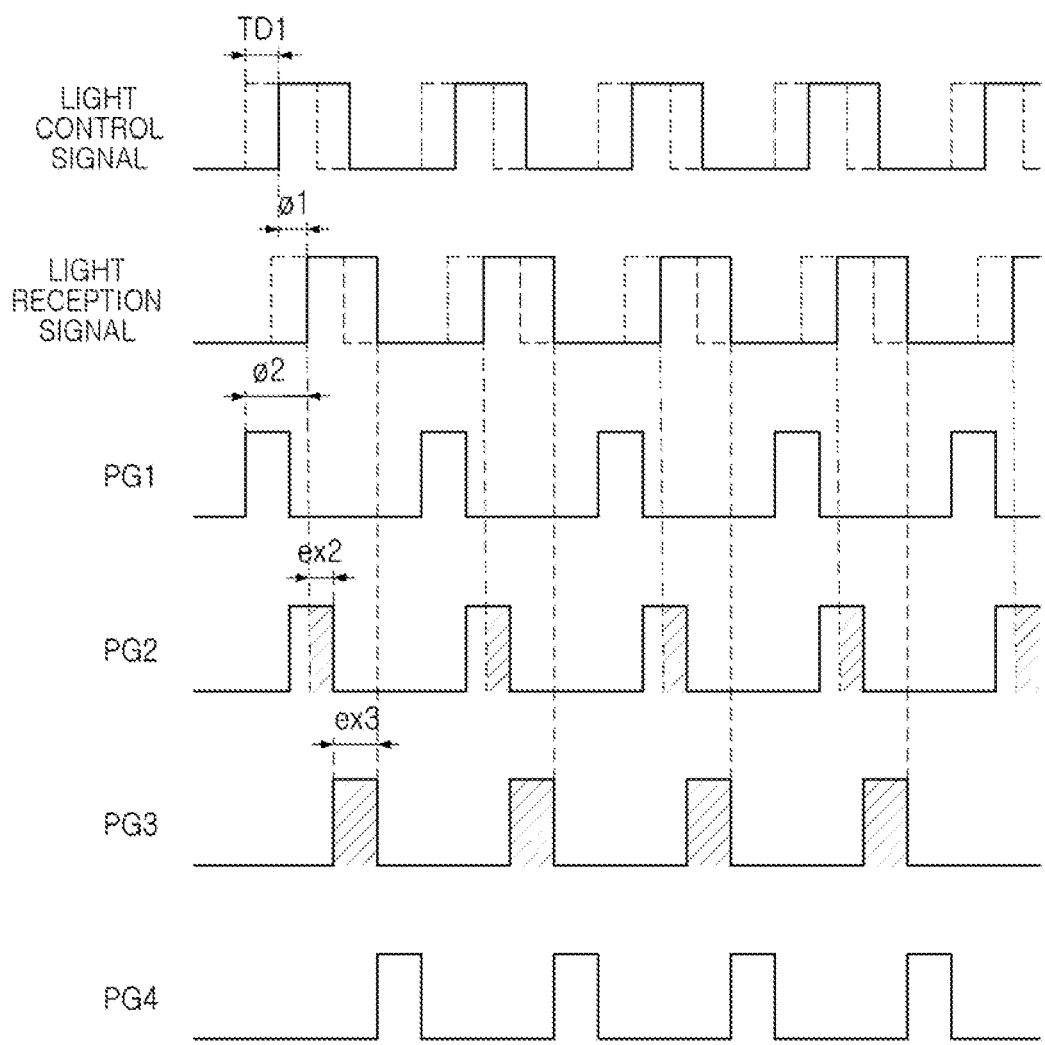
Figure 12C:
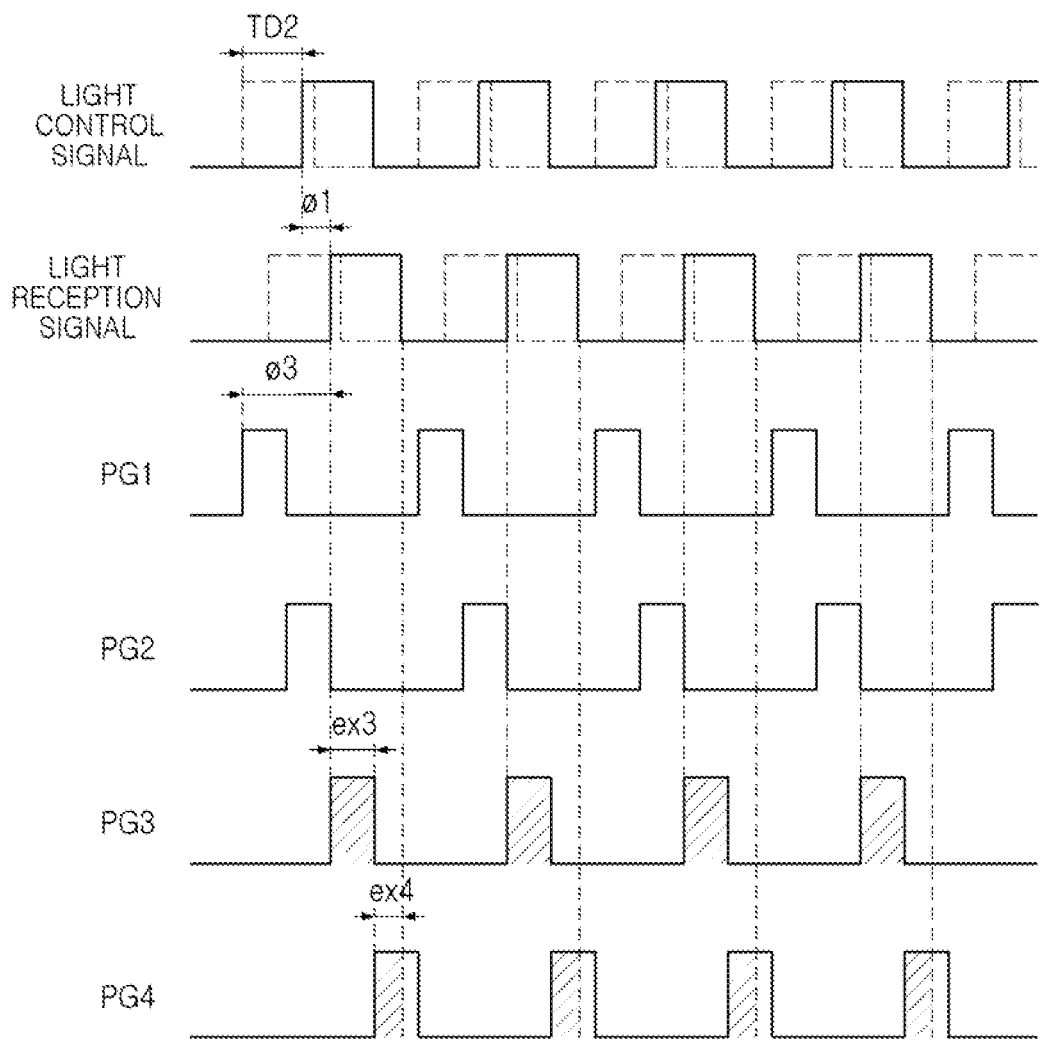
Figure 12D:
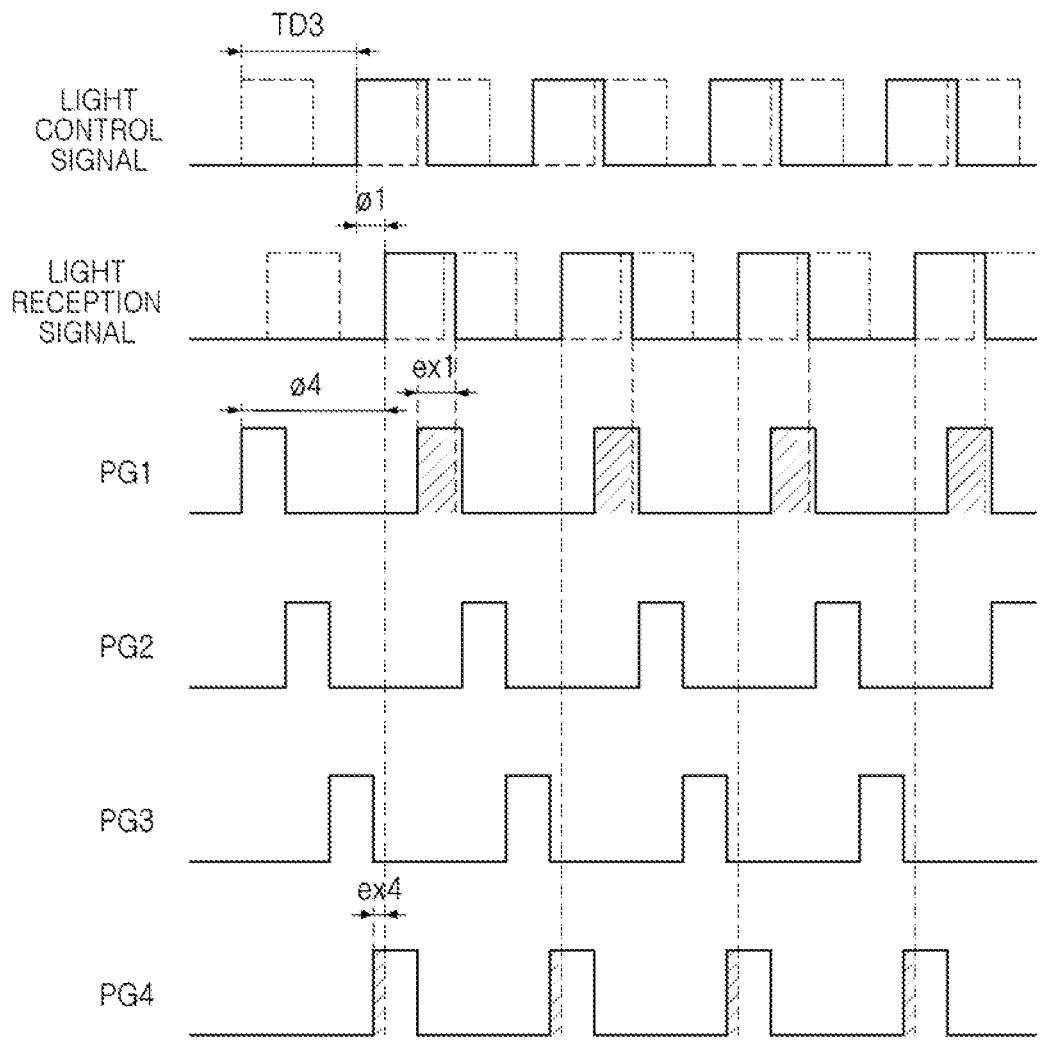
Figure 12E:
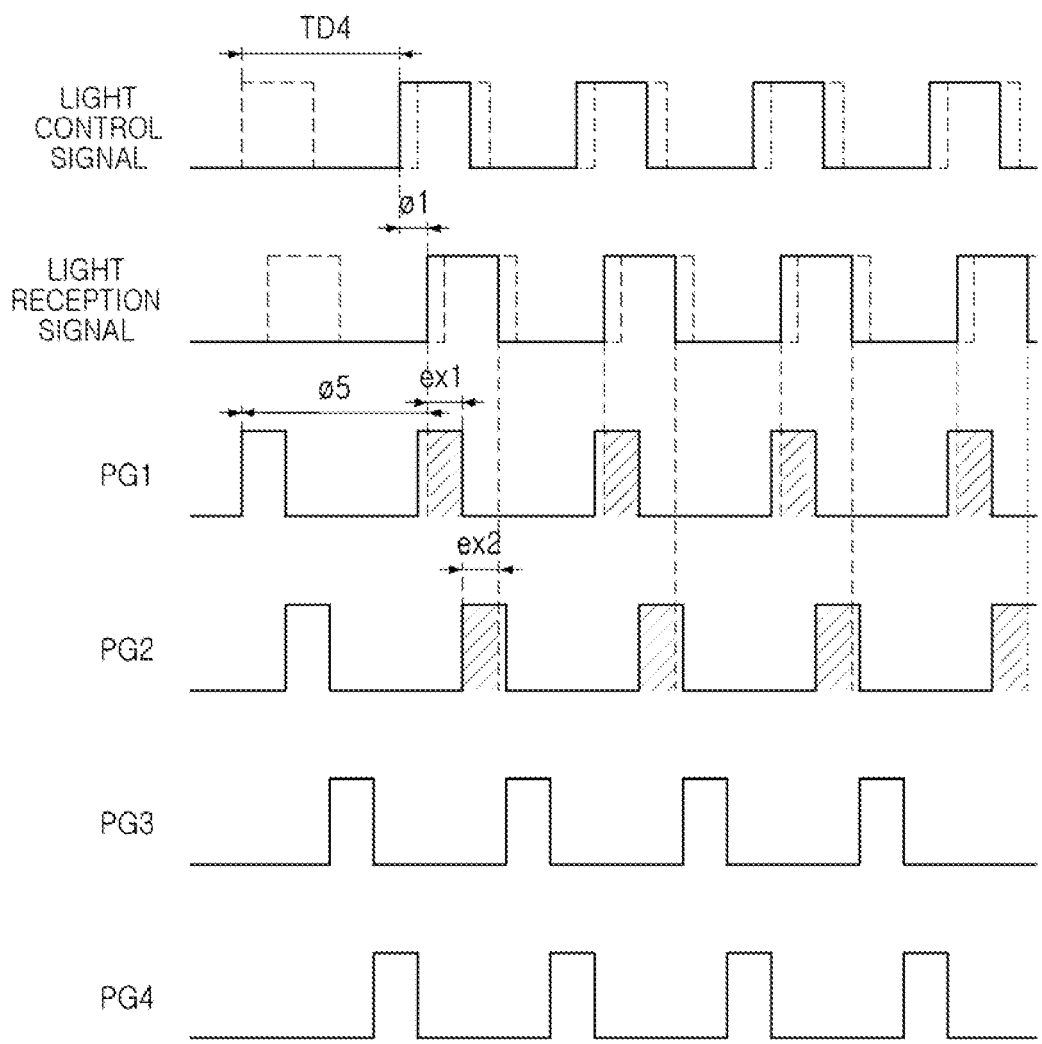

Referring to FIGS. 12C to 12E, the light control signals may be delayed by a second delay time TD2, a third delay time TD3, and a fourth delay time TD4, respectively, and the second to fourth delay times TD2-TD4 may be the same as the second to fourth delay times TD2-TD4 described in the aforementioned example embodiment with reference to FIGS. 11C to 11E. Since the light control signal has a second duty ratio, however, the exposure times ex1-ex4 may be different from the example embodiments described with reference to FIGS. 11C to 11E. Accordingly, the third to fifth depth data and at least one of the third to fifth operation errors may be calculated as different values.

As described above, the fourth delay time TD4 may correspond to the maximum delay time. Therefore, when the imaging device operates with the delay signal to which the fourth delay time TD4 is reflected and obtains the fifth operation error, the processor may select the maximum value and the minimum value among the first to fifth operation errors, and may determine the difference therebetween as a second result value. The second result value may be for evaluating performance of the imaging device when the light control signal has the second duty ratio.

Figure 13A:
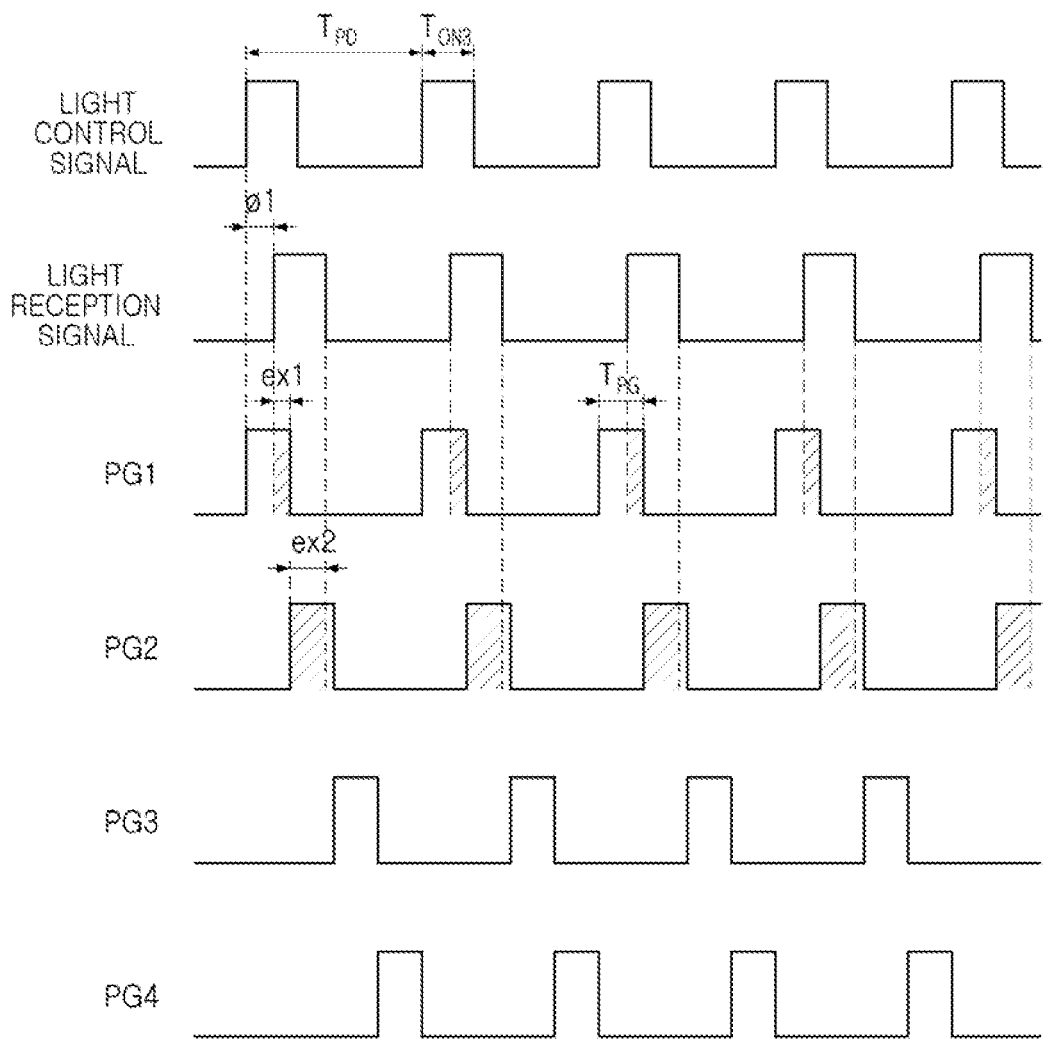
Figure 13B:
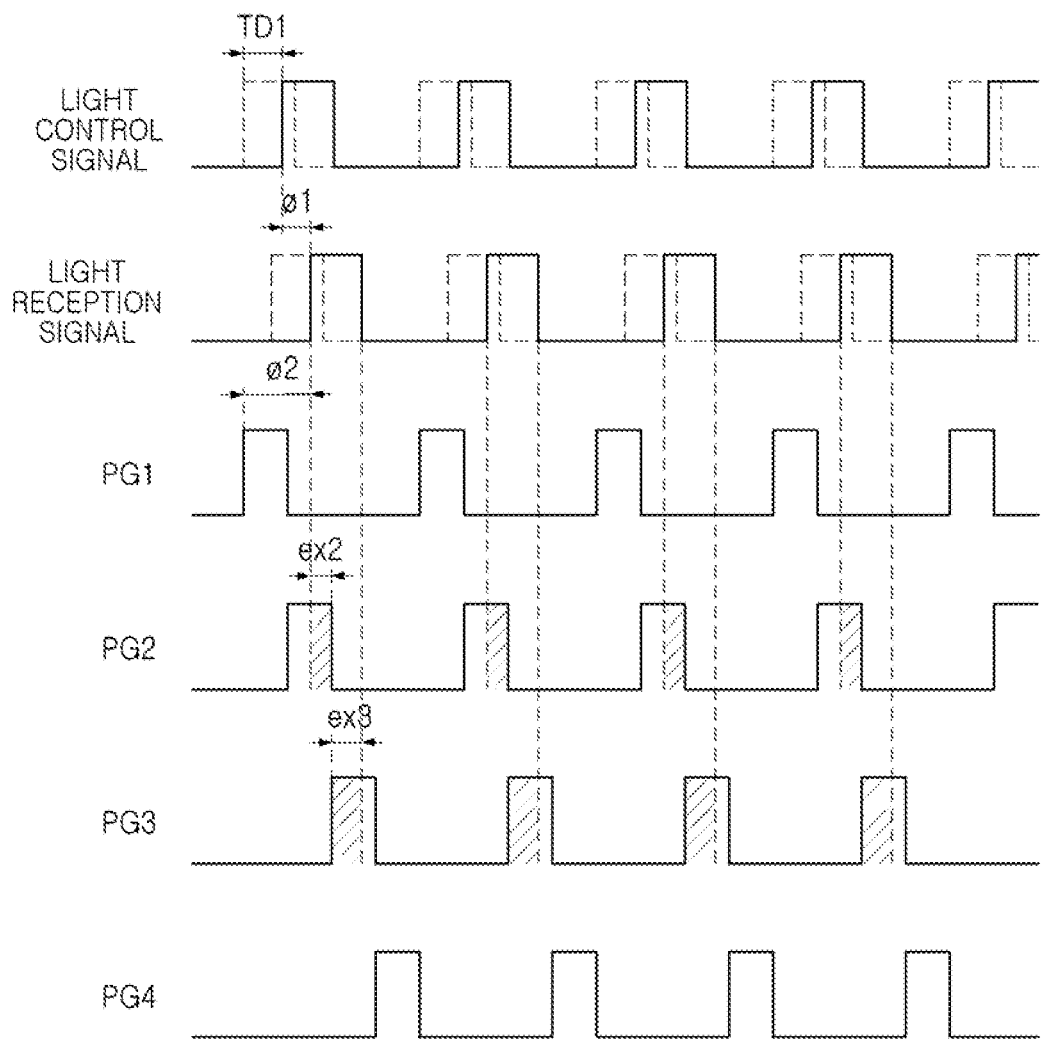

Referring to FIG. 13A, the duty ratio of the light control signal may be decreased to a third duty ratio smaller than the second duty ratio. In an example embodiment, the imaging device may set the duty ratio of the light control signal to the third duty ratio in response to a control command received from a processor. In an example embodiment, the third turn-on time $T_{ON3}$ may be 1/3 of the period TPD of the light control signal, and the third duty ratio may be about 33.3%. The period of each of the photo control signals PG1 to PG4 may be the same as the period TPD of the photo control signal, and the duty ratio may be 25%, i.e., 1/2 of the first duty ratio. Accordingly, the duty ratio of the light control signal may be determined as a value other than an integer multiple of the duty ratio of the photo control signals PG1-PG4. Since the distance between the imaging device and the test object does not change, the light reception signal and the light control signal may have the first phase difference φ1.

In the example embodiment described with reference to FIG. 13A, the depth data output by the imaging device may be determined according to exposure times ex1 and ex2 at which each of the photo control signals PG1-PG4 overlap the light reception signal overlap. Since the light control signal has a third duty ratio, however, the first depth data calculated from the exposure times ex1 and ex2 in the example embodiment described with reference to FIG. 13A may be different from the first depth data calculated from the exposure times ex1-ex3 in the example embodiments illustrated in FIGS. 11A and 12A. Accordingly, the first operation error corresponding to the example in which there is no delay time may also be different from the example embodiments described with reference to FIGS. 11A and 12A.

Once the first operation error is obtained, the processor may apply the first delay time TD1 to the light control signal. The first delay time TD1 in the example embodiment described with reference to FIG. 13B may be the same as the first delay time TD1 in the example embodiments illustrated in FIGS. 11B and 12B. Accordingly, the phase difference between the first photo control signal PG1 and the light reception signal may be the second phase difference φ2, and the second reference data calculated by the processor may be the same as the example embodiments described with reference to FIGS. 11B and 12B.

Since the light control signal has a third duty ratio, however, exposure times ex2 and ex3 at which the photo control signals PG1-PG4 overlap the light reception signal may be different from the examples illustrated in FIGS. 11B and 12B. Accordingly, the second depth data and the second operation error generated by the imaging device may also be different from the example embodiments described with reference to FIGS. 11B and 12B.

Figure 13C:
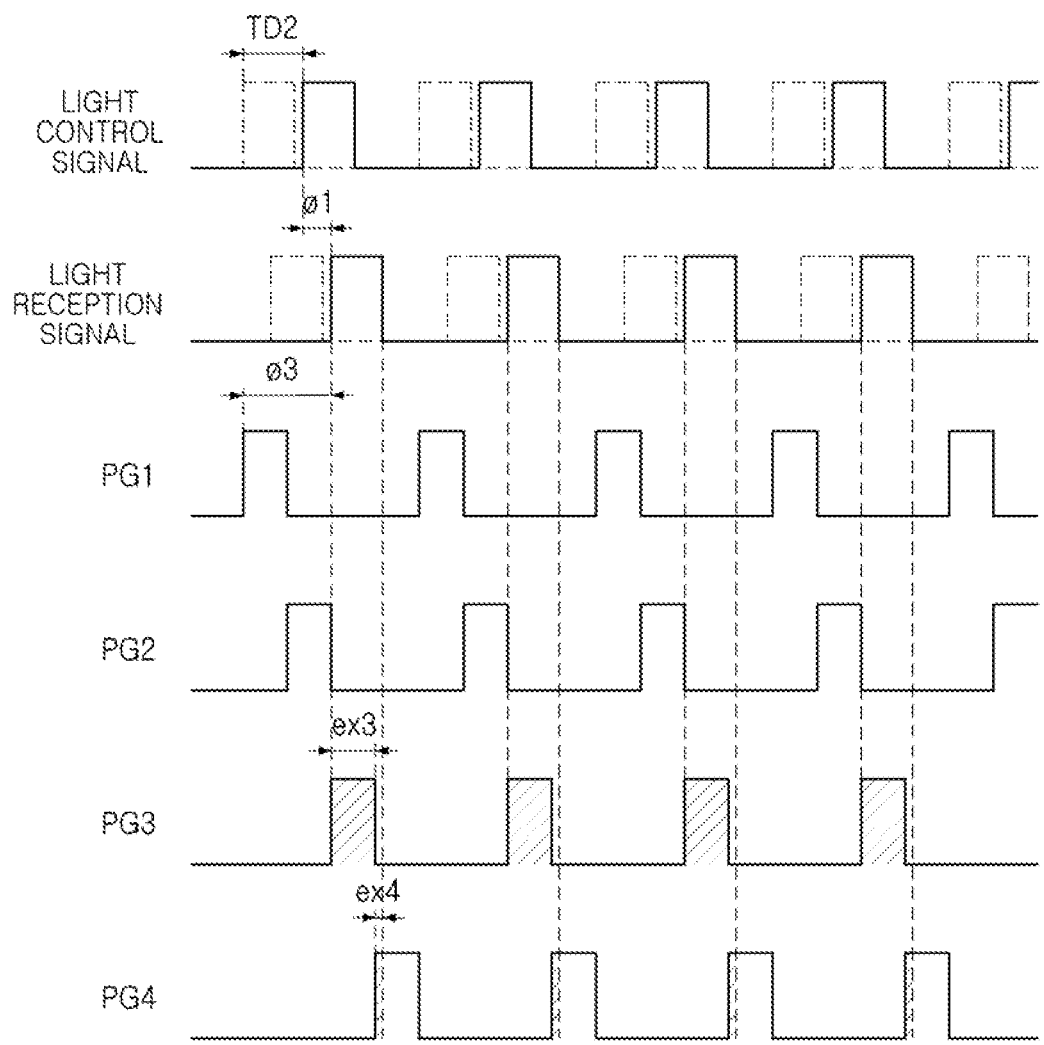
Figure 13D:
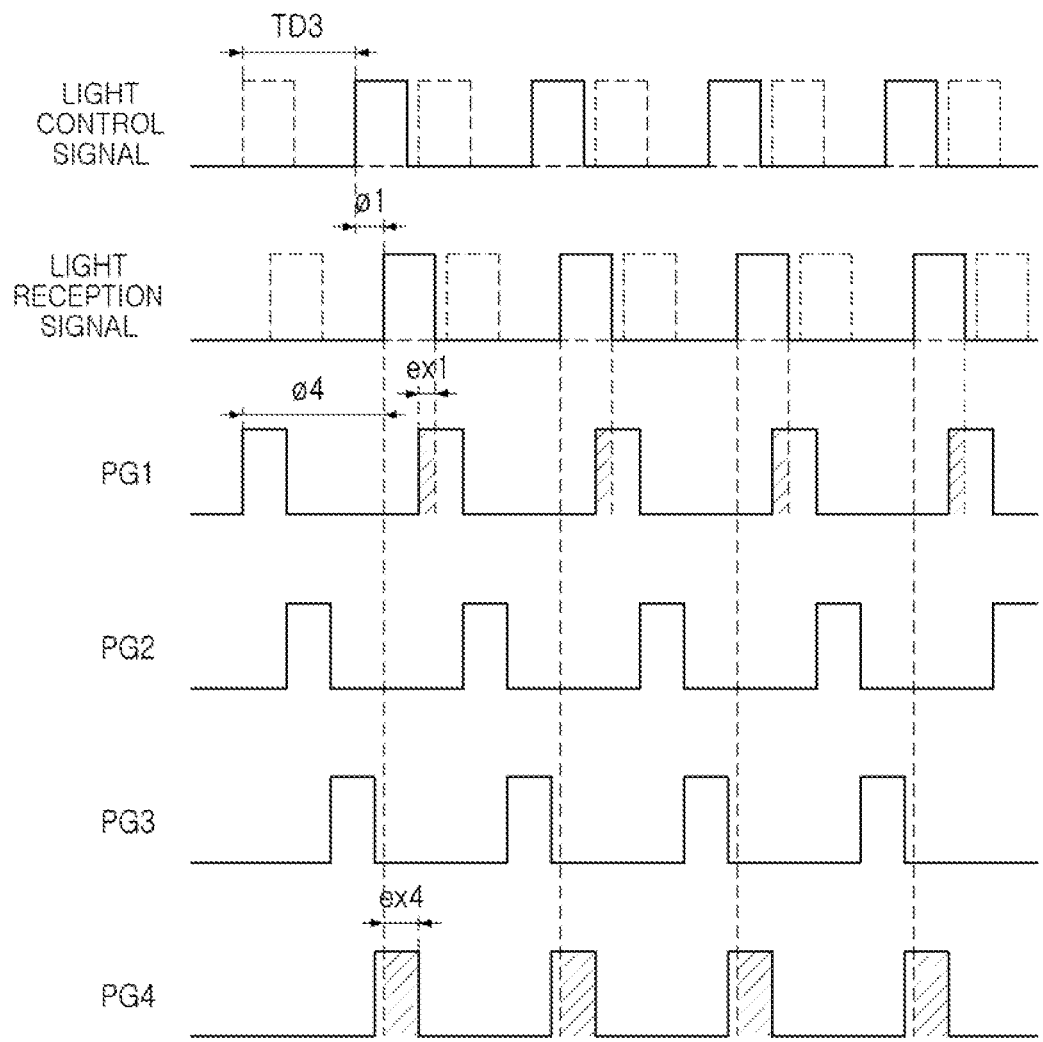
Figure 13E:
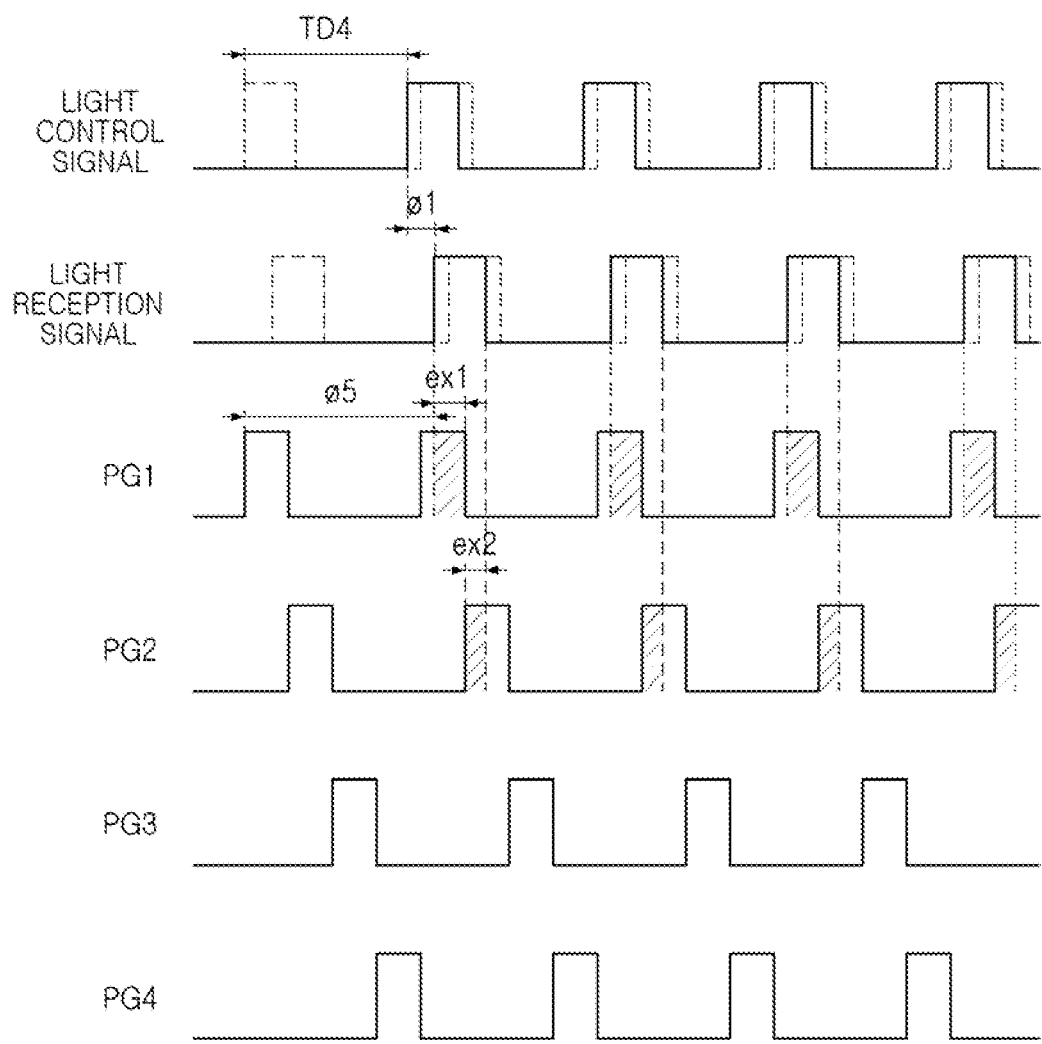

Referring to FIGS. 13C to 13E, the light control signals may be delayed by a second delay time TD2, a third delay time TD3, and a fourth delay time TD4, respectively, and the second to fourth delay times TD2-TD4 may be the same as the second to fourth delay times TD2-TD4 described with reference to FIGS. 11C to 11E and FIGS. 12C to 12E. Since the light control signal has a second duty ratio, however, at least one of the third to fifth depth data and the third to fifth operation errors may be calculated differently.

The fourth delay time TD4 may correspond to the maximum delay time. Therefore, when the imaging device operates with the delay signal to which the fourth delay time TD4 is reflected and obtains the fifth operation error, the processor may select the maximum value and the minimum value among the first to fifth operation errors, and may determine a difference therebetween as a third result value. The third result value may be a value for evaluating performance of the imaging device when the light control signal has the third duty ratio.

As an example, the processor may select a smallest result value among the first to third result values, and may determine a duty ratio corresponding to the selected result value as a final duty ratio of the light control signal. In the description below, the configuration will be described in greater detail with reference to FIG. 14.

Figure 14:
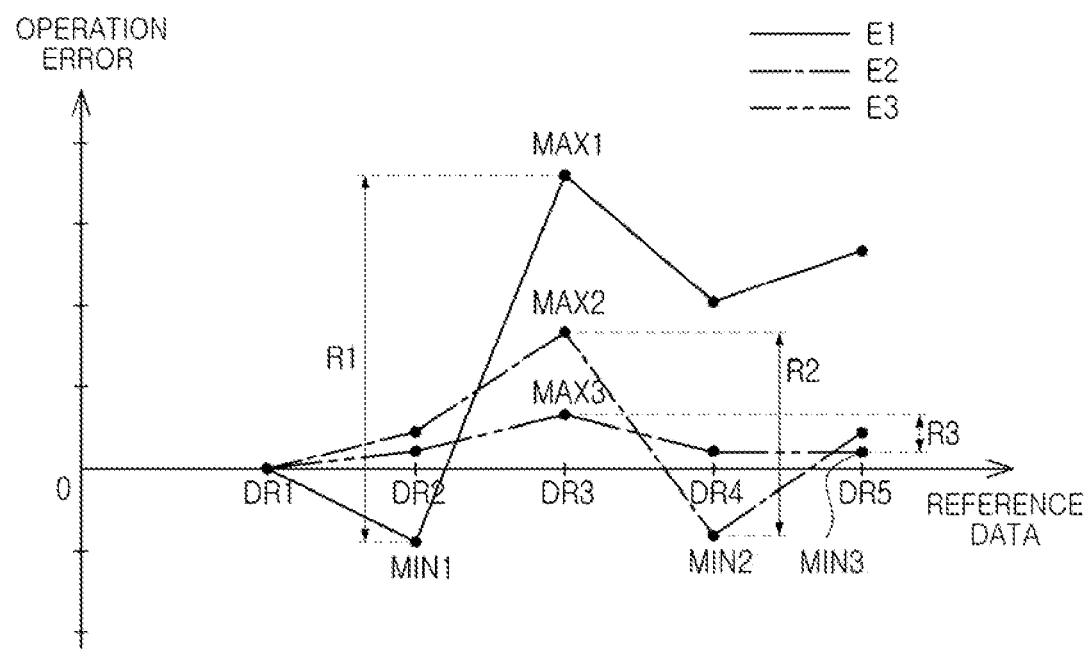
FIG. 14 is a diagram illustrating an operation of an imaging device according to an example embodiment.

FIG. 14 is a diagram illustrating an operation of an imaging device according to an example embodiment.

In FIG. 14, first to third graphs E1-E3 correspond to duty ratios applied to a light control signal during a calibration operation of an imaging device. The horizontal axis corresponds to reference data. The vertical axis corresponds to an operation error.

As described with reference to FIGS. 11A to 13E, the first to fifth reference data DR1-DR5 may be theoretically calculated from first to fifth phase differences φ1-φ5 to which the delay time is reflected. In an example embodiment, the first to fifth reference data DR1 to DR5 may not necessarily correspond to the first to fifth phase differences φ1 to φ5 in order.

The first graph E1 may correspond to an example in which the light control signal has a first duty ratio. In an example embodiment, the first duty ratio may be 50%. Thus, the first graph E1 may represent operation errors obtained by calculating the difference between the depth data output by the imaging device and the reference data calculated by the processor while applying different delay times to the light control signal of the first duty ratio. A difference between the maximum value MAX1 and the minimum value MIN1 among the operation errors of the first graph E1 may be a first result value R1.

The second graph E2 may correspond to the example in which the light control signal has a second duty ratio smaller than the first duty ratio. In an example embodiment, the second duty ratio may be 40%. Similarly to the first graph E1, the second graph E2 may represent operation errors obtained by calculating the difference between the depth data output by the imaging device and the reference data calculated by the processor while applying different delay times to the light control signal of the second duty ratio. A difference between the maximum value MAX2 and the minimum value MIN2 among the operation errors of the second graph E2 may be a second result value R2.

The third graph E3 may correspond to the example in which the light control signal has a third duty ratio smaller than the second duty ratio. In an example embodiment, the third duty ratio may be 1/3 or 33%. The third graph E3 may represent operation errors obtained by calculating the difference between the depth data output by the imaging device and the reference data calculated by the processor while applying different delay times to the light control signal of the third duty ratio. A difference between the maximum value MAX3 and the minimum value MIN3 among the operation errors of the third graph E3 may be a third result value R3.

In the example embodiment described with reference to FIG. 14, the third result value R3 may be the smallest among the first to third result values R1-R3. Accordingly, in the calibration operation, the duty ratio of the light control signal may be set to be the third duty ratio. After the calibration operation is completed, the imaging device may generate a depth image by driving a light source with the light control signal having the third duty ratio.

As described above, the imaging device may operate in a normal mode and a calibration mode. In the normal mode after the calibration operation is terminated, the duty ratio of the light control signal may be less than twice the duty ratio of the photo control signals.

Figure 15:
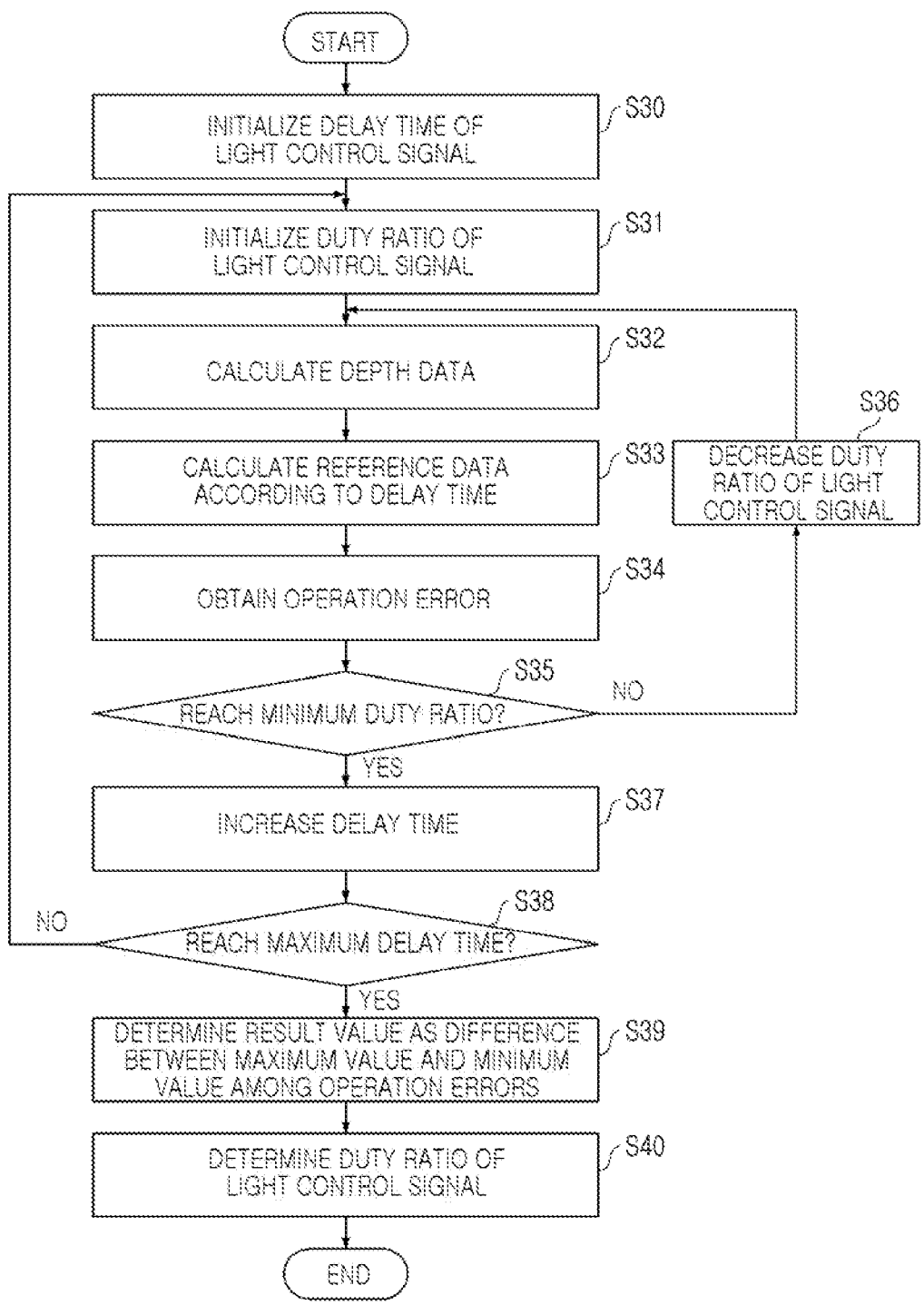
FIG. 15 is a flowchart illustrating an operation of an imaging device according to an example embodiment.

FIG. 15 is a flowchart illustrating an operation of an imaging device according to an example embodiment.

Referring to FIG. 15, a calibration operation of an imaging device in an example embodiment may start with initializing a delay time of a light control signal (S30). As described above, the light control signal may be a signal output by the logic circuit to the light source driver, and may be a PWM signal having a predetermined frequency. The delay time of the light control signal may be determined by a delay circuit such as a delay locked loop. In an example embodiment, the delay time of the light control signal may be initialized using a delay circuit mounted on the imaging device or using a delay circuit mounted together with the imaging device on a test board for performing the calibration operation. In an example embodiment, the delay time may be initialized to zero. In an example embodiment, the calibration operation may be executed by the imaging device and an external processor controlling the imaging device.

When the delay signal of the light control signal is initialized, the duty ratio of the light control signal may be initialized (S31). In an example embodiment, the duty ratio of the light control signal may be initialized by a logic circuit included in the imaging device. In an example embodiment, the duty ratio of the light control signal may be initialized to 50%.

The light source driver may drive the light emitting device using a light control signal having an initialized delay time and a duty ratio, and the image sensor may calculate depth data of a test object using the light reception signal reflected from the test object. (S32). The depth data calculated in operation S32 may include information on a distance between the imaging device and the test object.

The processor may calculate reference data according to the delay time (S33). The reference data may be determined by a phase difference between the light control signal and the light reception signal, and when the light source operates with a delay signal obtained by applying a predetermined delay time to the light control signal, the reference data may be determined from a delay phase difference obtained by reflecting a delay time to the phase difference between the light control signal and the light reception signal.

The processor may obtain an operation error by comparing the depth data obtained in operations S32 and S33 with the reference data (S34). The operation error may be a difference between the depth data and the reference data. The processor, having obtained the operation error, may determine whether the duty ratio of the light control signal is the minimum duty ratio. The duty ratio of the light control signal may be greater than the duty ratio of the photo control signal input to the pixels of the imaging device, and the minimum duty ratio may be determined under the conditions described above.

When the duty ratio of the light control signal has not reached the minimum duty ratio (No in S35), the processor may control the imaging device to reduce the duty ratio of the light control signal (S36). When the imaging device reduces the duty ratio of the light control signal, operations S32 to S34 may be executed again. Thus, operations S32 to S34 may be repeatedly executed until the duty ratio of the light control signal has been reduced to the minimum duty ratio, and the processor may obtain a plurality of operation errors while changing the duty ratio of the light control signal having a single delay time.

When the duty ratio of the light control signal is reaches the minimum duty ratio or decreases below the minimum duty ratio as a result of reducing the current duty ratio (Yes in S35), the processor may increase the delay time of the light control signal (S37). When the delay time of the light control signal increases, the processor may determine whether the delay time of the light control signal reaches the maximum delay time (S38). When the delay time has not reached the maximum delay time according to a result of the determination (No in operation S38), the imaging device may reinitialize the duty ratio of the light control signal (S31) and may again obtain operation errors while reducing the duty ratio.

Thus, in the example embodiment described with reference to FIG. 15, operation errors may be obtained by reducing the duty ratio of the light control signal without a delay time, operation errors may be obtained by reducing the duty ratio of the light control signal having a first delay time, and operation errors may be obtained by reducing the duty ratio of the light control signal having a second delay time longer than the first delay time. When the delay time reaches the maximum delay time, the processor may classify the operation errors according to the delay times, and may determine a difference between the maximum value and the minimum value of the operation errors at each delay time as a result value (S39). The processor may determine the duty ratio of the light control signal as a duty ratio corresponding to the smallest result value among result values obtained for the delay times (S40).

In the description below, a method of determining a duty ratio of the light control signal in the imaging device in an example embodiment will be described in detail with reference to FIGS. 16A to 18C.

FIGS. 16A to 18C are diagrams illustrating an operation of an imaging device according to an example embodiment.

Figure 16A:
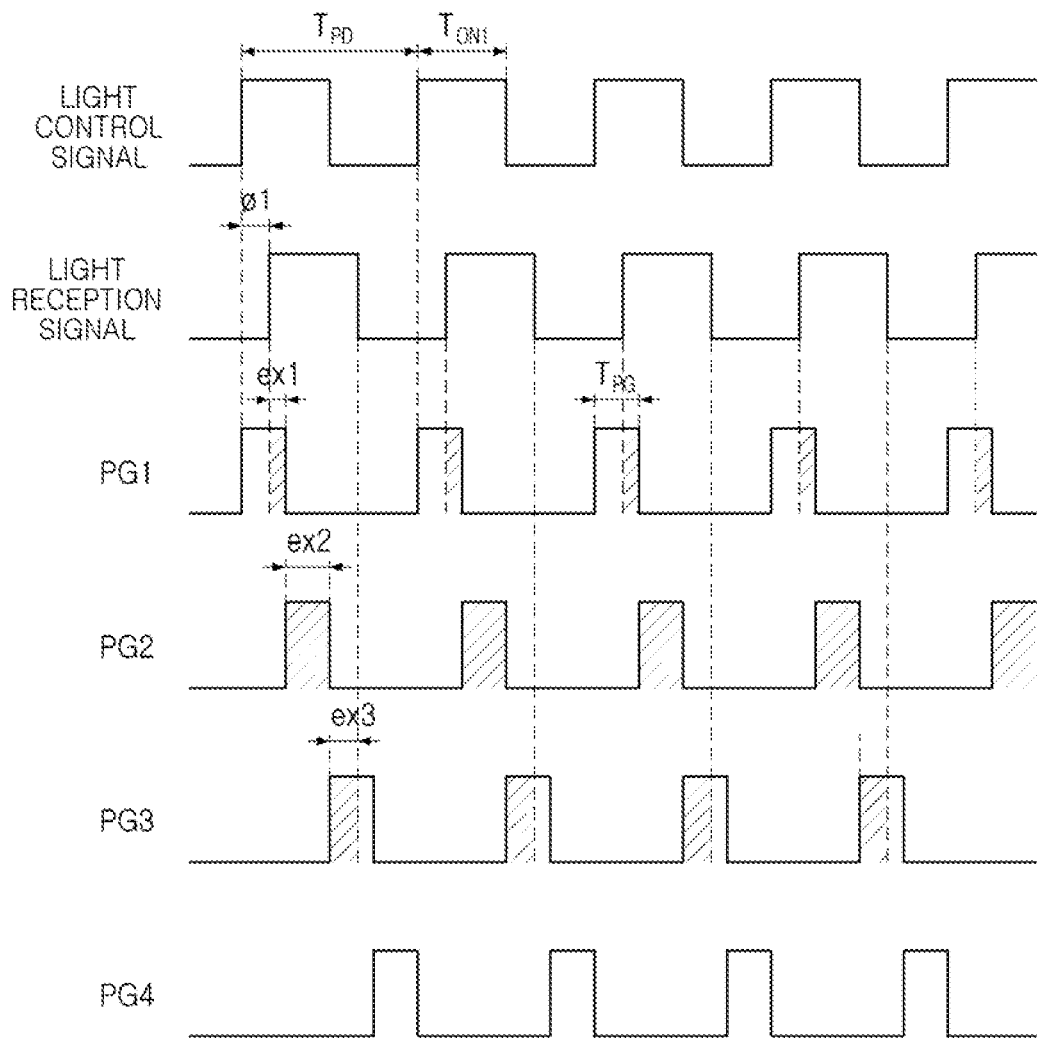
FIGS. 16A to 18C are diagrams illustrating an operation of an imaging device according to an example embodiment.
Figure 16B:
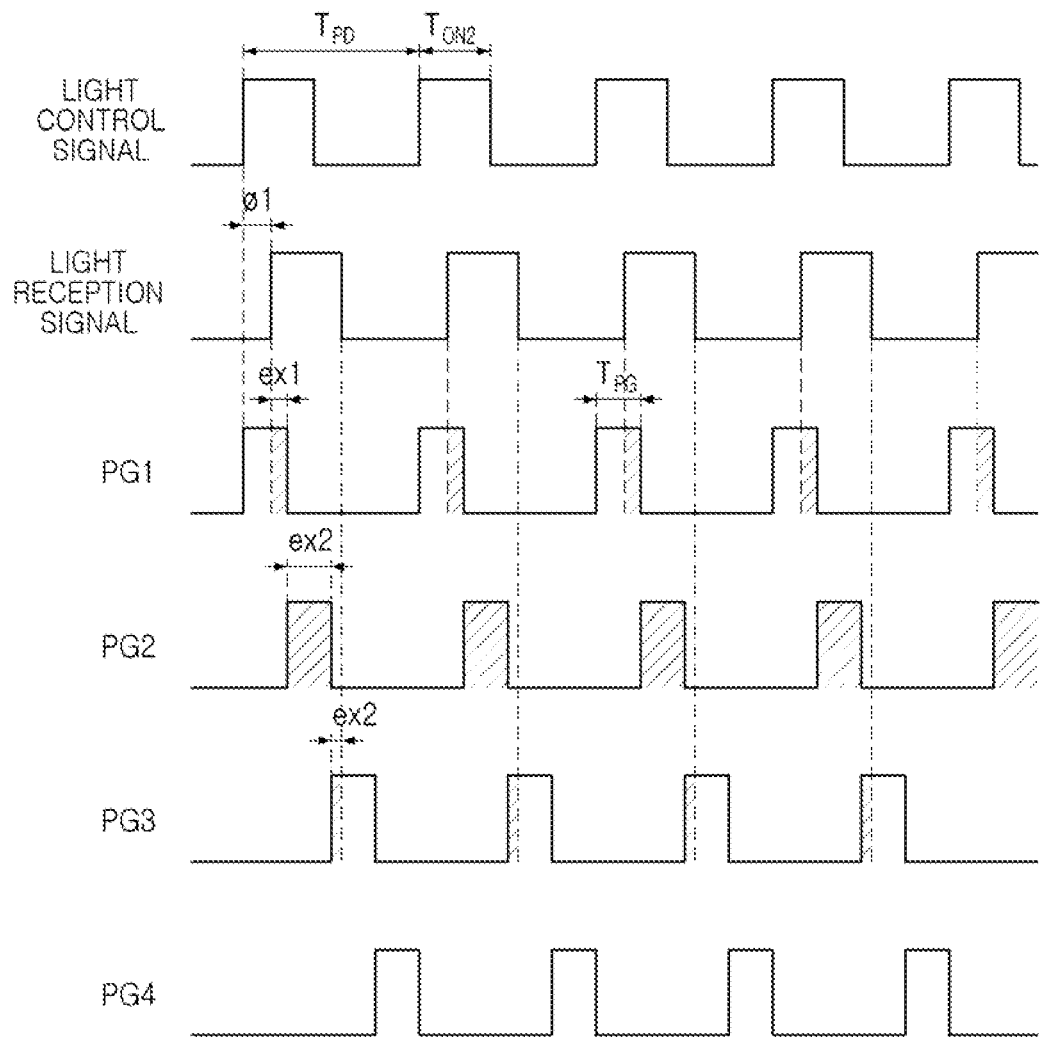
Figure 16C:
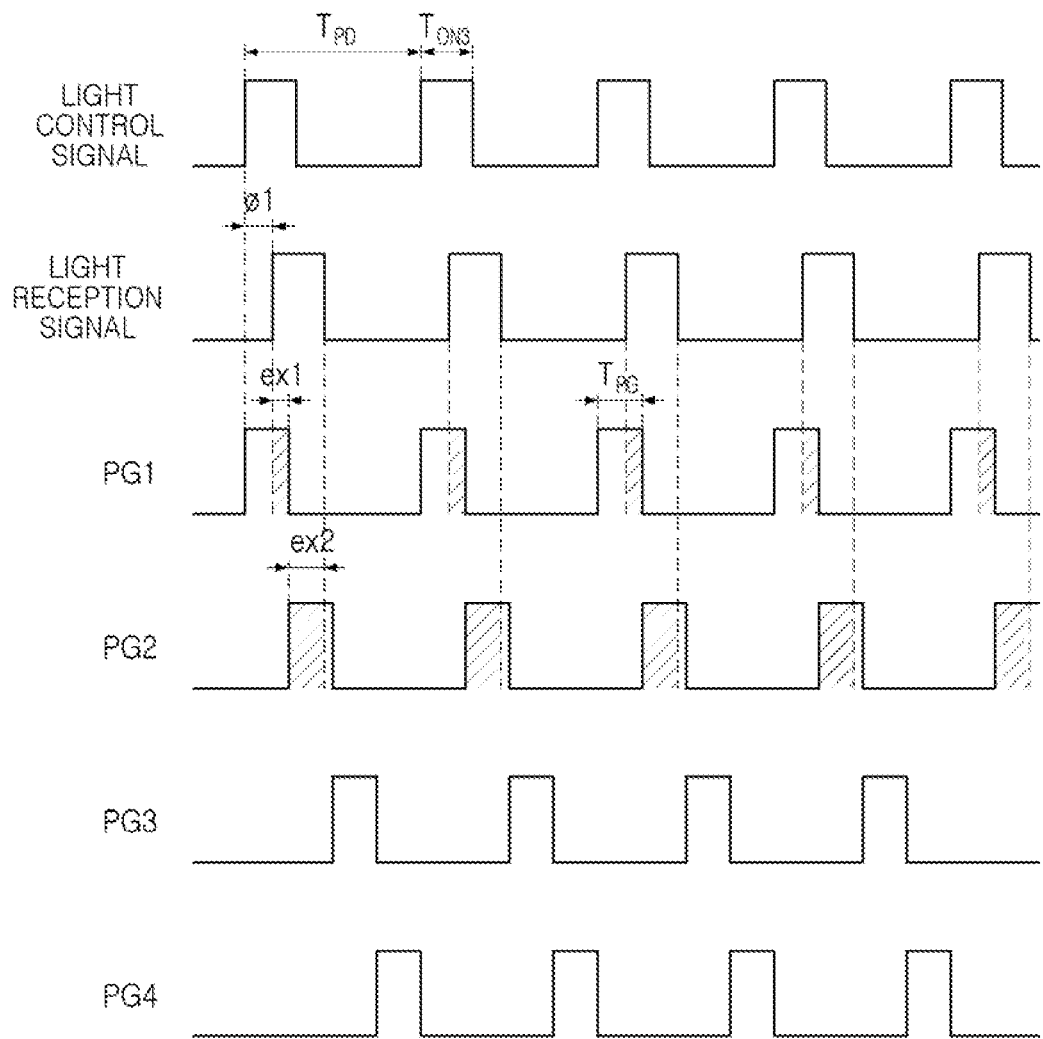
Figure 17A:
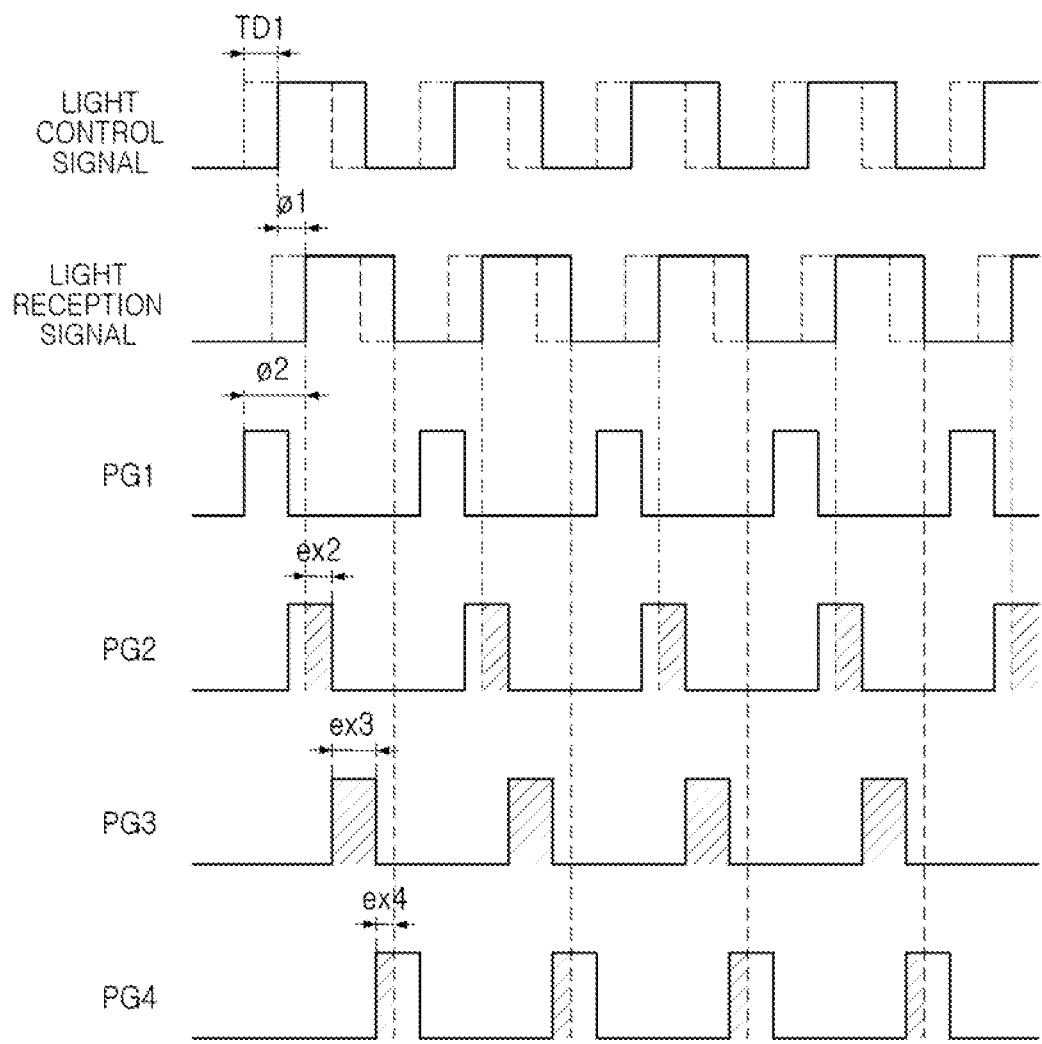
Figure 17B:
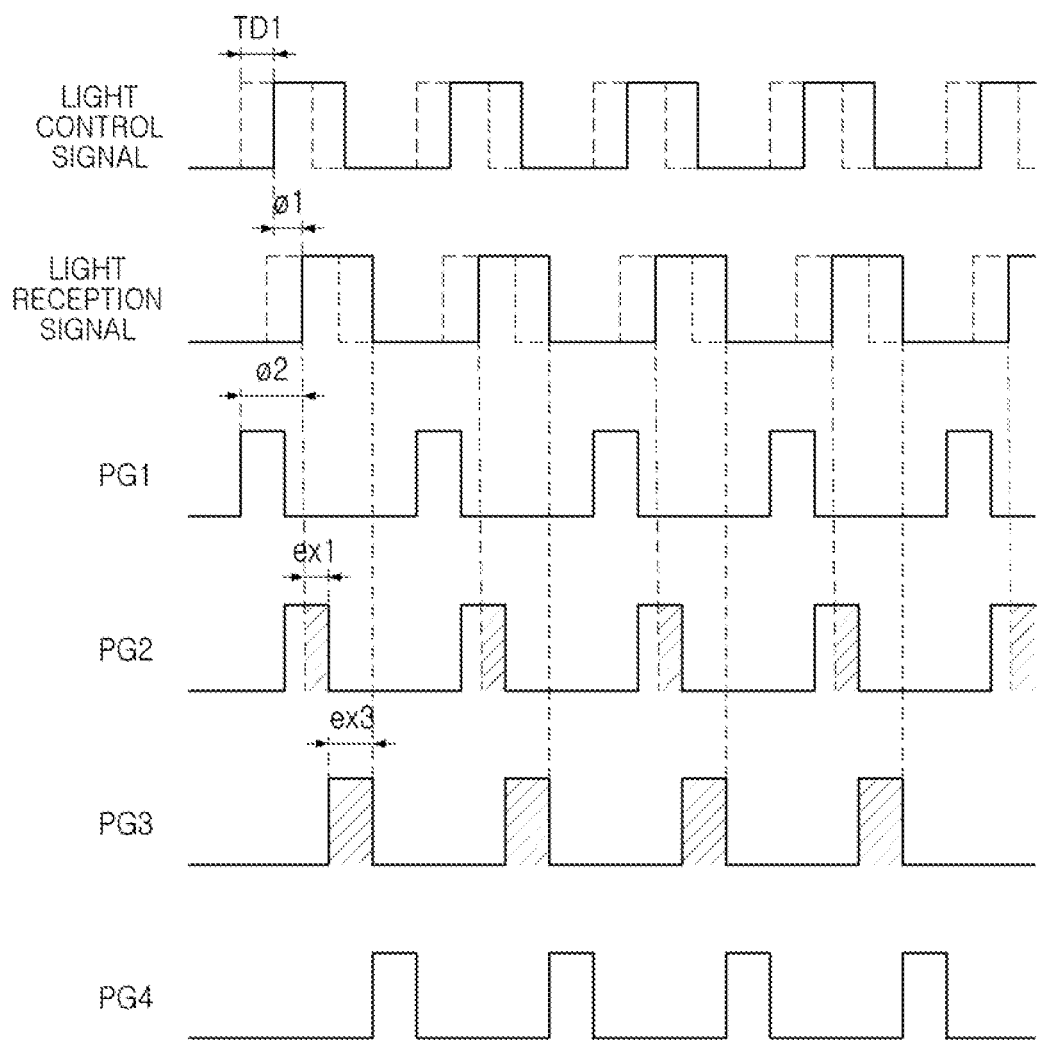
Figure 17C:
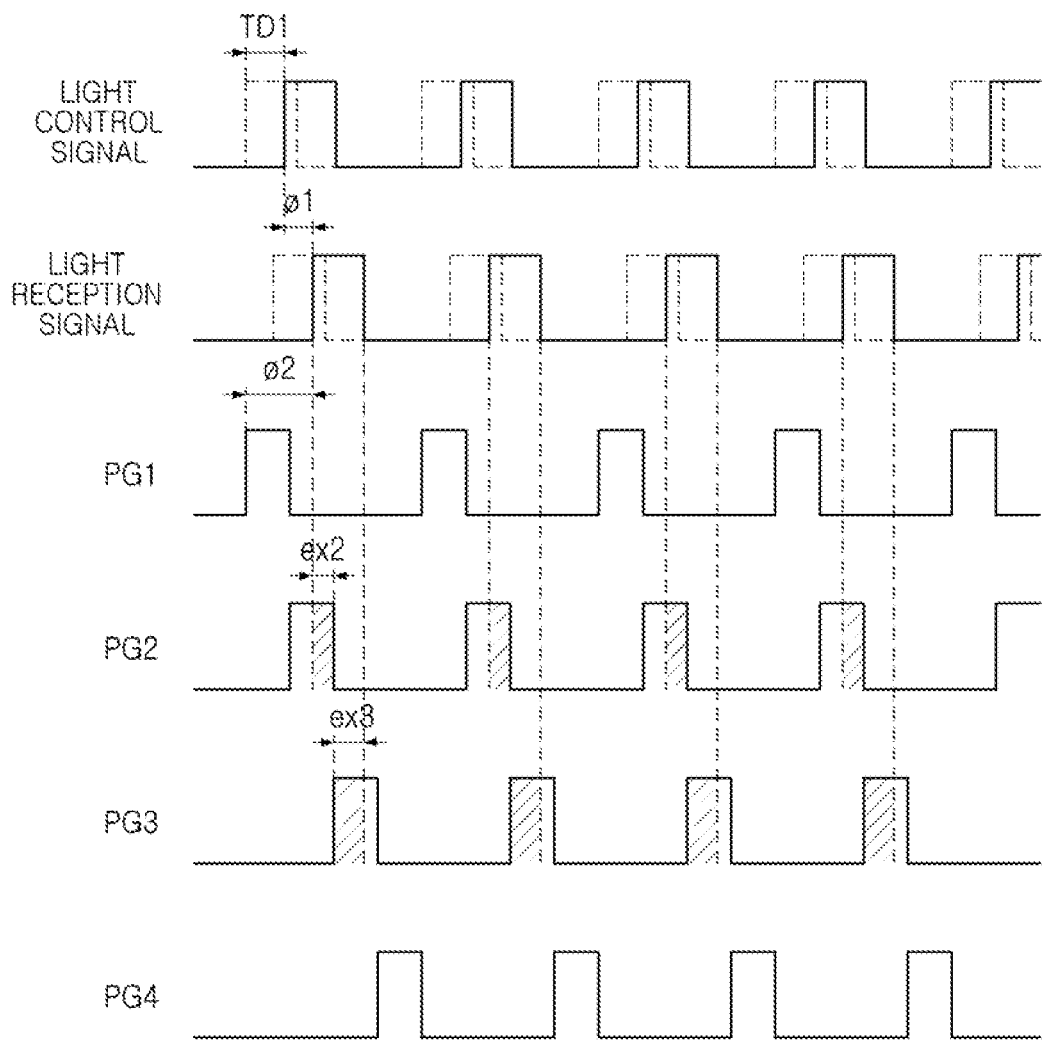
Figure 18A:
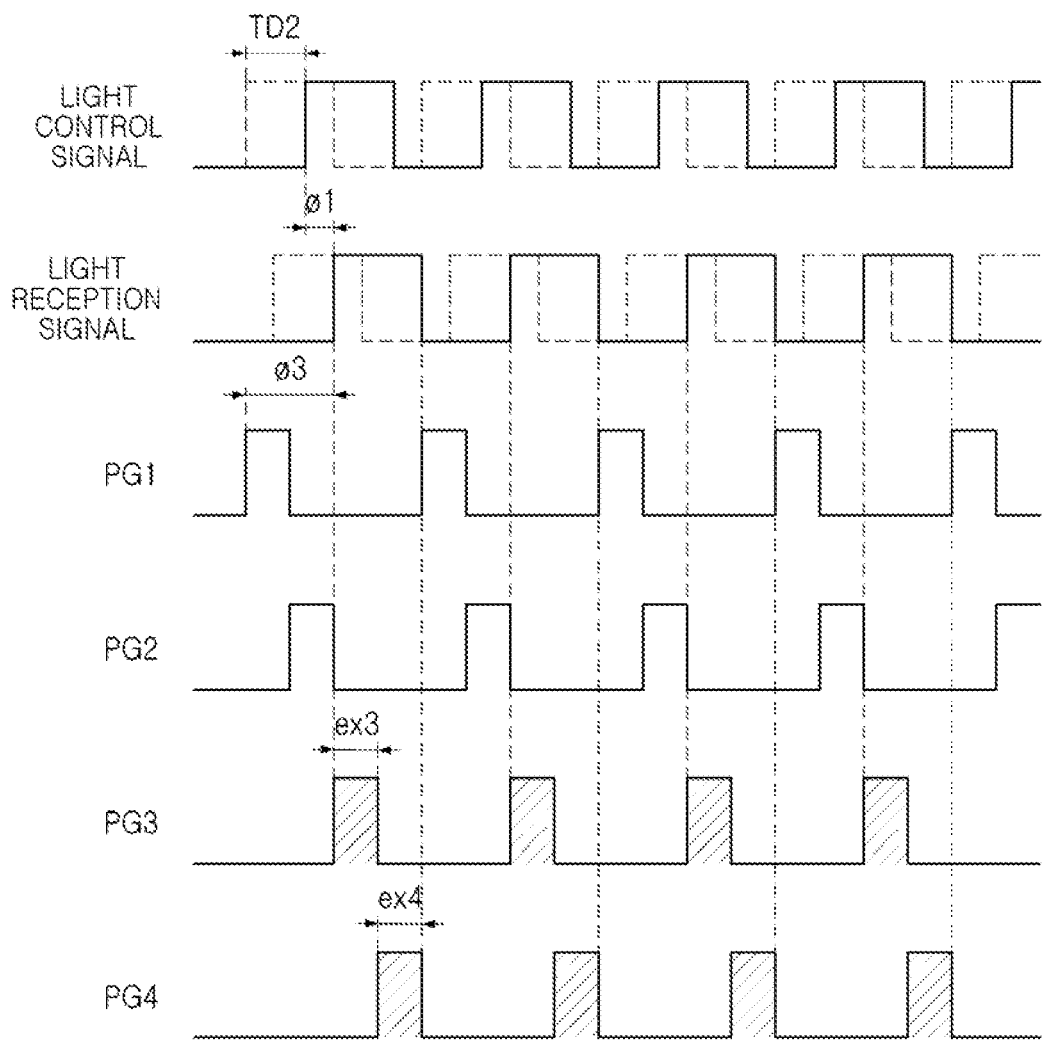
Figure 18B:
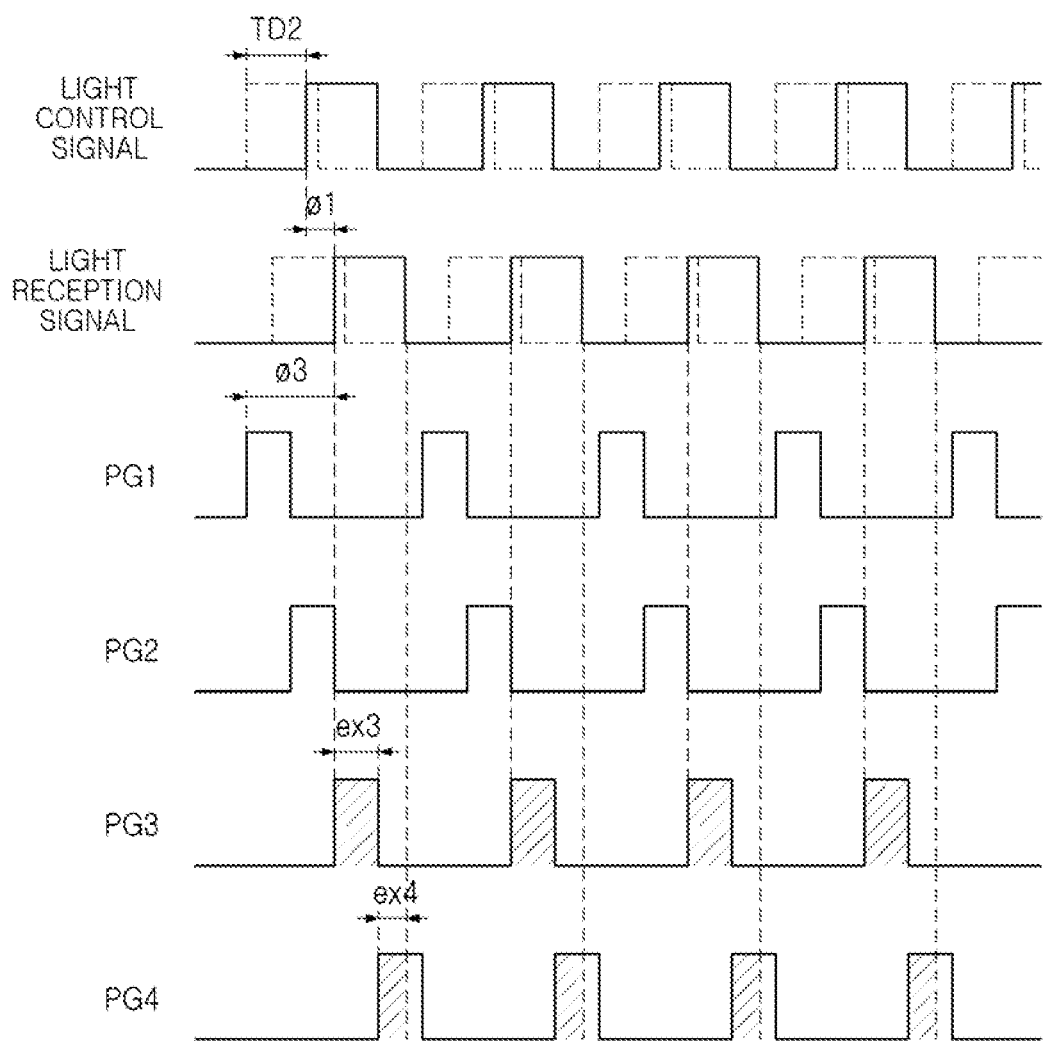
Figure 18C:
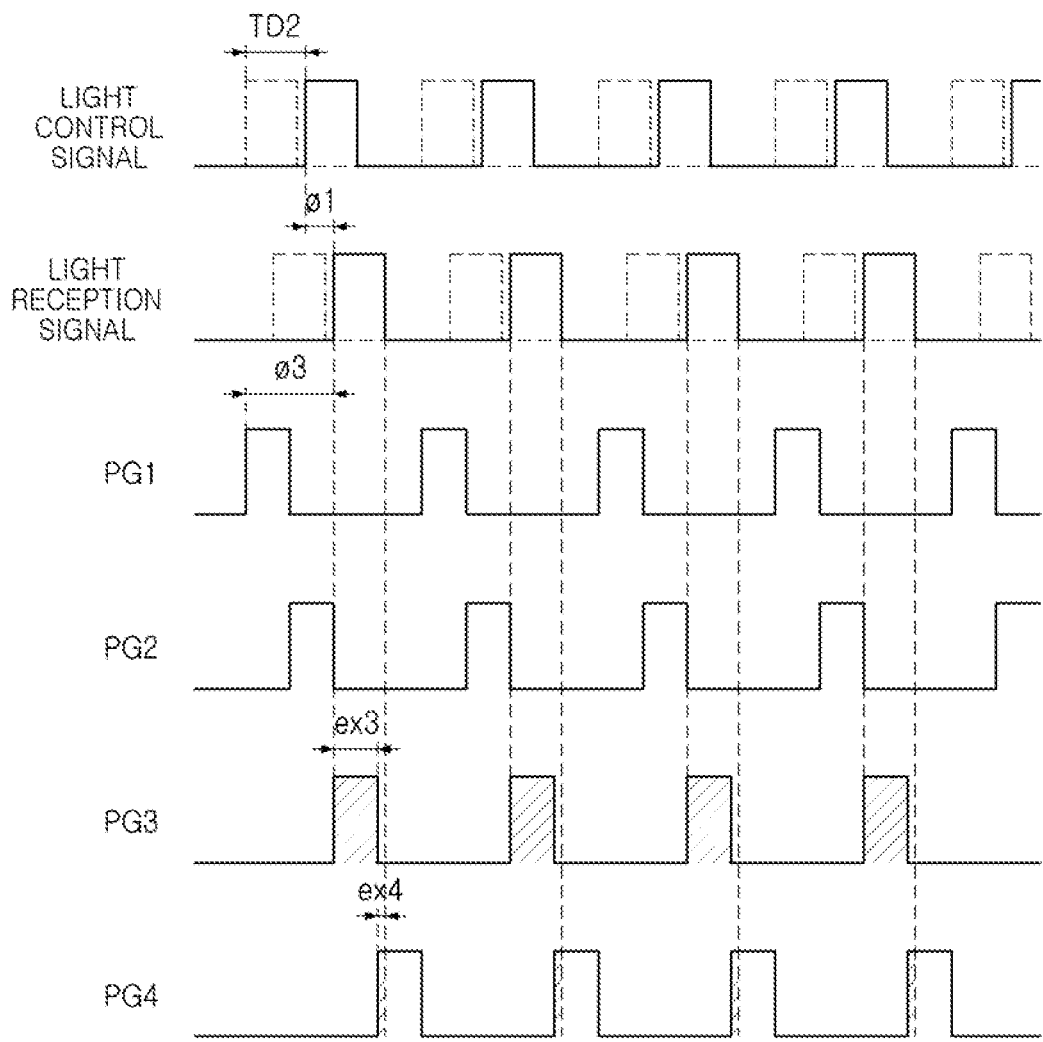

FIGS. 16A to 16C illustrate an operation of an imaging device when a delay time is not reflected in the light control signal. FIGS. 17A to 17C illustrate an operation of an imaging device when the first delay time TD1 is applied to the light control signal. FIGS. 18A to 18C illustrate an operation of an imaging device when a second delay time TD2 longer than the first delay time TD1 is applied to the light control signal.

Referring to FIG. 16A, the first duty ratio, i.e., an initial duty ratio of the light control signal, may be 50%. The period of each of the photo control signals PG1-PG4 is the same as the period TPD of the photo control signal, and the duty ratio may be 25%, i.e., 1/2 of the first duty ratio. The light reception signal may have a first phase difference $\varphi 1$ relative to the light control signal.

In the example embodiment described with reference to FIG. 16A, the depth data output by the imaging device may be determined according to exposure times ex1-ex3 at which each of the photo control signals PG1-PG4 overlap the light reception signal. The logic circuit may generate first depth data by converting a pixel signal corresponding to the exposure times ex1-ex3 into raw data. The first depth data may be compared with first reference data, an actual distance between a test object, a subject, and the imaging device. A logic circuit of the imaging device or a processor controlling the imaging device during a calibration operation may generate a first operation error by calculating a difference between the first depth data and the first reference data.

When the first operation error is generated, the logic circuit of the imaging device may reduce the duty ratio of the light control signal from the first duty ratio to the second duty ratio. In the example embodiment described with reference to FIG. 16B, the second duty ratio may be 40%. As the duty ratio of the light control signal decreases, exposure times ex1-ex3 at which the photo control signals PG1-PG4 overlap the light reception signal may be different from the example embodiment described with reference to FIG. 16A. Accordingly, the second depth data output by the imaging device may also be different from the first depth data. The logic circuit of the imaging device or the processor may generate a second operation error by calculating a difference between the second depth data and the first reference data.

When the second operation error is generated, the duty ratio of the light control signal may be reduced to the third duty ratio as described with reference to FIG. 16C. In an example embodiment, the third duty ratio may be 1/3 or 33%. As the duty ratio of the light control signal is changed, the exposure times ex1 and ex2 at which the photo control signals PG1-PG4 overlap the light reception signal may change again, and the third depth data generated by the imaging device may be different from the first and second depth data. The logic circuit of the imaging device or the processor may generate a third operation error by calculating a difference between the third depth data and the first reference data.

When the first to third operation errors are generated, the duty ratio of the light control signal may be initialized to the first duty ratio again. Also, the processor may generate a delay signal by delaying the light control signal by a first delay time TD1 using a delay circuit disposed in or externally of the imaging device. Referring to FIGS. 17A to 17C, as the light control signal is delayed by the first delay time TD1, the light reception signal may also be delayed by the first delay time TD1. Accordingly, the first photo control signal PG1 synchronized to have the same phase as that of the light control signal may have a second phase difference φ2 relative to the light reception signal. The second phase difference φ2 may be determined as a sum of the first phase difference φ1 and the first delay time TD1.

Accordingly, referring to FIG. 17A, the exposure times ex1-ex3 at which the photo control signals PG1-PG4 overlap the light reception signal may be different from the example embodiment described with reference to FIG. 16A. Without adjusting the actual distance between the imaging device and the test object, the depth data generated by sensing the test object by the imaging device may change.

The imaging device may generate fourth depth data corresponding to the exposure times ex1-ex3, and the processor controlling the imaging device during the calibration operation may calculate second reference data using the second phase difference φ2. In an example embodiment, the second reference data may be calculated by applying the second phase difference φ2 to Equation 1. The logic circuit of the imaging device or the processor may generate a fourth operation error by calculating a difference between the fourth depth data and the second reference data.

Referring to FIG. 17B, while the delay time of the light control signal is maintained at the first delay time TD1, the duty ratio of the light control signal may be reduced to the second duty ratio. The imaging device may generate fifth depth data corresponding to the exposure times ex2 and ex3. Since the phase difference between the first photo control signal PG1 and the light reception signal is the second phase difference φ2 as described with reference to FIG. 17A, a fifth operation error may be obtained by calculating the difference between the fifth depth data and the second reference data.

Referring to FIG. 17C, the duty ratio of the light control signal may be reduced to the third duty ratio. The delay time of the light control signal may be maintained to be the first delay time TD1. The imaging device may generate sixth depth data corresponding to the exposure times ex2 and ex3, and the processor may obtain a sixth operation error by calculating a difference between the sixth depth data and the second reference data.

When the fourth to sixth operation errors are obtained, the imaging device may initialize the duty ratio of the light control signal to the first duty ratio. Also, the processor may delay the light control signal by the second delay time TD2 longer than the first delay time TD1 using a delay circuit disposed in or externally of the imaging device. Referring to FIGS. 18A to 18C, the light reception signal may also be delayed by the second delay time TD2. Accordingly, the first photo control signal PG1 synchronized to have the same phase as that of the light control signal may have a third phase difference φ3 with the light reception signal. The third phase difference φ3 may be determined as a sum of the first phase difference φ1 and the second delay time TD2.

Accordingly, referring to FIG. 18A, the exposure times ex3 and ex4 at which the photo control signals PG1-PG4 overlap the light reception signal may be different from the example embodiments illustrated in FIGS. 16A and 17A. Also, depth data generated by sensing the test object by the imaging device may be changed without adjusting the actual distance between the imaging device and the test object.

The imaging device may generate seventh depth data corresponding to the exposure times ex3 and ex4, and the processor controlling the imaging device during the calibration operation may calculate third reference data using third phase difference φ3 and Equation 1. The logic circuit of the imaging device or the processor may generate a seventh operation error by calculating a difference between the seventh depth data and the second reference data.

Referring to FIG. 18B, the duty ratio of the light control signal may be reduced to the second duty ratio while the delay time of the light control signal is maintained to be the second delay time TD2. The imaging device may generate eighth depth data corresponding to the exposure times ex3 and ex4, and since the exposure times ex3 and ex4 are different from the example embodiment described with reference to FIG. 18A, the eighth depth data may be different from the seventh depth data. Since the phase difference between the first photo control signal PG1 and the light reception signal is the second phase difference φ2, an eighth operation error may be obtained by calculating a difference between the eighth depth data and the second reference data.

Referring to FIG. 18C, the duty ratio of the light control signal may be reduced to the third duty ratio, and the delay time of the light control signal may be maintained to be the second delay time TD2. The imaging device may generate ninth depth data corresponding to the changed exposure times ex3 and ex4 according to the reduction of the duty ratio of the light control signal, and the processor may obtain a ninth operation error by calculating a difference between the ninth depth data and the second reference data.

As an example, in the example embodiments illustrated in FIGS. 18A to 18C, the seventh depth data may be greater than the eighth depth data, and the eighth depth data may be greater than the ninth depth data. Accordingly, among the seventh to ninth depth data, a duty ratio corresponding to depth data having a size most similar to that of the second reference data may be determined as the duty ratio of the light control signal optimized to improve performance of the imaging device.

In an example embodiment, the first to ninth operation errors obtained in the example embodiments described with reference to FIGS. 16A to 18C may be classified according to a duty ratio. The first, fourth, and seventh operation errors, in which the light control signal has the first duty ratio, may be classified into a first group. The second, fifth, and eighth operation errors, in which the light control signal has the second duty ratio, may be classified into a second group. The third, sixth, and ninth operation errors, in which the light control signal has the third duty ratio, may be classified into a third group.

The logic circuit of the imaging device or the external processor of the imaging device may calculate first to third result values by calculating a difference between the maximum value and the minimum value among the operation errors included in each of the first to third groups. The smallest result value among the first to third result values may be selected, and a duty ratio corresponding to the selected result value may be selected as the duty ratio of the light control signal.

Figure 19:
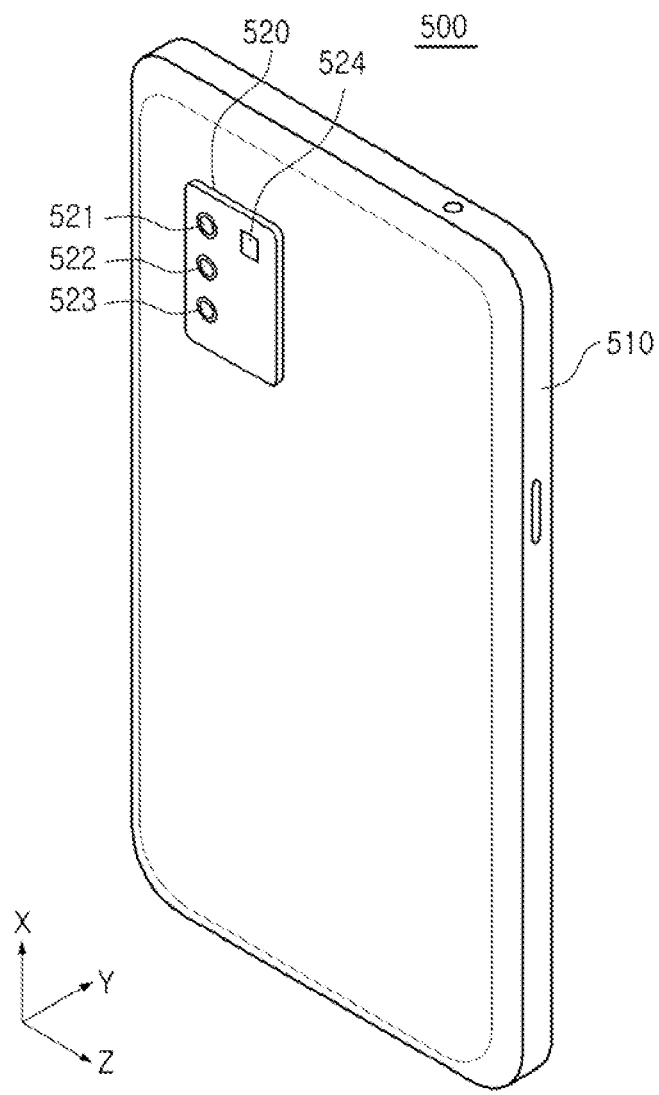
FIGS. 19 to 21 are diagrams illustrating an electronic device including an imaging device according to an example embodiment.
Figure 20:
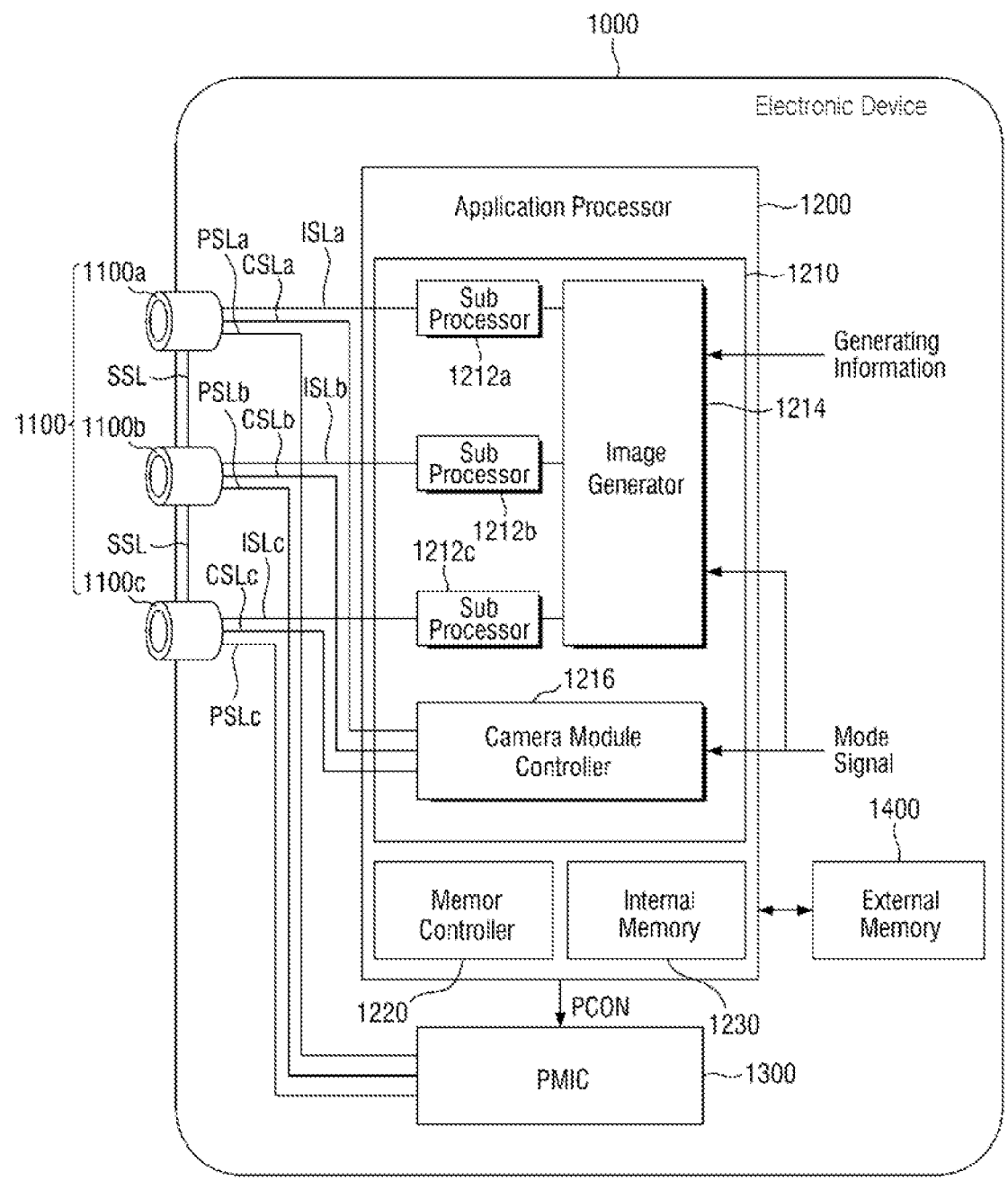
Figure 21:
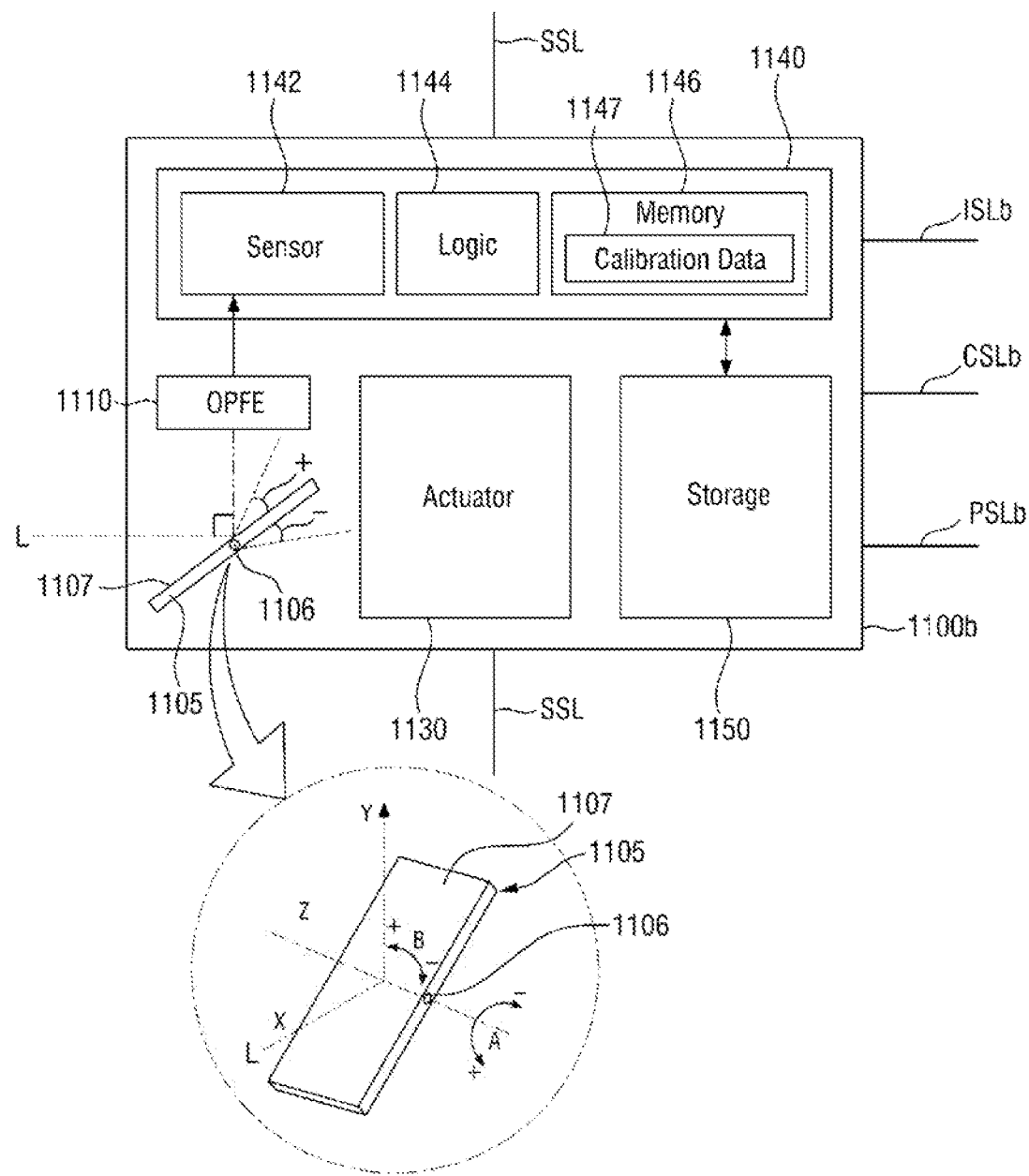

FIGS. 19 to 21 are diagrams illustrating an electronic device including an imaging device according to an example embodiment.

FIG. 19 illustrate an exterior of an electronic device 500 including an imaging device according to an example embodiment. In FIG. 19, the electronic device 500 may be implemented as, e.g., a mobile device, or a smart phone. In an example embodiment, the electronic device 500 may be applied to devices such as a television, a desktop computer, a monitor, a refrigerator, or the like, and also devices providing security, such as a door lock and a cash dispenser, in addition to mobile devices.

Referring to FIG. 19, the electronic device 500 may include a housing 510 and a camera unit 520. The camera unit 520 may be disposed on a rear surface of the housing 510 and/or on a front surface of the housing 510 in which a display is disposed. The camera unit 520 may include a plurality of cameras 521-523 and a light source 524.

At least one of the plurality of cameras 521-523 may be implemented as an imaging device according to an example embodiment. In an example embodiment, the imaging device may drive the light source 524 mounted on the camera unit 520 with a predetermined light control signal. Light output by a light source operated by the light control signal may be reflected from the subject and may be incident to the pixel array of the imaging device to generate a light reception signal. The light reception signal may have a predetermined phase difference with the light control signal, and the imaging device may generate a depth image including a subject by calculating a phase difference between the light control signal and the light reception signal. The specific operations of the imaging device may be understood with reference to the example embodiments described with reference to FIGS. 1 to 18 above. In an example embodiment, the duty ratio of the light control signal may be less than twice the duty ratio of the photo control signals input to the pixel array of the imaging device operating by being interlocked with the light source 524. Accordingly, the duty ratio of the light control signal may not be an integer multiple of the duty ratio of the photo control signals.

Referring to FIG. 20, an electronic device 1000 may include a camera module group 1100, an application processor 1200, a PMIC 1300, and a storage or external memory 1400.

The camera module group 1100 may include a plurality of camera modules 1100a, 1100b, and 1100c. Although the drawing illustrates three camera modules 1100a, 1100b, and 1100c, this is merely an example and the camera module group 1100 may include, e.g., two camera modules or four or more camera modules. In an example embodiment, at least one of the plurality of camera modules 1100a, 1100b, and 1100c included in the camera module group 1100 is an imaging device according to one of the example embodiments described above with reference to FIGS. 1 to 18.

Hereinafter, with reference to FIG. 21, the detailed configuration of the camera module 1100b will be described in more detail, and the following description is applied equally to the camera modules 1100a and 1100b according to the example embodiment.

Referring to FIG. 21, the camera module 1100b may include a prism 1105, an optical path folding element (hereinafter, "OPFE") 1110, an actuator 1130, an image sensing device 1140, and a storage unit 1150.

The prism 1105 may include a reflective surface 1107 of a light reflective material to change a path of light L incident from the outside. In an example embodiment, the prism 1105 may change the path of the light L incident in the first direction X in the second direction Y perpendicular to the first direction X. The prism 1105 may rotate the reflective surface 1107 of a light reflective material in the direction A around a central axis 1106, or may rotate the central axis 1106 in the direction B to change the path of the incident light L incident in the first direction X in the vertical second direction Y. The OPFE 1110 may also move in a third direction Z perpendicular to the first direction X and the second direction Y. A maximum rotation angle of the prism 1105 in the A direction may be 15 degrees or less in the positive (+) A direction, and may be greater than 15 degrees in the negative (−) A direction, for example. The prism 1105 may move, e.g., by about 20 degrees, between 10 degrees and 20 degrees, or between 15 degrees and 20 degrees in the positive (+) or negative (−) B direction, and the prism 1105 may move by the same angle in the positive (+) or negative (−) B direction or may move by a similar angle in a range of about 1 degree. The prism 1105 may move the reflective surface 1107 in a third direction (e.g., the Z direction) parallel to the extending direction of the central axis 1106.

The OPFE 1110 may include, e.g., an optical lens including m (where m is a natural number) number of groups. The m number of lenses may move in the second direction Y to change an optical zoom ratio of the camera module 1100b. For example, when a basic optical zoom ratio of the camera module 1100b is Z, and m number of optical lenses included in the OPFE 1110 move, the optical zoom ratio of the camera module 1100b may be 3Z, 5Z, or 5Z or higher.

The actuator 1130 may move the OPFE 1110 or an optical lens to a specific position. In an example embodiment, the actuator 1130 may adjust the position of the optical lens such that the imaging device 1142 may be disposed at a focal length of the optical lens for accurate sensing.

The image sensing device 1140 may include an imaging device 1142, a control logic 1144 and a memory 1146. The imaging device 1142 may sense an image of a sensing target using light L provided through an optical lens. The control logic 1144 may control overall operation of the camera module 1100b. The control logic 1144 may control the operation of the camera module 1100b according to a control signal provided through a control signal line CSLb.

The memory 1146 may store information used for operation of the camera module 1100b, such as calibration data 1147. The calibration data 1147 may include information used for the camera module 1100b to generate image data using light L provided from the outside. The calibration data 1147 may include, e.g., information on a degree of rotation, information on a focal length, information on an optical axis, and the like, described above. When the camera module 1100b is implemented as a multi-state camera of which a focal length changes depending on the position of the optical lens, the calibration data 1147 may include information on focal length values for each position (or each state) of the optical lens and autofocusing.

The storage unit 1150 may store image data sensed through the imaging device 1142. The storage unit 1150 may be disposed externally to the image sensing device 1140 and may be implemented to be stacked with a sensor chip forming the image sensing device 1140. In an example embodiment, the storage unit 1150 may be implemented as, e.g., an electrically erasable programmable read-only memory (EEPROM).

Referring to FIGS. 20 and 21, in an example embodiment, each of the plurality of camera modules 1100a, 1100b, and 1100c may include an actuator 1130. Accordingly, each of the plurality of camera modules 1100a, 1100b, and 1100c may include the same or different calibration data 1147 according to operation of the actuator 1130 included therein.

In an example embodiment, one camera module (e.g., 1100b) among the plurality of camera modules 1100a, 1100b, and 1100c may be implemented as, e.g., a folded lens type camera module including the prism 1105 and OPFE 1110 described above, and the other camera modules (e.g., 1100a and 1100b) may be a vertical type camera module which does not include the prism 1105 and OPFE 1110.

In an example embodiment, one camera module (e.g., 1100c) among the plurality of camera modules 1100a, 1100b, and 1100c may be implemented as, e.g., a vertical-type depth camera which may extract depth information using infrared ray (IR), for example. In this case, the application processor 1200 may merge the image data provided from the depth camera with the image data provided from another camera module (e.g., the camera module 1100a or 1100b) and may generate a 3D depth image.

In an example embodiment, at least two camera modules (e.g., 1100a and 1100b) among the plurality of camera modules 1100a, 1100b, and 1100c may have different fields of view. In this case, e.g., the optical lenses of at least two camera modules (e.g., 1100a and 1100b) among the plurality of camera modules 1100a, 1100b, and 1100c may be different from each other.

In an example embodiment, fields of view of the plurality of camera modules 1100a, 1100b, and 1100c may be different from each other. In this case, the optical lenses included in each of the plurality of camera modules 1100a, 1100b, and 1100c may also be different from each other.

In an example embodiment, the plurality of camera modules 1100a, 1100b, and 1100c may be configured to be physically isolated from each other. Thus, a sensing area of one imaging device 1142 may not be divided and used by the plurality of camera modules 1100a, 1100b, and 1100c, and an independent imaging device 1142 may be disposed in each of the plurality of camera modules 1100a, 1100b, and 1100c. Also, at least one of the plurality of camera modules 1100a, 1100b, and 1100c may include a ToF sensor for generating a depth image on a basis of information of a distance from the subject.

Referring to FIG. 20, the application processor 1200 may include an image processing device 1210, a memory controller 1220, and an internal memory 1230. The application processor 1200 may be implemented to be separated from the plurality of camera modules 1100a, 1100b, and 1100c. In an example embodiment, the application processor 1200 and the plurality of camera modules 1100a, 1100b, and 1100c may be implemented to be separated from each other as separate semiconductor chips.

The image processing device 1210 may include a plurality of sub-image processors 1212a, 1212b, and 1212c, an image generator 1214, and a camera module controller 1216. The image processing device 1210 may include a plurality of sub-image processors 1212a, 1212b, and 1212c corresponding to the number of the plurality of camera modules 1100a, 1100b, and 1100c. Image data generated by each of the camera modules 1100a, 1100b, and 1100c may be provided to corresponding sub-image processors 1212a, 1212b, and 1212c through image signal lines ISLa, ISLb, and ISLc separated from each other. For example, image data generated by the camera module 1100a may be provided to the sub-image processor 1212a through an image signal line ISLa, the image data generated by the camera module 1100b may be provided to the sub-image processor 1212b through the image signal line ISLb, and the image data generated by the camera module 1100c may be provided to the sub-image processor 1212c through the image signal line ISLc. The image data transmission may be performed using, e.g., a camera serial interface (CSI) based on a mobile industry processor interface (MIPI).

In an example embodiment, one sub-image processor may be arranged to correspond to a plurality of camera modules. In an example embodiment, the sub-image processor 1212a and the sub-image processor 1212c may not be implemented to be separated from each other but may be implemented to be integrated into a single sub-image processor, and the image data provided by the camera module 1100a and the camera module 1100c may be selected through a selection device (e.g., a multiplexer) and may be provided to the integrated sub-image processor.

The image data provided to each of the sub-image processors 1212a, 1212b, and 1212c may be provided to the image generator 1214. The image generator 1214 may generate an output image using the image data provided by each of the sub-image processors 1212a, 1212b, and 1212c according to image generating information or a mode signal. In an example embodiment, the image generator 1214 may generate an output image by merging at least portions of the image data generated by the camera modules 1100a, 1100b, 1100c having different fields of view according to the image generating information or a mode signal. The image generator 1214 may generate an output image by selecting one of the image data generated by the camera modules 1100a, 1100b, and 1100c having different fields of view according to image generation information or a mode signal. The image generating information may include a zoom signal or zoom factor. The mode signal may be, e.g., a signal based on a mode selected by a user. When the image generating information is a zoom signal (zoom factor), and the camera modules 1100a, 1100b, and 1100c have different fields of view, the image generator 1214 may perform different operations depending on types of zoom signals. For example, when the zoom signal is a first signal, the image data output by the camera module 1100a may be merged with the image data output by the camera module 1100c, and an output image may be generated using the merged image signal and the image data output by the camera module 1100b which has not been used in the merging. When the zoom signal is a second signal different from the first signal, the image generator 1214 may not perform the image data merging, and may generate an output image by selecting one of the image data output by each camera module 1100a, 1100b, and 1100c.

In an example embodiment, the image generator 1214 may receive a plurality of image data having different exposure times from at least one of the plurality of sub-image processors 1212a, 1212b, and 1212c, and may perform high dynamic range (HDR) processing thereon, such that merged image data with an increased dynamic range may be generated.

The camera module controller 1216 may provide a control signal to each of the camera modules 1100a, 1100b, and 1100c. The control signal generated from the camera module controller 1216 may be provided to corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) according to image generating information including a zoom signal, or a mode signal, and the other camera modules (e.g., 1100a and 1100c) may be designated as slave cameras. The above-described information may be included in a control signal and may be provided to corresponding camera modules 1100a, 1100b, and 1100c through control signal lines CSLa, CSLb, and CSLc separated from each other. Camera modules operating as masters and slaves may change according to a zoom factor or an operation mode signal. For example, when the field of view of the camera module 1100a is wider than that of the camera module 1100b and the zoom factor exhibits a low zoom ratio, the camera module 1100b may operate as a master, and the camera module 1100a may operate a slave. Alternatively, when the zoom factor exhibits a high zoom ratio, the camera module 1100a may operate as a master and the camera module 1100b may operate as a slave.

In an example embodiment, a control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving the sync enable signal may generate a sync signal on the basis of the provided sync enable signal, and may transmit the generated sync signal to the camera modules 1100a and 1100c. The camera module 1100b and the camera modules 1100a and 1100c may be synchronized with the sync signal and may transmit image data to the application processor 1200.

In an example embodiment, a control signal provided from the camera module controller 1216 to the plurality of camera modules 1100a, 1100b, and 1100c may include mode information according to the mode signal. The plurality of camera modules 1100a, 1100b, and 1100c may operate in a first operation mode and a second operation mode in relation to a sensing speed on the basis of the mode information.

In the first operation mode, the plurality of camera modules 1100a, 1100b, and 1100c may generate an image signal at a first rate (e.g., may generate an image signal at a first frame rate), may encode the image signal at a second rate higher than the first rate (e.g., may encode an image signal of a second frame rate higher than a first frame rate), and may transmit the encoded image signal to the application processor 1200. In this case, the second speed may be 30 times less of the first speed. The application processor 1200 may store the received image signal, the encoded image signal, in the memory 1230 provided therein or the external memory 1400 disposed externally of the application processor 1200, may read out the encoded image signal from the memory 1230 or the external memory 1400, and may display image data generated on the basis of the decoded image signal. For example, a corresponding sub-processor among the plurality of sub-image processors 1212a, 1212b, and 1212c of the image processing device 1210 may perform decoding, and may also perform image processing on the decoded image signal.

In the second operation mode, the plurality of camera modules 1100a, 1100b, and 1100c may generate an image signal at a third rate lower than the first rate (e.g., generate an image signal of a third frame rate lower than the first frame rate), and may transmit the image signal to the application processor 1200. The image signal provided to the application processor 1200 may be an unencoded signal. The application processor 1200 may perform image processing on the received image signal or may store the image signal in the memory 1230 or the external memory 1400.

The PMIC 1300 may supply power, such as a power voltage, to each of the plurality of camera modules 1100a, 1100b, and 1100c. In an example embodiment, the PMIC 1300 may supply first power to the camera module 1100a through the power signal line PSLa under control of the application processor 1200, may supply second power to the camera module 1100b through the power signal line PSLb, and may supply third power to the camera module 1100c through the power signal line PSLc. The PMIC 1300 may generate power corresponding to each of the plurality of camera modules 1100a, 1100b, and 1100c in response to a power control signal PCON from the application processor 1200, and may also adjust a level of power. The power control signal PCON may include a power adjustment signal for each operation mode of the plurality of camera modules 1100a, 1100b, and 1100c. The operation mode may include a low power mode, and in this case, the power control signal PCON may include information on a camera module operating in a low power mode and a determined power level. Levels of power provided to the plurality of camera modules 1100a, 1100b, and 1100c may be the same or different. Also, a level of power may be dynamically changed.

By way of summation and review, an imaging device may generate a depth image including distance information using a light signal. Such an imaging device may be mounted on various electronic devices. Methods for improving performance of an imaging device generating a depth image are desired.

As described above, embodiments may provide an imaging device which may reduce an effect of noise caused by harmonic distortion and may generate a depth image having a high degree of accuracy, and a method of controlling the same.

According to an example embodiment, by comparing the computation depth (which may change with a duty ratio of the light control signal for driving the light source, and may be output upon sensing a distance to a subject using the imaging device) with an actual depth between the imaging device and the subject, a duty ratio having the least difference between the computation depth and the actual depth may be selected. Accordingly, the light source may be driven by the light control signal having an optimized duty ratio, such that performance of the imaging device may improve. Also, by reflecting a change in the distance between the imaging device and the subject using a method of delaying the light control signal, an optimized duty ratio of the light control signal may be swiftly selected.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An imaging device, comprising:
a light source configured to operate according to a light control signal that has a first duty ratio;
pixels disposed in an array, each of the pixels including:
a photodiode configured to generate an electrical charge in response to light output by the light source and reflected from a subject, and
a pixel circuit configured to output a pixel signal corresponding to the electrical charge; and
a logic circuit configured to generate raw data for generating a depth image using the pixel signal, and configured to provide a photo control signal that has a second duty ratio to the pixel circuit in each of the pixels, wherein the first duty ratio is not an integer multiple of the second duty ratio.

2. The imaging device as claimed in claim 1, wherein the first duty ratio is less than twice the second duty ratio.

3. The imaging device as claimed in claim 1, wherein a frequency of the light control signal is equal to a frequency of the photo control signal.

4. The imaging device as claimed in claim 1, wherein:
the logic circuit includes a clock driver configured to drive the pixels, a readout circuit configured to receive the pixel signal from each of the pixels, and a control logic configured to generate the raw data using the pixel signal, and
the light source includes a light emitting device, and a light source driver configured to drive the light emitting device according to the light control signal.

5. The imaging device as claimed in claim 4, wherein the control logic is configured to transmit a delay signal, which is obtained by delaying the light control signal, to the light source driver as the light control signal during a calibration operation.

6. The imaging device as claimed in claim 5, wherein:
the control logic is configured to calculate reference data using the delay signal, and calculate depth data from the raw data generated while the light source operates according to the delay signal, and
the control logic is configured to calculate an operation error using a difference between the depth data and the reference data.

7. The imaging device as claimed in claim 4, wherein:
the control logic is configured to determine the first duty ratio as a first reference duty ratio greater than the second duty ratio during a first calibration operation,
the control logic is configured to determine the first duty ratio as a second reference duty ratio greater than the second duty ratio and smaller than the first reference duty ratio during a second calibration operation, and
the control logic is configured to, in each of the first calibration operation and the second calibration operation, sequentially transmit a plurality of delay signals obtained by delaying the light control signal by different delay times to the light source driver, as the light control signal.

8. The imaging device as claimed in claim 7, wherein:
the control logic is configured to calculate a plurality of reference data using the delay times, and generate a plurality of depth data using the raw data while the light source operates by the plurality of delay signals, and
the control logic is configured to obtain operation errors for the plurality of reference data in each of the first calibration operation and the second calibration operation by comparing the plurality of reference data with the plurality of depth data.

9. The imaging device as claimed in claim 8, wherein:
the control logic is configured to determine a first result value and a second result value using a difference between a maximum value and a minimum value among the operation errors in each of the first calibration operation and the second calibration operation, and
the control logic is configured to determine the first duty ratio by comparing the first result value with the second result value.

10. The imaging device as claimed in claim 9, wherein:
the control logic is configured to determine the first reference duty ratio as the first duty ratio when the first result value is less than the second result value, and
the control logic is configured to determine the second reference duty ratio as the first duty ratio when the second result value is less than the first result value.

11. The imaging device as claimed in claim 1, wherein:
the logic circuit is configured to input a plurality of photo control signals, having respective phase differences of 0 degrees, 90 degrees, 180 degrees, and 270 degrees with reference to the light control signal, to the pixel circuit, and
a falling edge of each of the plurality of photo control signals is generated at a time point different from that of a falling edge of the light control signal.

12. The imaging device as claimed in claim 1, wherein the first duty ratio is 1/3, and the second duty ratio is 1/4.

13. An imaging device, comprising:
a light source including at least one light emitting device and a light source driver for driving the light emitting device;
a pixel array in which a plurality of pixels are disposed, each of the plurality pixels including a photodiode for generating electrical charges in response to a light reception signal output by the light source and reflected from a subject, and a pixel circuit for outputting a pixel signal corresponding to the electrical charges of the photodiode; and
a logic circuit including a control logic configured to generate raw data for generating a depth image by obtaining the pixel signals, and to output a light control signal having a predetermined demodulation frequency and a duty ratio, and including a delay circuit configured to output a delay signal to the light source driver by delaying the light control signal,
wherein the logic circuit is configured to input, to the pixel circuit connected to the photodiode in each of the plurality of pixels, a plurality of photo control signals having different phase differences with reference to the light control signal.

14. The imaging device as claimed in claim 13, wherein:
the control logic is configured to select one of a normal mode and a calibration mode, and
the delay circuit is deactivated in the normal mode and is activated in the calibration mode.

15. The imaging device as claimed in claim 14, wherein the control logic is configured to determine a duty ratio of the delay signal as a first reference duty ratio and a second reference duty ratio smaller than the first reference duty ratio sequentially in the calibration mode.

16. The imaging device as claimed in claim 15, wherein:
the control logic is configured to calculate first depth data from first raw data generated when the duty ratio of the delay signal is the first reference duty ratio, and the control logic is configured to calculate second depth data from second raw data generated when the duty ratio of the delay signal is the second reference duty ratio, and
the control logic is configured to select the first reference duty ratio or the second reference duty ratio as a duty ratio of the light control signal by comparing each of the first depth data and the second depth data with predetermined reference data.

17. The imaging device as claimed in claim 16, wherein the control logic is configured to calculate the predetermined reference data using the demodulation frequency and a delay time of the delay signal.

18. The imaging device as claimed in claim 16, wherein, in the calibration mode, while a distance between the pixel array and the subject is maintained to be constant, the control logic calculates the first depth data and the second depth data.

19. The imaging device as claimed in claim 15, wherein the first reference duty ratio and the second reference duty ratio are greater than a duty ratio of each of the plurality of photo control signals.

20. A method of controlling an imaging device including a light source and an image sensor, the method comprising:
setting a duty ratio of a light control signal for driving the light source as a first reference duty ratio;
obtaining first operation errors corresponding to a difference between reference data according to a delay time of the light control signal and depth data generated by the image sensor, while changing the delay time of the light control signal;
calculating a first result value corresponding to a difference between a maximum value and a minimum value among the first operation errors when the delay time of the light control signal reaches a maximum delay time;
setting a duty ratio of the light control signal as a second reference duty ratio;
obtaining second operation errors corresponding to a difference between reference data according to the delay time of the light control signal and depth data generated by the image sensor, while changing the delay time of the light control signal;
calculating a second result value corresponding to a difference between a maximum value and a minimum value among the second operation errors when the delay time of the light control signal reaches a maximum delay time; and
determining the first reference duty ratio or the second reference duty ratio as a duty ratio of the light control signal, based on the first result value and the second result value.

* * * * *